US011029468B2

(12) United States Patent
Smith et al.

(10) Patent No.: US 11,029,468 B2
(45) Date of Patent: Jun. 8, 2021

(54) OPTICAL CONNECTOR

(71) Applicant: 3M INNOVATIVE PROPERTIES COMPANY, St. Paul, MN (US)

(72) Inventors: Terry L. Smith, Roseville, MN (US); Barry S. Carpenter, Oakdale, MN (US); Takayuki Hayauchi, Sagamihara (JP)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 16/734,634

(22) Filed: Jan. 6, 2020

(65) Prior Publication Data

US 2020/0142134 A1     May 7, 2020

Related U.S. Application Data

(60) Continuation of application No. 16/189,142, filed on Nov. 13, 2018, now Pat. No. 10,557,995, which is a
(Continued)

(51) Int. Cl.
    *G02B 6/38*      (2006.01)
    *G02B 6/26*      (2006.01)

(52) U.S. Cl.
CPC ........... *G02B 6/3829* (2013.01); *G02B 6/262* (2013.01); *G02B 6/383* (2013.01); *G02B 6/3821* (2013.01);
(Continued)

(58) Field of Classification Search
None
See application file for complete search history.

(56) References Cited

U.S. PATENT DOCUMENTS

| 4,318,587 A | 3/1982 | Grassl |
| 4,941,728 A | 7/1990 | Pautz et al. |

(Continued)

FOREIGN PATENT DOCUMENTS

| JP | H02-36805 | 3/1990 |
| JP | 2007-011060 | 1/2007 |

(Continued)

OTHER PUBLICATIONS

PCT International Search Report from PCT/US2015/01938, dated Aug. 3, 2015, 7 pages.

*Primary Examiner* — Tina M Wong
(74) *Attorney, Agent, or Firm* — Jonathan L. Tolstedt

(57) ABSTRACT

An optical connector includes a first attachment area for receiving and permanently attaching to an optical waveguide. A light coupling unit is disposed and configured to move translationally and not rotationally within the housing of the connector. The light coupling unit includes a second attachment area for receiving and permanently attaching to an optical waveguide received and permanently attached at the first attachment area. The light coupling unit also includes light redirecting surface. The light redirecting surface is configured such that when an optical waveguide is received and permanently attached at the first and second attachment areas, the light redirecting surface receives and redirects light from the optical waveguide. The optical waveguide limits, but does not prevent, a movement of the light coupling unit within the housing.

5 Claims, 36 Drawing Sheets

Related U.S. Application Data division of application No. 15/121,183, filed as application No. PCT/US2015/019389 on Mar. 9, 2015, now Pat. No. 10,162,123.

(60) Provisional application No. 61/955,304, filed on Mar. 19, 2014.

(52) U.S. Cl.
CPC ......... *G02B 6/3831* (2013.01); *G02B 6/3839* (2013.01); *G02B 6/3882* (2013.01); *G02B 6/3885* (2013.01)

(56) References Cited

U.S. PATENT DOCUMENTS

| | | | |
|---|---|---|---|
| 5,633,968 | A | 5/1997 | Sheem |
| 5,838,856 | A | 11/1998 | Lee |
| 7,418,167 | B2 | 8/2008 | Dames |
| 7,444,042 | B1 | 10/2008 | Niblock |
| 7,787,097 | B2 | 8/2010 | Satoh |
| 8,018,558 | B2 | 9/2011 | Kubota |
| 8,406,588 | B2 | 3/2013 | Matsui |
| 8,517,614 | B1 | 8/2013 | Wach |
| 8,620,122 | B2 | 12/2013 | Meadowcroft |
| 8,628,253 | B2 | 1/2014 | Bitter |
| 9,097,859 | B2 | 8/2015 | Wu |
| 9,477,038 | B2 | 10/2016 | Yu |
| 9,482,827 | B2 | 11/2016 | Haase |
| 9,507,094 | B2 | 11/2016 | Nakazono |
| 9,645,319 | B2 | 5/2017 | Akabane |
| 10,162,123 | B2 * | 12/2018 | Smith ............ G02B 6/383 |
| 10,269,280 | B2 | 4/2019 | Oh |
| 10,459,173 | B2 * | 10/2019 | Haase ............ G02B 6/3885 |
| 10,890,724 | B2 * | 1/2021 | Haase ............ G02B 6/383 |
| 2004/0022484 | A1 | 2/2004 | Sigloch |
| 2006/0072878 | A1 | 4/2006 | Dames |
| 2011/0305417 | A1 | 12/2011 | Wang |
| 2012/0033920 | A1 | 2/2012 | Haley |
| 2012/0237168 | A1 | 9/2012 | Aoki et al. |
| 2012/0275748 | A1 | 11/2012 | Yamaguchi et al. |
| 2013/0209027 | A1 | 8/2013 | Yu |
| 2015/0050019 | A1 | 2/2015 | Sengupta |
| 2015/0129863 | A1 | 5/2015 | Li et al. |
| 2015/0234126 | A1 * | 8/2015 | Haase ............ G02B 6/3881 385/59 |
| 2016/0231521 | A1 * | 8/2016 | Smith ............ G02B 6/4214 |
| 2017/0059767 | A1 | 3/2017 | Li |
| 2021/0018697 | A1 * | 1/2021 | Evans ............ G02B 6/3825 |

FOREIGN PATENT DOCUMENTS

| | | |
|---|---|---|
| JP | 2011-112751 | 6/2011 |
| JP | 2012-083442 | 4/2012 |
| WO | WO 02/39169 | 5/2002 |
| WO | WO 2014/055226 | 4/2014 |

* cited by examiner

OPTICAL CONNECTOR

TECHNICAL FIELD

The provided disclosure relates to optical connectors for connecting sets of optical waveguides such as optical fiber ribbons.

BACKGROUND

Optical fiber connectors can be used to connect optical fibers in a variety of applications including: telecommunications networks, local area networks, data center links, and for internal links in high performance computers. These connectors can be grouped into single fiber and multiple fiber designs and also grouped by the type of contact. Common contact methods include: physical contact wherein the mating fiber tips are polished to a smooth finish and pressed together; index matched, wherein a compliant material with an index of refraction that is matched to the core of the fiber fills a small gap between the mated fibers' tips; and air gap connectors, wherein the light passes through a small air gap between the two fiber tips. With each of these contact methods a small bit of dust on the tips of the mated fibers can greatly increase the light loss.

Another type of optical connector is referred to as an expanded beam connector. This type of connector allows the light beam in the source connector to exit the fiber core and diverge within the connector for a short distance before the light is collimated to form a beam with a diameter substantially greater than the core. In the receiving connector the beam is then focused back to its original diameter on the tip of the receiving fiber. This type of connector is less sensitive to dust and other forms of contamination that may be present in the region where the beam is expanded to the larger diameter.

Backplane optical connectors will become essential components of high-performance computers, data centers, and telecom switching systems in the near future, as line rates of data transmission migrate from the current 10 Gb/sec/line to 25 Gb/sec/line in the next few years. It would be advantageous to provide expanded beam connectors that are lower cost and higher performance alternatives to existing optical and copper connections that are currently being used in the 10 Gb/sec interconnects.

SUMMARY

The disclosure relates to optical connectors. Some embodiments involve a connector that includes a first attachment area for receiving and permanently attaching to an optical waveguide. A light coupling unit is disposed and configured to move translationally and not rotationally within the housing of the connector. The light coupling unit includes a second attachment area for receiving and permanently attaching to an optical waveguide received and permanently attached at the first attachment area. The light redirecting surface of the light coupling unit is configured such that when an optical waveguide is received and permanently attached at the first and second attachment areas, the light redirecting surface receives and redirects light from the optical waveguide. The optical waveguide limits, but does not prevent, a movement of the light coupling unit within the housing.

Some embodiments relate to a connector the includes a first attachment area for receiving and permanently attaching to an optical waveguide and configured to move within the housing and a light coupling unit disposed and configured to move within the housing. The light coupling unit comprises a second attachment area for receiving and permanently attaching to an optical waveguide received and permanently attached at the first attachment area. The light coupling unit also includes a light redirecting surface which is configured such that when an optical waveguide is received and permanently attached at the first and second attachment areas, the light redirecting surface receives and redirects light from the optical waveguide. The optical waveguide limits, but does not prevent, a movement of the light coupling unit within the housing.

In some embodiments, a connector comprises a first attachment area for receiving and permanently attaching to an optical waveguide and a second attachment area for receiving and permanently attaching to an optical waveguide received and permanently attached at the first attachment area. A flexible carrier is disposed within the housing of the connector between the first and second attachment areas for supporting and adhering to an optical waveguide received and permanently attached at the first and second attachment areas. A first end of the flexible carrier is attached to the first attachment area and a second end of the carrier is attached to the second attachment area.

The above summary is not intended to describe each disclosed embodiment or every implementation of the present disclosure. The figures and the detailed description below more particularly exemplify illustrative embodiments.

BRIEF DESCRIPTION OF THE DRAWINGS

The figures are not necessarily to scale. Like numbers used in the figures refer to like components. However, it will be understood that the use of a number to refer to a component in a given figure is not intended to limit the component in another figure labeled with the same number.

DETAILED DESCRIPTION

In the following description, reference is made to the accompanying drawings that form a part hereof and in which are shown by way of illustration. It is to be understood that other embodiments are contemplated and may be made without departing from the scope or spirit of the present disclosure. The following detailed description, therefore, is not to be taken in a limiting sense.

Figure 1A:
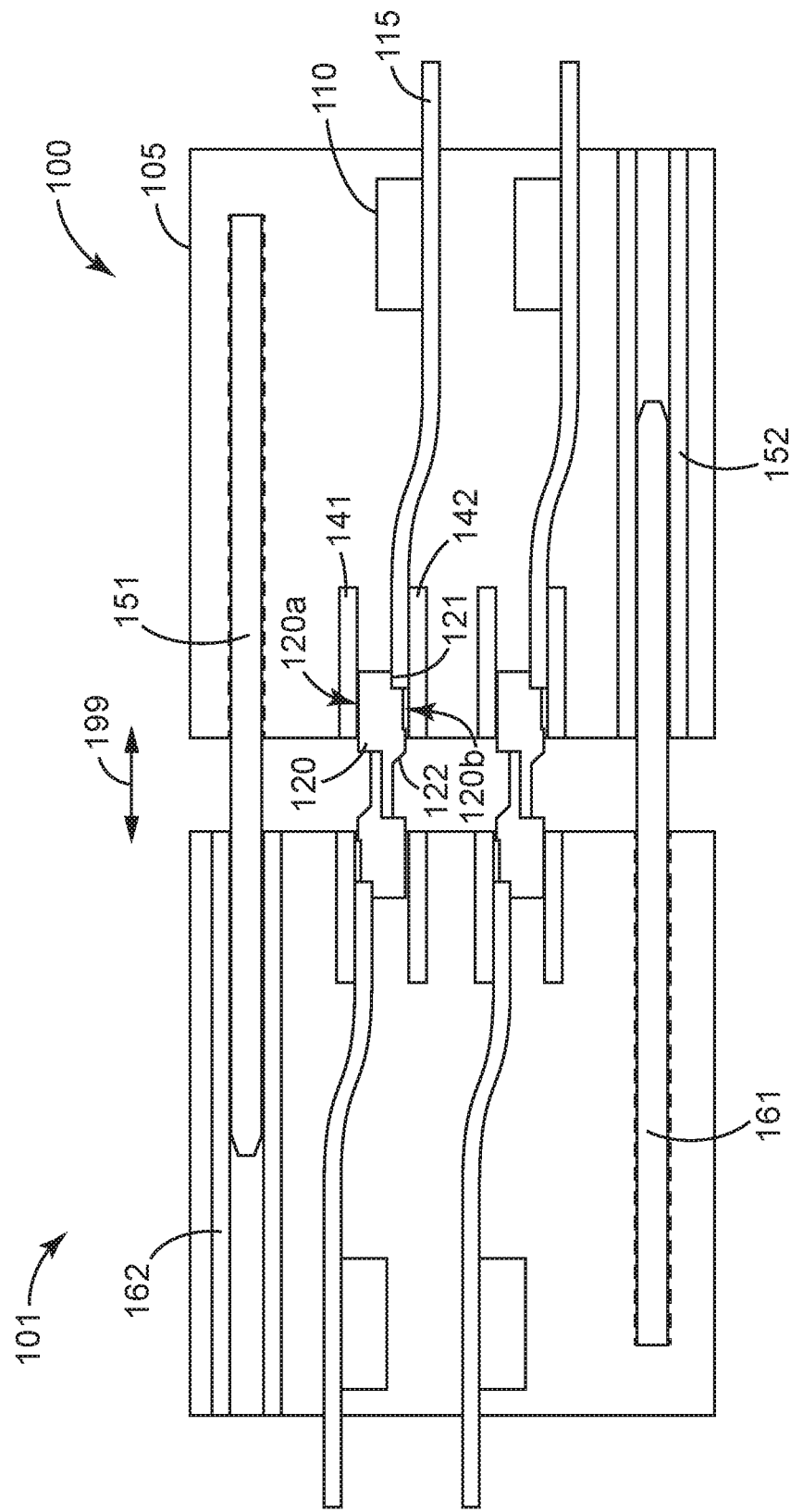
FIG. 1A shows a side view of an optical connector prior to mating according to some embodiments.
Figure 1B:
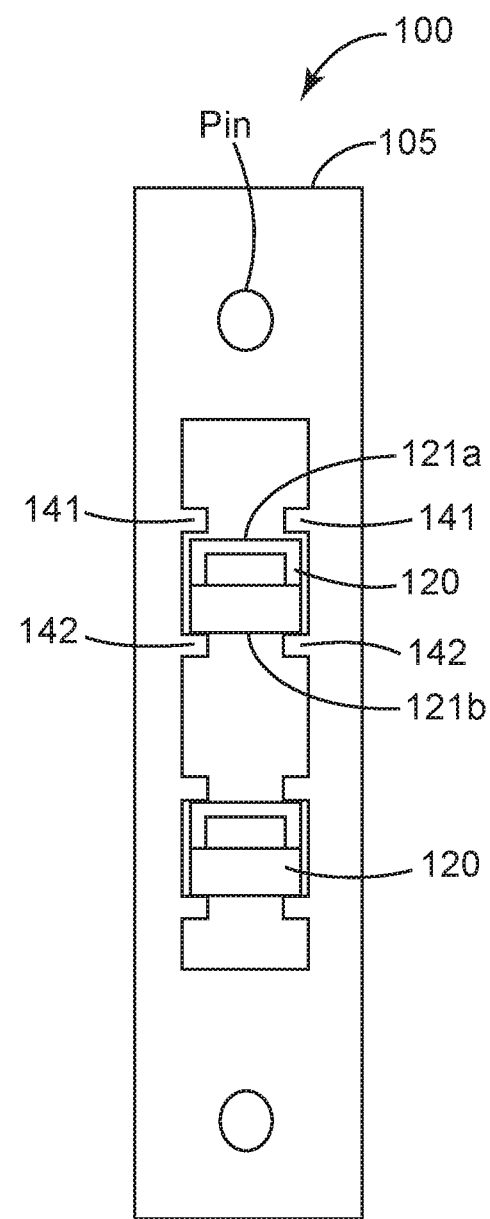
FIG. 1B shows the mating face of the optical connector of FIG. 1A.
Figure 1C:
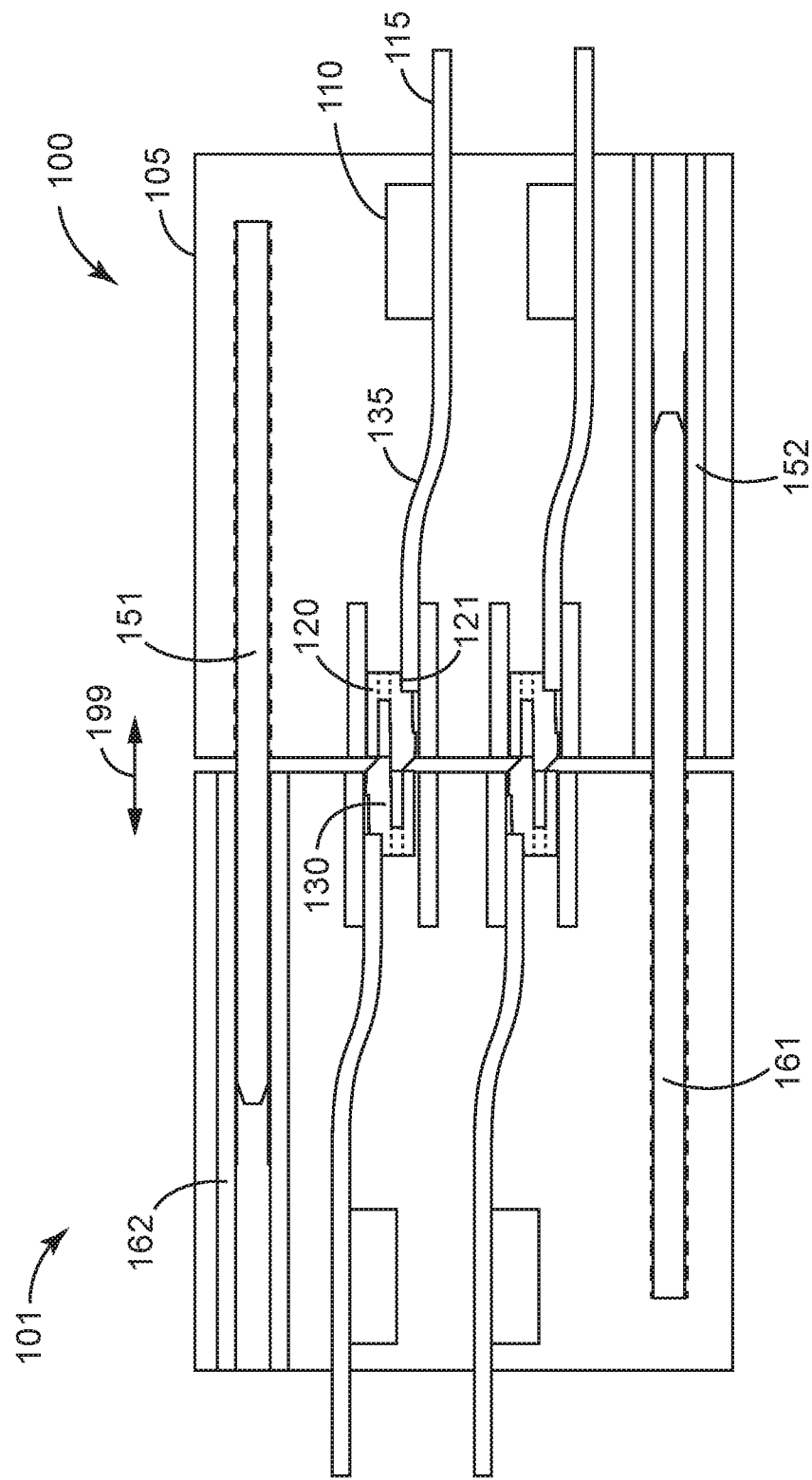
FIG. 1C shows the connector of FIG. 1A after mating.

FIG. 1A shows a side view and FIG. 1B a view of the mating face 104 of a connector 100 according to some embodiments. FIG. 1A shows a mating connector 101 prior to mating with connector 100. FIG. 1C shows connectors 100, 101 after mating.

The configuration and operation of the connectors 100, 101 is explained primarily with reference to connector 100 with the understanding that mating connector 101 includes similar features. As shown in FIG. 1A-1C, in some embodiments, the connector 100 may include one or more first attachment areas 110 configured for permanently attaching one or more optical waveguides 115. A light coupling unit 120 is disposed within the housing 105 and is optically coupled to a waveguide 115. The optical waveguide 115 may be one optical waveguide of a plurality of waveguide arranged side by side in a multiple fiber ribbon cable, as shown in more detail in FIGS. 2A-2C. The multiple fibers in a fiber cable can bend in unison and by the substantially the same amount when the connector engages, rather than individually. The light coupling unit 120 is configured to move translationally, e.g., along the mating/unmating direction of the connector (as indicated by double headed arrow 199) but not rotationally within the housing 105.

The light coupling unit 120 includes a second attachment area 121 for receiving and permanently attaching to the optical waveguide 115. The light coupling unit 120 includes a light redirecting surface 122 configured such that when the optical waveguide 115 is received and permanently attached at the first 110 and second 121 attachment areas, the light redirecting surface 122 receives and redirects light from the optical waveguide 115. The optical waveguide 115 limits, but does not prevent, movement of the light coupling unit 120 within the housing 105. In the embodiment illustrated in FIG. 1A the first attachment area 110 is fixed within the housing. In other embodiment, see, e.g., FIGS. 5A, 5B, 6A, 6B, the first attachment area is configured to move within the housing.

As best seen in FIG. 1C, when the optical waveguide 115 is received and permanently attached at the first 110 and second 121 attachment areas, mating of the light coupling unit 120 with a mating light coupling unit 130 of the mating connector 101 causes a bend 135 in the optical waveguide 115 between the first 110 and second 121 attachment areas. The bend 135 assists in preventing the light coupling unit 120 from unmating from the mating light coupling unit 130. In some configurations, the bend exists when the connector is unmated and mating causes a further bend in the existing bend. For example, further bending of the optical waveguide 115 may occur when, during mating, the second attachment area 121 moves within the connector housing 105 along the mating/unmating axis 199. After mating, the optical fiber 115 applies a spring force to the light coupling unit 120 to maintain the light coupling unit 120 in a mating position with respect to the mating light coupling unit 130.

In some embodiments, the housing 105 includes at least one guide 141 configured to prevent the light coupling unit 120 from rotating, but not moving translationally, within the housing 105. As shown in FIG. 1A, the guide 140 may be disposed adjacent to and facing at least one of a top 120a and a bottom 120b major surface of the light coupling unit 120. In some implementations, the housing 105 comprises a pair of guides 141, 142. One guide of the pair of guides 141, 142 is disposed on each side of the light coupling unit 120. The pair of guides 141, 142 are configured to prevent the light coupling unit 120 from rotating, but not moving translationally, within the housing 105. In some configurations, one guide 141 of the pair of guides is disposed adjacent to and facing a top major surface 120a of the light coupling unit 120 and another guide 142 of the pair of guides is disposed adjacent to and facing a bottom major surface 120b of the light coupling unit 120.

Some embodiments include a first registration feature 151 configured to engage with a compatible second mating registration feature 162 of a mating connector 101. For example, the first registration feature 151 may comprise an elongated protrusion and the compatible second mating feature 162 may comprise an elongated channel. As illustrated in FIG. 1A, the connector 100 can include a first registration feature 151 which is an elongated protrusion and a second registration feature 152 which is an elongated channel. The first and second registration features 151, 152 of connector 100 are configured to mate with mating second and first mating registration features 162, 161 of mating connector 101.

Figure 2A:
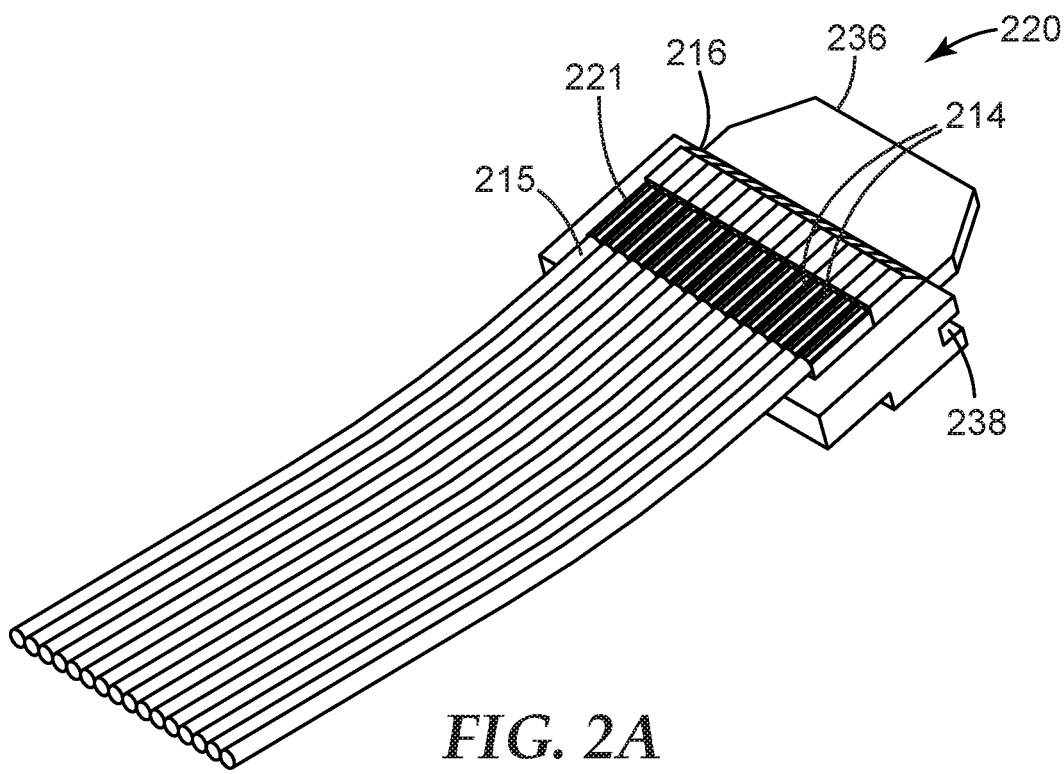
FIG. 2A illustrates a light coupling unit in accordance with embodiments described herein, with a fiber cable attached.

FIG. 2A is a more detailed view illustrating an example of a light coupling unit 220, with an array of waveguides (e.g. fiber cable) attached.

The second attachment area 221 may comprise plurality of V-grooves 214 each groove being configured to accommodate a different optical waveguide 215 of a plurality of optical waveguides of a waveguide ribbon. Each of the optical waveguides 215 being received and permanently attached to at the first attachment area (not shown in FIG. 2A), the optical waveguide 215 being bonded to the second attachment area 221 at the groove 214. As shown in the embodiment of FIG. 2A, the second attachment area 221 can permanently attach to a plurality of optical waveguides received and permanently attached to at the first attachment area. In some embodiments, the optical waveguide 215 is attached at the first attachment area (not shown in FIG. 2, but shown in FIG. 1), the second attachment area 221, or both, using an adhesive. In cases where the optical waveguides are optical fibers, the fiber attachment areas may consist of cylindrical holes into which the fibers are bonded. Also in cases where the waveguides are optical fibers, the polymer buffer layer on the fiber may be bonded to an attachment area adjacent to the area where the bare fiber is bonded, in order to enhance the mechanical strength of the assembly.

Light coupling unit 220 is configured so as to be able to move translationally but not rotationally within housing 105 shown in FIG. 1A. This facilitates proper alignment of light coupling unit 220 with a mating coupler (typically a coupler with substantially identical features) as will be shown in subsequent drawings.

In some embodiments, the light coupling unit is a parallel expanded beam optical coupler. The light directing surface 216 may be curved so that it focuses incident light. The optical waveguide 215 has a first core diameter and the curvature of the light directing surface 216 is configured to change a divergence of light from the optical waveguide 215 such that light from the optical waveguide exits the connector along an exit direction different than a mating direction of the connector and has a second diameter greater than the first core diameter. In some embodiments, the ratio of the second diameter to the first core diameter can be at least 2, at least 3.7, or even at least 5. In various embodiments, the light directing surface 216 and optical waveguide 215 may be operated in unidirectional mode or may be operated in a time multiplexed bidirectional mode.

Light coupling unit 220 can also include mechanical mating tab 236 (guide part) and interlocking mechanism 238. In some embodiments, mechanical mating tab 236 can have a tapering width along at least a portion of a length of the tab portion as shown in the illustrations. Mechanical mating tab 236 can extend within housing 105 (shown in FIG. 1A) such that when mating with a mating connector, the connector moves toward the mating connector in a mating direction along the mating axis 199.

Figure 2B:
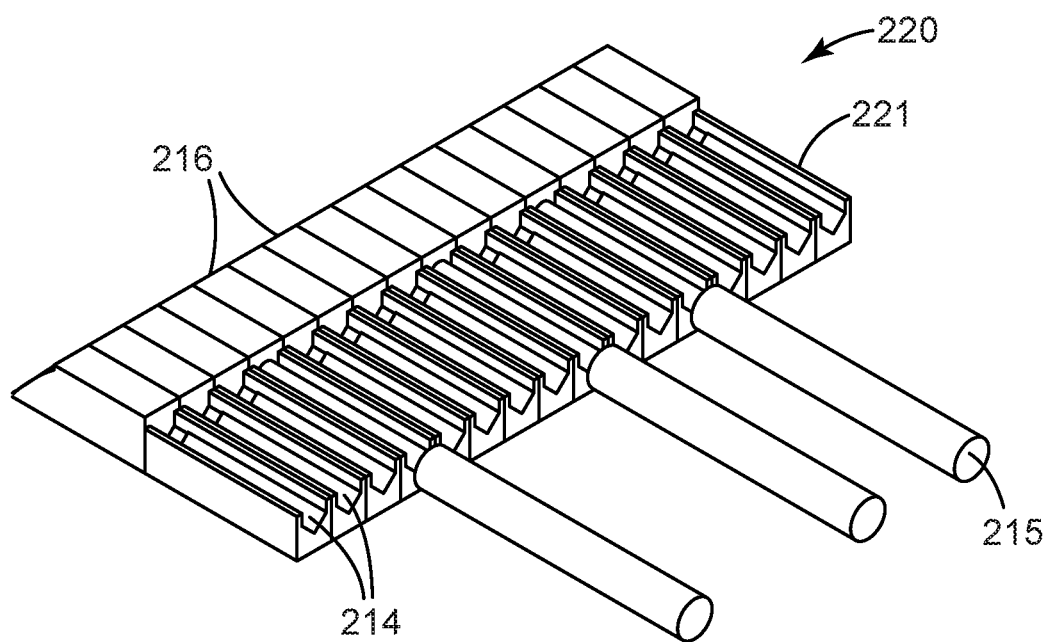
FIG. 2B shows portions of the light coupling unit of FIG. 2A in more detail.

FIG. 2B shows a portion of the light coupling unit 220 including the second attachment area 221 and light directing surface 216. FIG. 2B illustrates the attachment of several optical fibers 215 to light coupling unit 220. FIG. 2B, is a cut-away perspective view of the light coupling unit 220 including second attachment area 221, and light directing surface 216. At the second attachment area 221, optical fibers 215 are aligned in grooves 214, typically V-grooves, to which they are permanently attached. As shown, light coupling unit 120 includes an array of light directing surfaces 216, at least one for each optical fiber 215 attached to light coupling unit 220. In various configurations, the light directing surface 216 includes a prism or a curved surface.

Figure 3A:
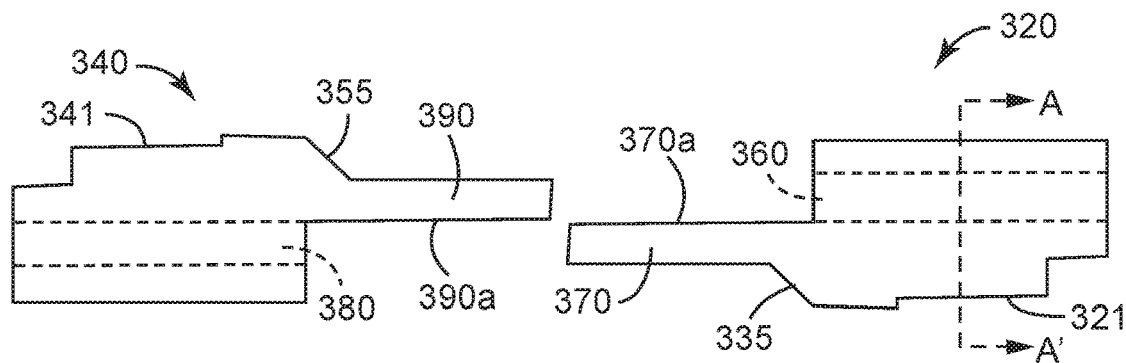
FIGS. 3A-3C illustrate the operation of alignment features of a light coupling unit.
Figure 3B:
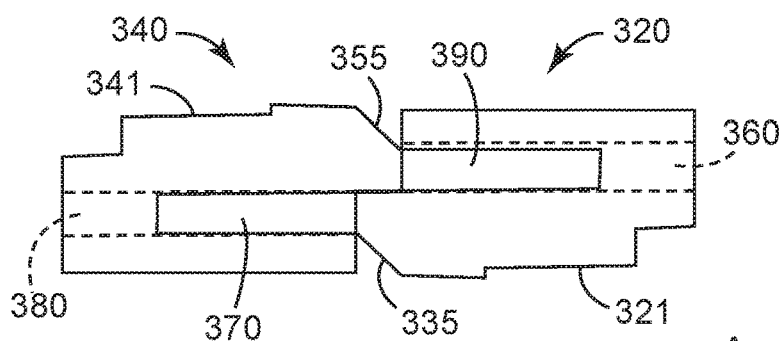
Figure 3C:
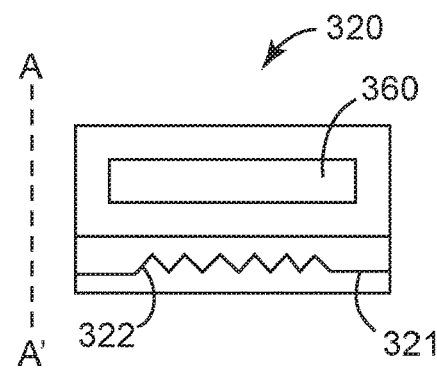

FIGS. 3A and 3B show a light coupling unit 320 and a mating light coupling unit 340 before and after mating, respectively. FIG. 3C shows a cross sectional view of light coupling unit 320 through plane A-A'. Each light coupling unit 320, 340 includes a second attachment area 321, 341, e.g., comprising V-grooves 322 for aligning optical waveguides, and a light directing surface 335, 355. Each light coupling unit 320, 340 includes a first alignment feature 370, 390, e.g., comprising a mechanical tab (guide part), and a compatible second alignment feature 360, 380, e.g. comprising a guide hole configured to receive the tab 370, 390. During mating of the light coupling unit 320 with the mating light coupling unit 340, the first alignment feature 370 of the lighting coupling unit 320 is configured to engage with the second alignment feature 380 of the mating light coupling unit 340. The second alignment feature 360 of the light coupling unit 320 is configured to engage with a mating first alignment feature 390 of the mating light coupling unit 340. After mating, the light directing surface 335 of light coupling unit 320 is aligned in mating position with the light directing surface 355 of mating light coupling unit 340.

Figure 4:
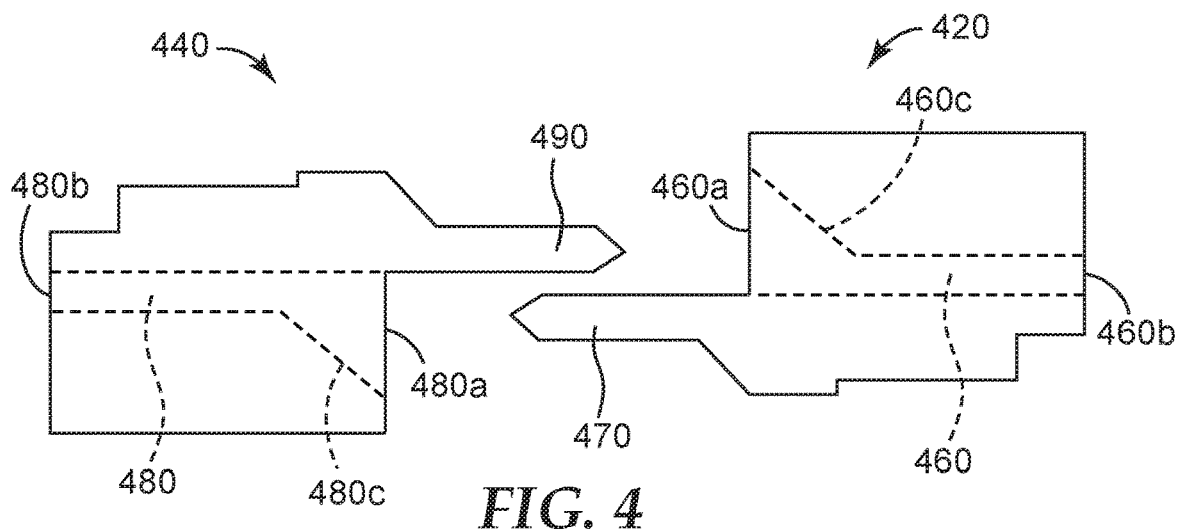
FIG. 4 depicts alignment features having a tapered profile in accordance with some embodiments.

FIG. 4 illustrates light coupling units 420, 440 that include additional alignment features. In the illustrated implementation, the guide hole 460, 480 of each light coupling unit 420, 440 comprises a first end 460a, 480a and a second end 460b, 480b.

During mating of the light coupling unit 420 with the mating light coupling unit 440, the first end 460a of the guide hole 460 engages with a tab 490 of the mating light coupling unit 440 before the second end 460b of the guide hole 460 engages with the mating tab 490 of the mating light coupling unit 440. The first end 460a of the guide hole 460 includes a taper 460c that causes the guide hole 460 to become narrower with distance from the first end 460a towards the second end 460b for at least a portion of the length of the guide hole 460. Similarly, during mating of the light coupling unit 420 with the mating light coupling unit 440, the first end 480a of the guide hole 480 engages with a tab 470 of the light coupling unit 420 before the second end 480b of the guide hole 480 engages with the mating tab 470. The first end 480a of the guide hole 480 includes a taper 480c that causes the guide hole 480 to become narrower with distance from the first end 480a towards the second end 480b for at least a portion of the length of the guide hole 480.

Figure 5A:
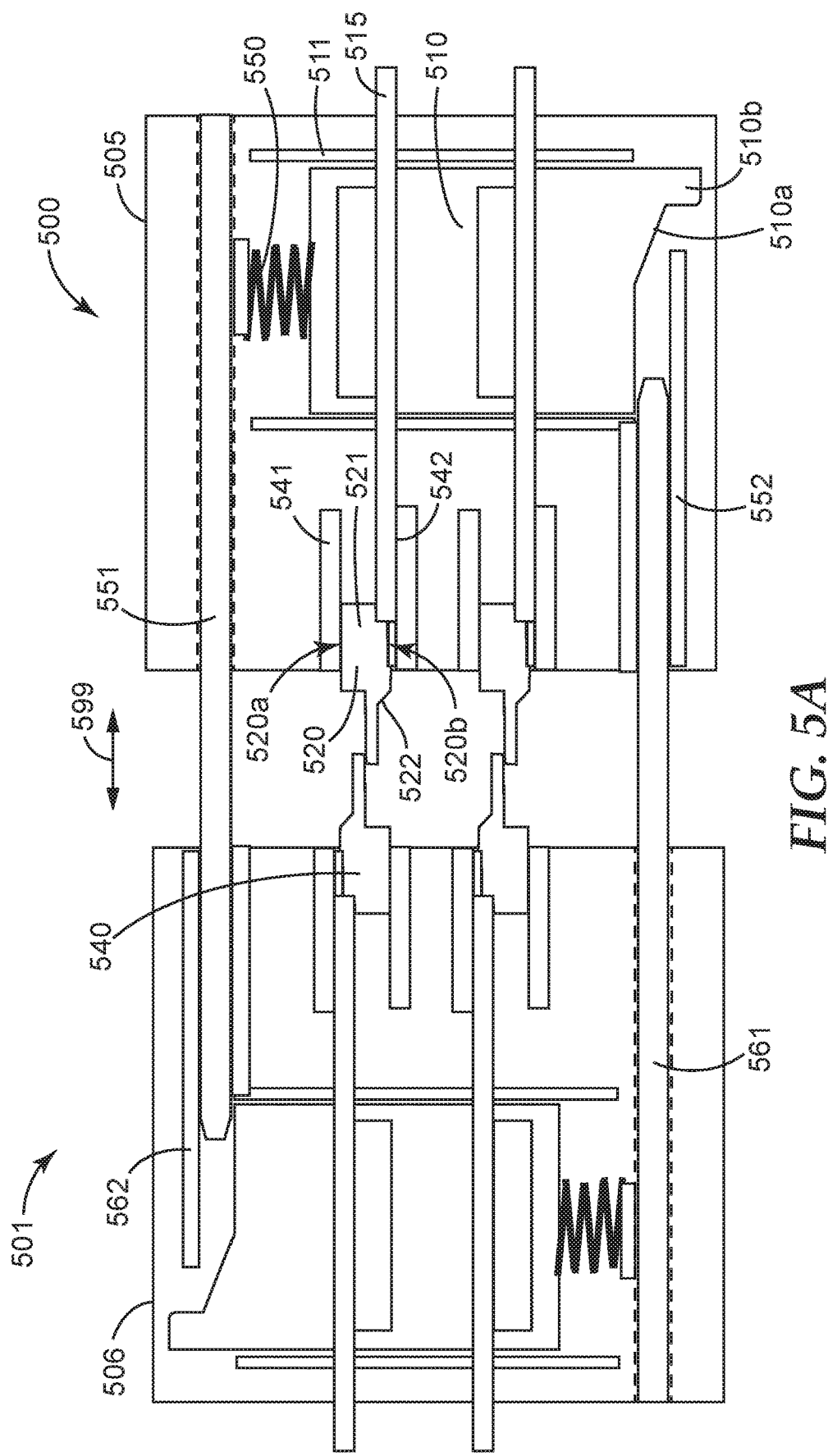
FIGS. 5A and 5B show an unmated and mated optical connector, respectively, that includes a movable first attachment area in accordance with embodiments disclosed herein.
Figure 5B:
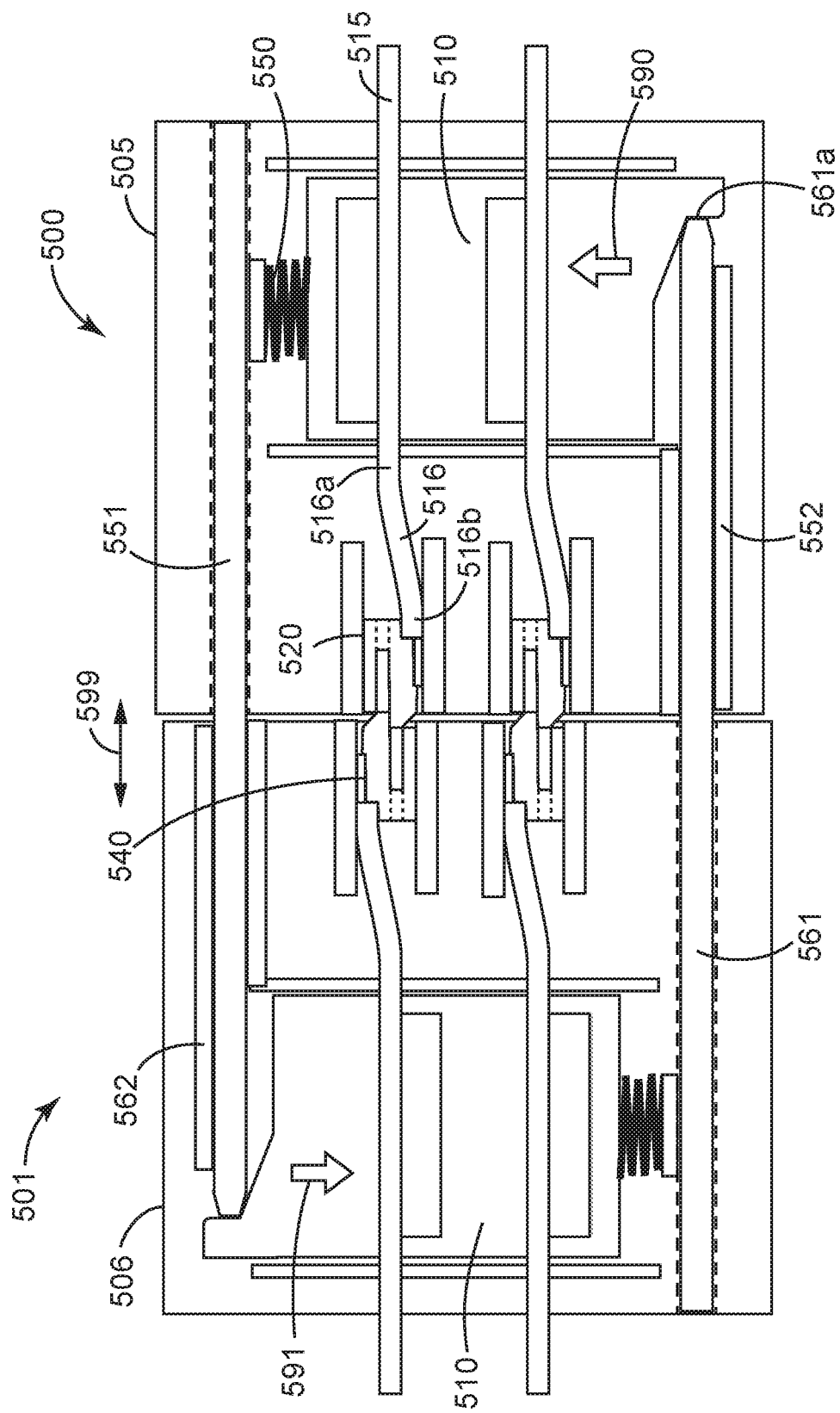

FIGS. 5A and 5B illustrate connectors 500, 501, each having a first attachment area 510 that is movable within the connector housing 505, 506. FIGS. 5A and 5B illustrate connectors 500, 501 during and after mating, respectively. The configuration and operation of the connectors 500, 501 is explained primarily with reference to connector 500 with the understanding that mating connector 501 includes similar features. Connector 500 includes a first attachment area 510 configured for receiving and permanently attaching to an optical waveguide 515. The first attachment area 510 is configured to move within the housing 505. A light coupling unit 520 is disposed and configured to move within the housing 505. The light coupling unit 520 comprises a second attachment area 521 configured to receive and permanently attach to the optical waveguide 515 received and permanently attached at the first attachment area 510. The light coupling unit 520 includes a light redirecting surface 522 configured such that when an optical waveguide 515 is received and permanently attached at the first and second attachment areas 510, 521, the light redirecting surface 522 receives and redirects light from the optical waveguide 515, and the optical waveguide 515 limits, but does not prevent, movement of the light coupling unit 520 within the housing 515. For example, the optical waveguide 515 limits, but does not prevent, the movement of the light coupling unit 520 within the housing primarily along a linear direction such as along the connector mating/unmating axis indicated by arrow 599. In the absence of any optical waveguide received and permanently attached at the first and second attachment areas 510, 521, the light coupling unit 520 is unrestrained to move freely along at least one direction, e.g., a direction along the mating/unmating axis. When attached to the optical waveguide 515, the light coupling unit 520 is stably supported within the housing 505. The stable support is due, at least in part, to the optical waveguide 515 being received and permanently attached at the first and second attachment areas 510, 521.

In some embodiments, prior to mating, when the optical waveguide 515 is received and permanently attached at the first and second attachment areas 510, 521, the optical waveguide 515 is substantially unbent between the first 510 and second 521 attachment areas. The light coupling unit 520 is configured to be so positioned and oriented within the housing 505 as to mate with a light coupling unit 540 of a mating connector 501. As the connector 500 mates with the mating connector 501, the light coupling unit 520 is positioned and oriented for mating, at least in part, by virtue of the optical waveguide 515 being received and permanently attached at the first 510 and second 521 attachment areas.

As shown in FIG. 5B, when the optical waveguide 515 is received and permanently attached at the first and second attachment areas 510, 521, mating of the light coupling unit 520 with a mating light coupling unit 540 of a mating connector 505 causes a bend 516 in the optical waveguide 515 between the first 510 and second 521 attachment areas. The bend 516 applies spring force to the light coupling unit 520 which assists in preventing the light coupling unit 520 from unmating from the mating light coupling unit 540. In some configurations, the bend may be an S-shaped bend, for example. In some cases, when the optical waveguide 515 is received and permanently attached at the first and second attachment areas 510, 521, the optical waveguide 515 already has a bend before mating, and mating of the light coupling unit to a mating light coupling unit cases a further bend in the existing bend.

As indicated in FIG. 5B, when the optical waveguide 515 is received and permanently attached at the first and second attachment areas 510, 521, mating of the light coupling unit 520 with the mating light coupling unit 540 of the mating connector 501 causes the first attachment area 510 of connector 500 to move within the housing 505 along the direction indicated by arrow 590. The first attachment area 510 of connector 501 moves in an opposite direction, along arrow 591. The movement of the first attachment area 510 causes a first bend 516a and second bend 516b in the optical waveguide 515 and causes the light coupling unit 520 to move within the housing 505. The first and second bends assists in preventing the light coupling unit 520 from unmating from the mating light coupling unit 540. In various embodiments, the first bend 516a, the second bend 516b, or both, may comprise a further bend in an existing bend present before the connectors 500, 501 are mated. As indicated by arrows 590 and 599, during mating, the first attachment area 510 moves in a direction 590 substantially perpendicular to a connector mating direction 599 of the connector 500. The light coupling unit 520 moves substantially parallel to the connector mating direction 599 and toward the first attachment area 510.

In the illustrated embodiment, the connector 500 includes first and second registration features 551, 552 configured to engage with compatible mating registration features 561, 562 of mating connector 501. As the connector 500 mates with a mating connector 501 along the mating direction 599, the second registration feature 552 of the connector 500 mates with the first mating registration feature 561 of the mating connector 501. The first mating registration feature 561 of the mating connector 501 causes the first attachment area 510 of the connector 500 to move along arrow 590 within the housing 505 of the connector 500.

For example, in some implementations, the registration feature 552 of the connector 500 defines an elongated channel and the registration feature 561 of the mating connector 501 comprises an elongated protrusion. As the connector 500 mates with the mating connector 501, the elongated protrusion 561 slides within the channel 552. During mating, the front end 561a of the elongated protrusion 561 slides past the channel 552 and makes contact with the first attachment area 510. The contact between the elongated protrusion 561 and the first attachment area 510 causes the first attachment area 510 to move within the housing 505 of the connector 500.

During mating of the connector 500 with mating connector 501, the first attachment area 510 of connector 500 is configured to move in a first direction, along arrow 590, and the light coupling unit 520 is configured to move in a second direction, along mating axis 599, which is different from the first direction 590. The first attachment area 510 of connector 501 is configured to move in an opposite direction from the first direction, along arrow 591, and the light coupling unit 540 is configured to move in a second direction, along mating axis 599, which is different direction 59. In some configurations, directions 590 and 591 are substantially orthogonal to the mating axis 599.

As shown in FIGS. 5A and 5B, the first attachment feature 510 can have a contact surface 510*a* configured to cause movement of the first attachment feature 510 during mating of the connector 500 to the mating connector 501 as the registration feature 561 of the mating 501 connector engages with the contact surface 510*a*. For example, as shown in FIG. 5A, the contact surface 510*a* can be a ramp. The first attachment feature 510 can also include a stop feature 510*b* configured to limit movement of the registration feature 561 of the mating connector 501.

A compressible element 550 may be disposed within the housing 505 that applies spring force that opposes the movement of the first attachment area 510 along direction 590. In some embodiments, the compressible element is a spring. In some embodiments, the compressible element 550 is compressed or is further compressed by the movement of the first attachment area. In some embodiments, the compressible element 550 is extended or extended further by the movement of the first attachment area. The housing 505 may include one or more features 511 that extend along the first attachment area 510 along direction 590. The features 511 guide the movement of the first attachment area 510 and/or stabilize the first attachment area 510 within the housing 505.

In some embodiments, the housing 505 includes at least one guide 541 arranged to prevent or at least limit the light coupling unit 540 from rotating within the housing 505. The at least one guide 541 does not prevent the light coupling unit 540 from moving translationally, e.g., along axis 599, within the housing 505. For example, the at least one guide can be disposed adjacent to and facing at least one of a top and bottom major surface 520*a*, 520*b* of the light coupling unit 520.

According to some implementations, the housing 505 includes a pair of guides 541, 542, one on each side of the light coupling unit 520. One guide 541 may be disposed adjacent to and facing a top major surface 520*a* of the light coupling unit 520, and the other guide 542 in the pair of guides is disposed adjacent to and facing a bottom major surface 520*b* of the light coupling unite 520. The pair of guides 541, 542 prevent or at least limit rotation of the light coupling unit 520 within the housing 505 but do not substantially restrict the light coupling unit 520 from moving translationally within the housing 505.

Figure 6A:
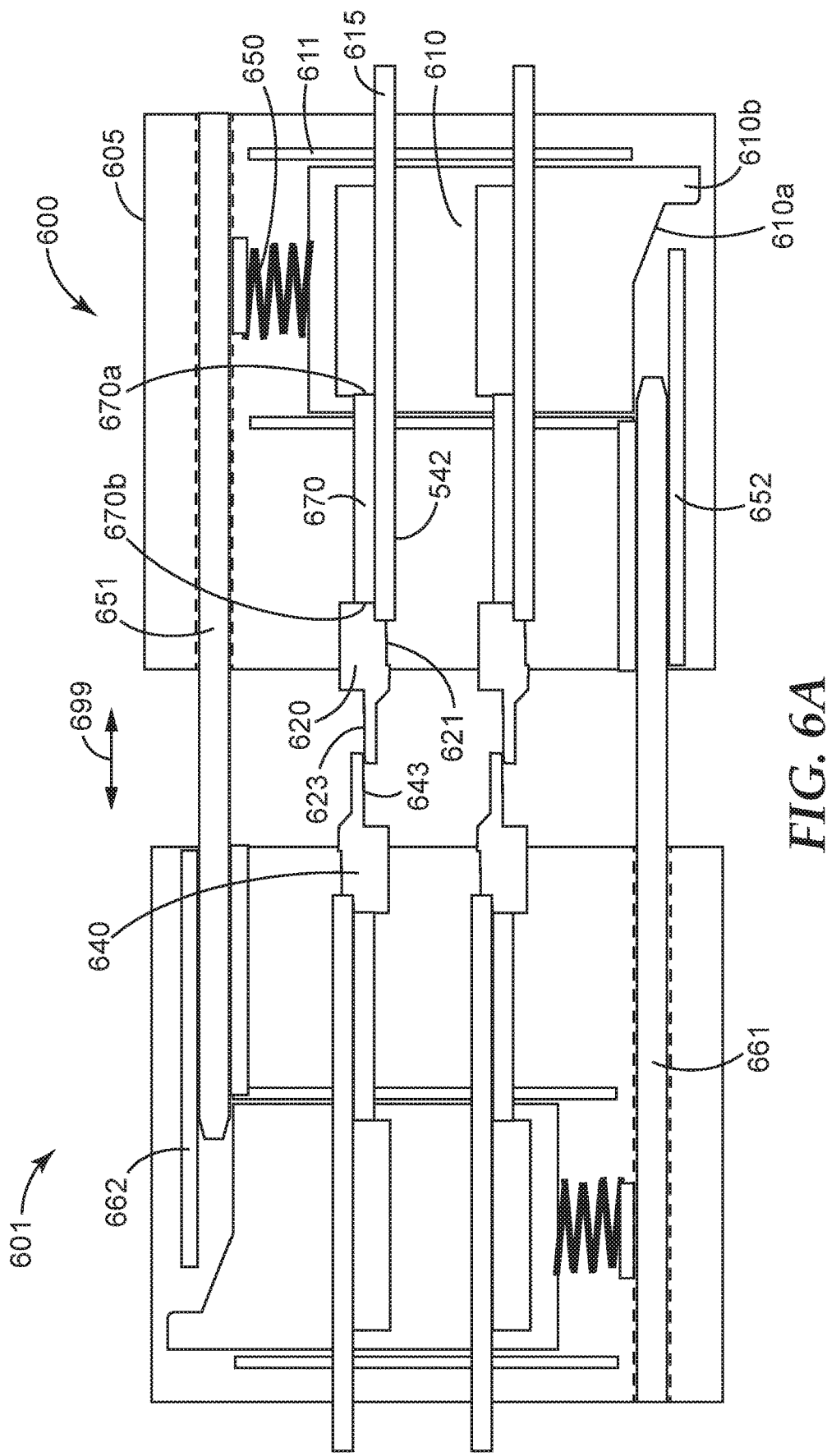
FIGS. 6A and 6B show an unmated and mated optical connector, respectively, that includes a flexible carrier according to some embodiments.
Figure 6B:
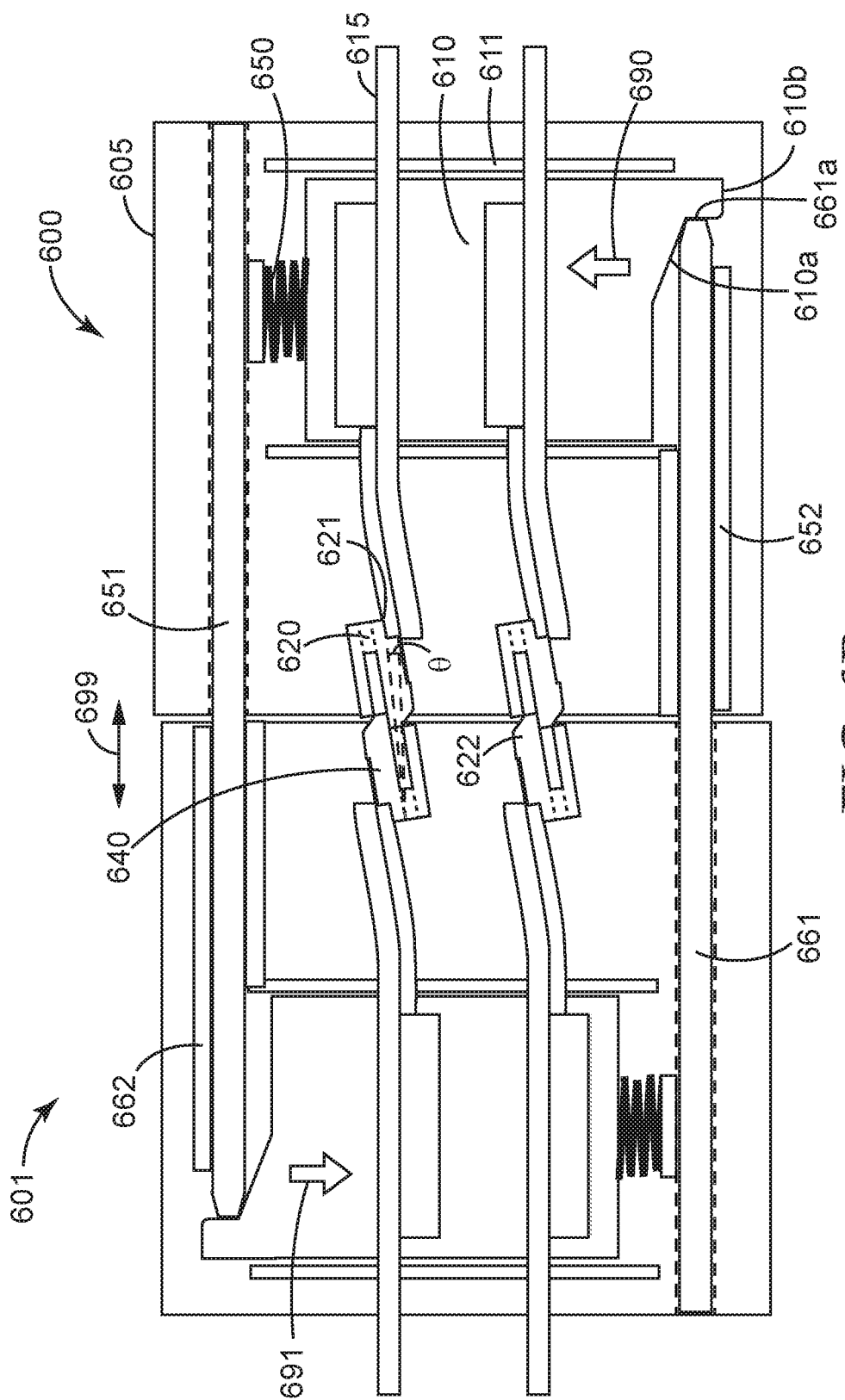

As shown in FIGS. 6A and 6B, some embodiments include a flexible carrier 670 configured to adhere to and support the optical waveguide. FIGS. 6A and 6B respectively show connector 600 during mating and after mating with mating connector 601. In embodiments that include a flexible carrier, rotational movement of the light coupling unit may not be restricted such as by guides 541, 542 shown in FIG. 5A. The connector 600 includes a first attachment area 610 configured to receive and permanently attach to an optical waveguide 615 and a second attachment area 621 configured to receive and permanently attach to the optical waveguide 615 received and permanently attached at the first attachment area 610. A flexible carrier 670 is disposed within the housing 605 between the first and second attachment areas 610, 621 for supporting and adhering to the optical waveguide 615. A first end 671*a* of the flexible carrier 671 may be attached to the first attachment area 610 and a second end 671*b* of the flexible carrier 671 may be attached to the second attachment area 621.

According to some aspects, when the connector 600 is unmated and the optical waveguide 615 is received and permanently attached at the first and second attachment areas 610, 621, the flexible carrier 670 and the optical waveguide 615 are substantially unbent between the first and second attachment areas 610, 621. During mating, the flexible carrier 670 bends, causing the optical waveguide 615 to also bend.

According to some aspects, when the connector 600 is unmated and the optical waveguide 615 is received and permanently attached at the first and second attachment areas 610, 621, the flexible carrier 670 and the optical waveguide 615 are bent between the first and second attachment areas 610, 621. During mating, the flexible carrier 670 bends further, causing the optical waveguide 615 to also bend further. The flexible carrier 670 is less flexible when unbent or when initially bent and is more flexible when bent or bent further.

Connector 600 also includes a light coupling unit 620 disposed and configured to move within the housing 605. The light coupling unit 620 comprises the second attachment area 621 for receiving and permanently attaching to the optical waveguide received and permanently attached at the first attachment area 610. The light coupling unit also includes a light redirecting surface 622 configured such that when the optical waveguide 615 is received and permanently attached at the first and second attachment areas 610, 621, the light redirecting surface 622 receives and redirects light from the optical waveguide 615. The flexible carrier 670 and optical waveguide 615 limit, but do not prevent, movement of the light coupling unit 620 within the housing 605.

When connector 600 mates with mating connector 601, the flexible carrier 670 is configured to bend or to bend further, which causes the optical waveguide 615 to bend or bend further. The bending or further bending of the optical waveguide 615 causes the light coupling unit 620 to rotate within the connector housing 605. Mating of the light coupling unit 620 with a mating light coupling unit 640 of the mating connector 601 causes the flexible carrier 670 and the optical waveguide 615 to bend or bend further between the first 610 and second 621 attachment areas. After the mating, the flexible carrier 670 and the optical waveguide 615 apply spring force to the light coupling unit 620 that prevents the light coupling unit 620 from unmating from the mating light coupling unit 640. After the connector 600 mates with a mating connector 601, mating surfaces of the light coupling unit and a mating light coupling unit are disposed at an angle, $\theta$, with respect to a mating axis 699 of the connector 605.

In some embodiments, and as illustrated by FIGS. 6A and 6B, the first attachment area 610 can be configured to move within the housing 605. When the optical waveguide 615 is received and permanently attached at the first 610 and second 621 attachment areas, a mating of the light coupling unit 620 with the mating light coupling unit 640 of the mating connector 601 is configured to cause: 1) the first attachment area 610 to move within the housing 605; 2) the flexible carrier 670 to bend or bend further; 3) the optical waveguide 615 to bend or bend further; and 4) the light coupling unit 620 to move at least rotationally within the housing 605. After mating, a spring force is applied to the light coupling unit 620 by virtue of the bend in the flexible carrier 670 and the bend in the optical waveguide 615. The spring force assists in preventing the light coupling unit 620 from unmating from the mating light coupling unit 640.

During mating, the first attachment area 610 moves in a direction substantially perpendicular to the mating axis 699 of the connector 600. The first attachment area 610 is configured to move in a first direction, e.g., as indicated by arrow 690 in FIG. 6B, and the second attachment area 621 moves in a different direction which may be orthogonal to the direction of movement of the first attachment area 610.

As previously discussed in conjunction with FIGS. 5A and 5B, the connector may comprise first and second registration features 651, 652 that are compatible with first and second mating registration features 661, 662 of the mating connector 601. The first mating registration feature 661 of the mating connector 601 can engage with a contact surface 610a of the first attachment area 610. Engagement between the first mating registration feature 661 and the contact surface 610a applies a force to the first attachment area 610, causing the first attachment area 610 to move within the housing 605 along the direction 590. In some configurations, the first registration features 651, 661 of the connectors 600, 601 are or include elongated protrusions and the second registration features 652, 662 are or include elongated channels. As the connector 600 mates with the mating connector 601, the elongated protrusion 661 of the mating connector 601 slides within the elongated channel 652 of the connector 600. A front end 661a of the elongated protrusion 661 slides past the channel 652 and makes contact with the contact area 610a of the first attachment area 610. For example, the contact surface 610a may be or include a ramp. The first attachment feature 610 includes a stop feature 610b configured to limit movement of the mating registration feature 661 of the mating connector 601.

According to some aspects, the connector 600 may include at least one compressible element 650 arranged so that movement of the first attachment area 610 causes the compressible element 650 to apply spring force in a direction opposing a direction of movement 690 of the first attachment area 610. For example, the compressible element 650 can include a spring that is compressed or extended by movement of the first attachment area 610. The housing can include a guide 611 that extends along the first attachment region 610 configured to guide the movement of the first attachment region along direction 690.

Figure 7A:
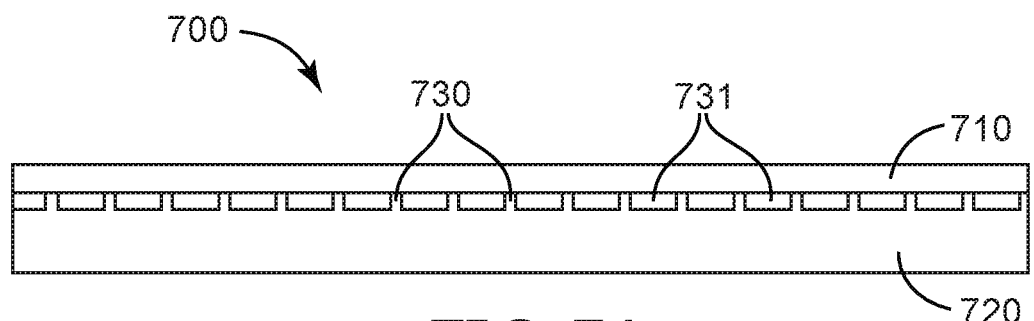
FIGS. 7A and 7B show side views of an unbent and bent flexible carrier, respectively, according to some embodiments.
Figure 7B:
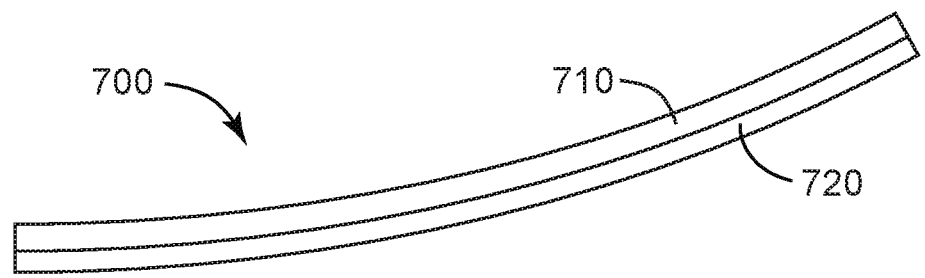
Figure 7C:
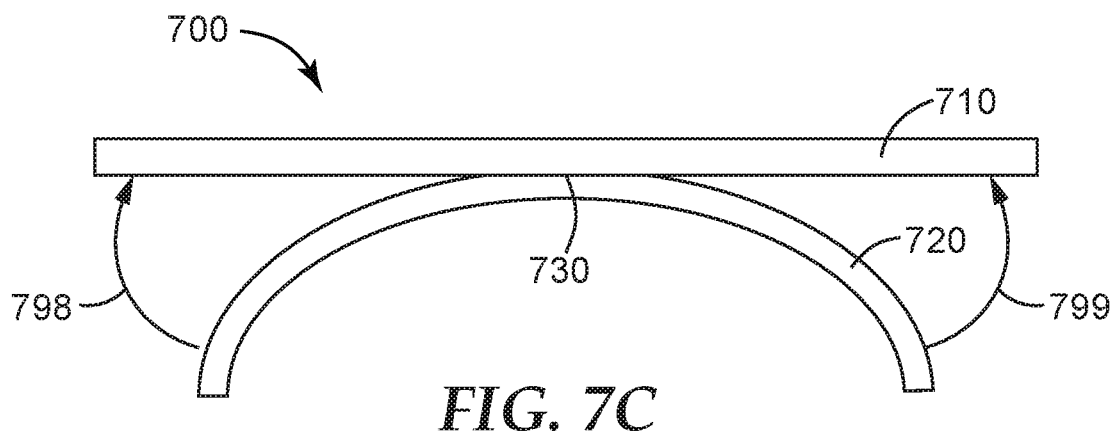
FIGS. 7C and 7D show cross sectional views of the unbent and bent flexible carrier, respectively, of FIGS. 7A and 7B.
Figure 7D:
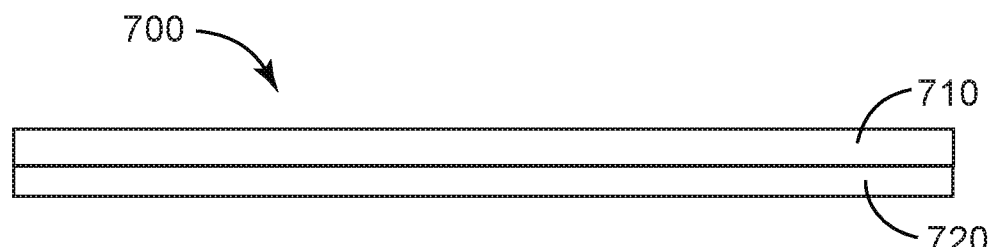

FIGS. 7A-7D illustrate additional details of a flexible carrier configured for controlling the bend force as a function of the degree of bending in accordance with some embodiments. FIG. 7A shows a side view and FIG. 7C shows an end lateral cross sectional view of an unbent flexible carrier 700. FIGS. 7B and 7D show side and lateral cross sectional views, respectively, of the flexible carrier 700 after it is bent.

The flexible carrier 700 includes a flexible first portion 710 for supporting and adhering to an optical waveguide (not shown in FIGS. 7A-7D) and a flexible second portion 720 attached to the flexible first portion 710 at one or more discrete spaced apart attachment locations 730. One or more gaps 731 may be defined between the one or more discrete spaced apart attachment locations 730 and the flexible first 710 and second 720 portions. In some configurations, the least one attachment location 730 extends along substantially an entire length of the flexible carrier 700.

When bent along a length of the flexible carrier 700, as shown in FIGS. 7C and 7D, the flexible first portion 710 is more flexible than the flexible second portion 720. The first and/or second portions may be or comprise one or more of spring steel, other metal alloy springs, thermoplastic polymers, thermoset polymers, and polymer-inorganic composites, for example.

Figure 8:
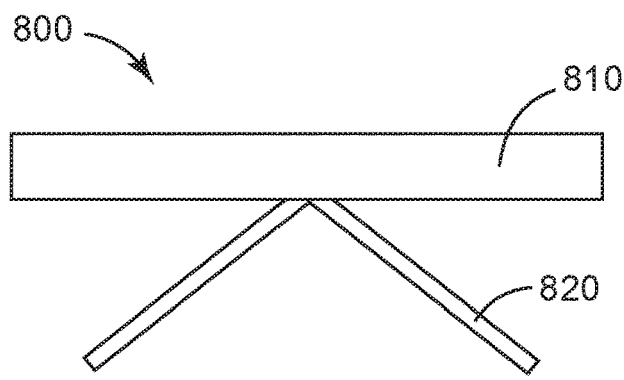
FIGS. 8-11 show cross sectional views of various flexible carrier configurations.
Figure 9:
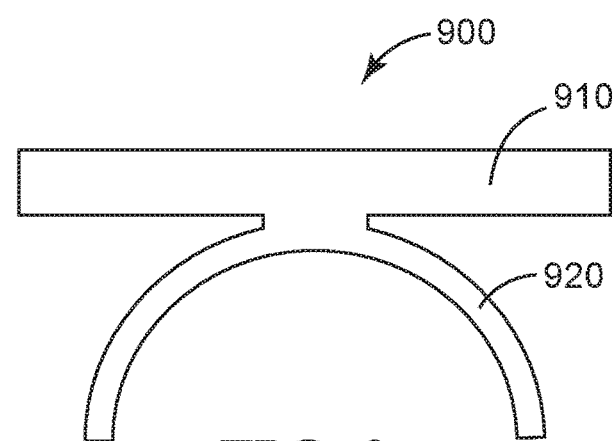
Figure 10:
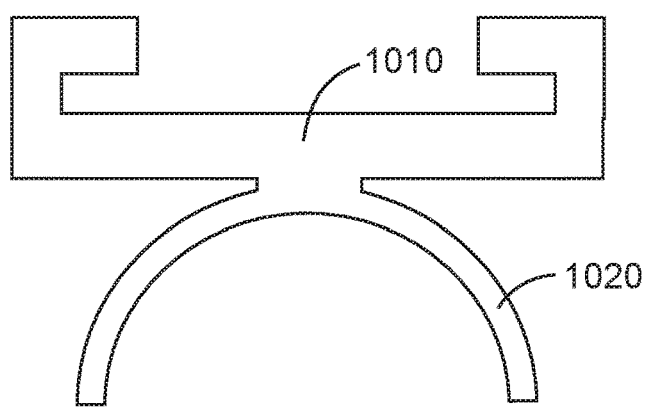
Figure 11:
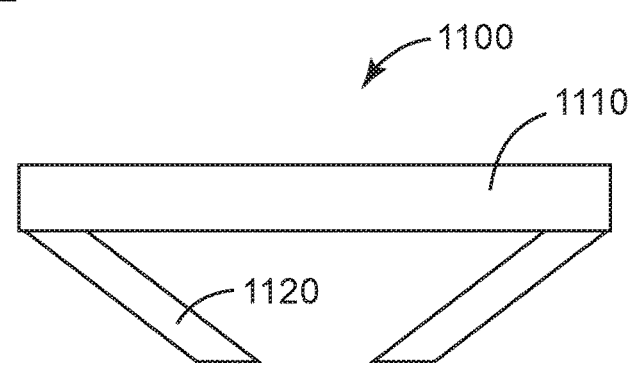

As the flexible carrier 700 is bent along a length of the flexible carrier 700, the flexible second portion 720 may collapse onto the flexible first portion 710. As shown in FIG. 7C, the flexible first portion 710 has a first lateral cross-sectional profile and the flexible second portion 720 has a different second lateral cross-sectional profile. As the flexible second portion 720 collapses onto the flexible first portion 710, the lateral cross-sectional profile of the flexible second portion 720 changes from the second lateral cross-sectional profile to the first lateral cross-sectional profile. For example, the second lateral cross-sectional profile may be semicircular as shown in FIG. 7C, FIG. 9 and FIG. 10 or angled as shown in FIG. 8, FIG. 11, and FIG. 12.

For example, as best seen in FIG. 7C, when unbent, the flexible first portion 710 has a substantially planar lateral cross-sectional profile and the flexible second portion 720 has a substantially non-planar lateral cross-sectional profile. As the flexible carrier 700 is bent along a length of the flexible carrier 700, a lateral cross-sectional profile of the flexible second portion 720 changes from a substantially non-planar profile (as shown in FIG. 7C) to a substantially planar profile (as shown in FIG. 7D. The flexible second portion 720 can be less flexible when having a substantially non-planar lateral cross-sectional profile and more flexible when having a substantially planar lateral cross-sectional profile.

For some configurations, the flexible second portion 720 is attached to the flexible first portion 710 at an attachment location 730. As the flexible second portion 720 collapses onto the flexible first portion 710, the flexible second portion 720 rotates about the attachment location 730. The direction of rotation is indicated by arrows 798 and 799 in FIG. 7C.

FIGS. 8 through 11 show cross sectional profiles of flexible carriers 800, 900, 1000, 1100 in accordance with various implementations. Each of the flexible carriers 800, 900, 1000, 1100 include a flexible second portion 820, 920, 1020, 1120 attached to a flexible first portion 810, 910, 1010, 1110 for supporting and adhering to an optical waveguide. For each of the flexible carriers 800, 900, 1100, when unbent, a majority of flexible first portion 810, 910, 1010 1110 has a substantially planar lateral cross-sectional profile and a majority of flexible second portion 810, 910, 1010, 1110 has a substantially non-planar lateral cross-sectional profile. As the flexible carrier 800, 900, 1000, 1100 is bent along a length of the flexible carrier 800, 900, 1000, 1100, a lateral cross-sectional profile of the flexible second portion 812, 920, 1020, 1120 changes from a substantially non-planar profile (as shown in FIG. 7C) to a substantially planar profile (as shown in FIG. 7D. The flexible second portion 820, 920, 1020, 1120 can be less flexible when having a substantially non-planar lateral cross-sectional profile and more flexible when having a substantially planar lateral cross-sectional profile. After bending, each of the flexible first and second portions has a substantially planar cross-sectional profile.

In some embodiments, as illustrated by FIG. 12, a flexible carrier 1200 includes a flexible first portion 1210 for supporting and adhering to an optical waveguide and a flexible bottom portion 1220. The flexible carrier 1200 is configured so that as the flexible carrier 1200 is bent along a length of the flexible carrier 1210, the flexible first 1210 and second 1220 portions slide with respect to each other along the length of the flexible carrier 1200.

Figure 12A:
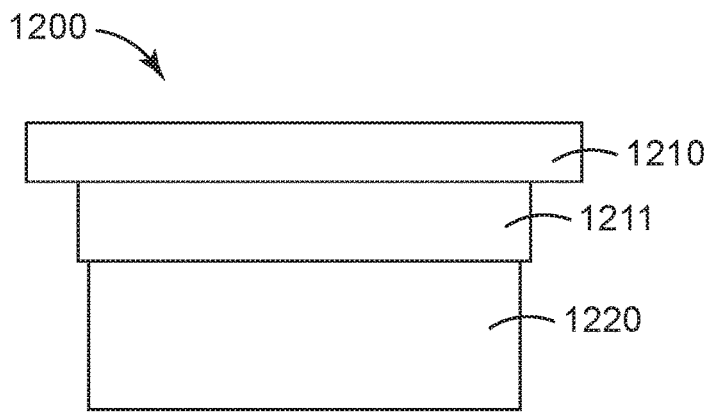
FIGS. 12A and 12B show side views of an unbent and bent flexible carrier, respectively, in accordance with some embodiments.
Figure 12B:
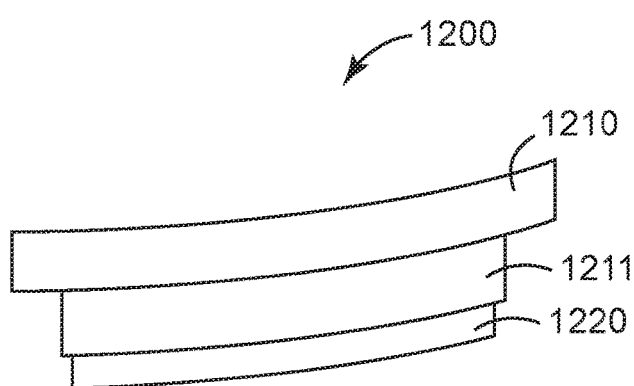
Figure 12C:
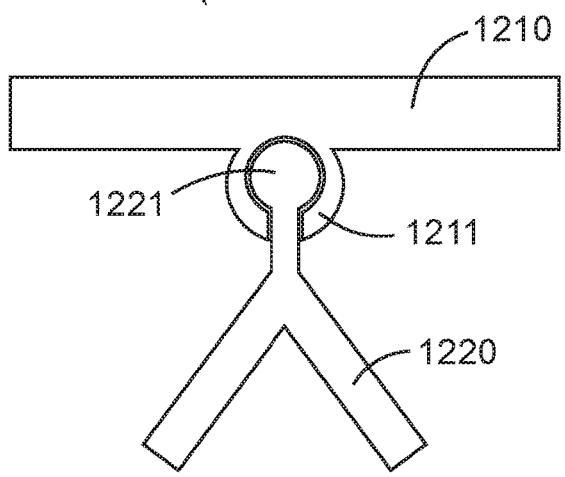
FIGS. 12C and 12D show cross sectional views of the unbent and bent flexible carrier, respectively, illustrated in FIGS. 12A and 12B.
Figure 12D:
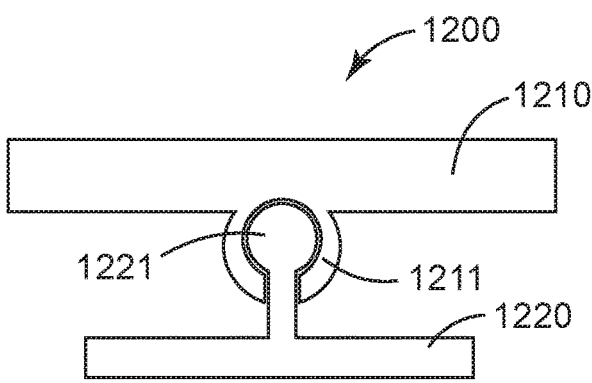

FIGS. 12A-12D illustrate additional details of a flexible carrier in accordance with some embodiments. FIG. 12A shows a side view and FIG. 12C shows an end lateral cross sectional view of an unbent flexible carrier 1200. FIGS. 12B and 12D show side and lateral cross sectional views, respectively, of the flexible carrier 1200 after it is bent. As shown in FIGS. 12A-12D, the flexible top portion 1210 and the flexible bottom portion 1220 include a knob 1221 (or rod) and socket 1211 coupling with sufficient clearance between the ball and socket to allow the flexible bottom portion 1220 to slip relative to the flexible top portion 1210 during the bending. In some configurations, the flexible carrier may include multiple ball/rod and socket couplings extending along the lengths of the first and second flexible portions 1210, 1220.

As the flexible carrier 1200 is bent along a length of the flexible carrier 1200, the flexible second portion 1220 collapses onto the flexible first portion 1210. As shown in FIG. 12C, when unbent, the flexible first portion 1210 has a first lateral cross-sectional profile and the flexible second portion 1220 has a different second lateral cross-sectional profile. As the flexible second portion 1220 collapses onto the flexible first portion 1210 and slips along the flexible first portion, the lateral cross-sectional profile of the flexible second portion 1220 changes from the unbent lateral cross-sectional profile shown in FIG. 12C to the bent lateral cross-sectional profile as shown in FIG. 12D.

In addition to the ability of the flexible carrier to control the bend force as a function of the degree of bending, the flexible carrier can provide other functions. The optical fibers or waveguides discussed herein may include a core with cladding around the core, a buffer coating over the cladding, and a jacket around the coatings of multiple individual fibers. The jacket binds the individual fibers into a fiber cable, such as a fiber ribbon cable. The core and cladding may be glass, and the coating and jacket may be or comprise a polymeric material. The coating and jacket can contribute significantly to the force required to bend the fiber ribbon cable. Furthermore, if the waveguides extend between the first and second attachment areas are fibers with polymer buffer or jacketing, the elastic properties of the waveguide may change over time as the buffer and/or jacket become brittle due to aging, especially at high temperature. Additionally, if the fiber cable is held in a pre-bent position for a long time, the coatings may "self-anneal," gradually contributing less to the bending force of the fiber cable. Thus, the bending force of the fiber-buffer-jacket assembly may vary over time, causing variations in connector performance. This effect can be reduced by the proper choice of the materials and design for the flexible carrier. For example, one or more of the flexible portions 710 and 720 of the flexible carrier 700 shown in FIGS. 7A-7D can be fabricated from a very stable material such as spring steel, whose bending force dominates that of the cable, thereby reducing variation of the total bending force (fiber cable+flexible carrier).

In one implementation, the first flexible portion 710 of the flexible carrier 700 shown in FIG. 7C may be made from a flat piece of spring steel, and the second flexible portion 720 from a curved piece of spring steel (much like a typical steel measuring tape). For a 12-fiber optical ribbon cable 1 cm long with buffer and jacket, the bending force is approximately $6.5 \times 10^4$ dynes/cm of end deflection. For the flexible carrier to dominate this force, the carrier should be designed to have a deflection force of around $6.5 \times 10^5$ dynes/cm.

For some coating and/or jacket materials, pre-annealing the fiber ribbon cables (with or without a flexible carrier) in a pre-bent configuration serves to decrease the changes that occur over time in the force required for bending. In contrast, the glass core and cladding is much more stable with time and the force required for bending the glass core and cladding may not change significantly over time. In some scenarios, pre-annealing the fiber cables serves to shift the force required to maintain a bend in the fiber ribbon cable from being predominantly dependent on the coating and/or jacket, to being predominantly dependent on the waveguide core. Consequently, the force required to further bend the cable is decreased and the spring force of the cable is controlled and is made more stable over time by the annealing. For example, in some scenarios, the fiber cable can be installed in the connector in a pre-bent configuration, wherein the pre-bending is the same or about the same as the bending that occurs when two connectors are mated. Before use, the fiber cable is annealed at temperature in the pre-bent configuration. Annealing in the pre-bent configuration can decrease the spring force contribution due to the coating and jacket to less than about 50%, less than about 40%, or even less than about 30% of the total spring force applied to the light coupling unit by the optical fiber cable in when the connector is mated with a mating connector. After annealing, the glass core and cladding of the fiber can apply more than about 50%, more than about 75%, more than about 90% or even more than about 99% of the spring force applied to the light coupling unit by the optical fiber cable when the connector is mated with a mating connector. Vibration and/or mechanical shock to the connector may cause vibration and/or movement of the light coupling unit and the optical fiber cable (which are collectively referred to herein as fiber-ferrule combination). One issue associated with the use of the force from the waveguides or fibers to control the motion of light coupling unit is the possibility of unwanted motion of the light coupling unit due to vibration or shock applied to the connector.

To reduce vibrations and/or to control the vibrational resonant frequency of the fiber-ferrule combination, the flexible first portion or the flexible second portion of a flexible carrier can be or comprise a vibration dissipating material. In some implementations, the vibration dissipating material can be selected to decrease the amplitude of vibrations induced in the fiber-ferrule combination and/or to change the resonant frequency of the fiber-ferrule combination when compared to a fiber-ferrule combination without the vibration dissipating material.

In one exemplary embodiment of the connector shown in FIGS. 6A and 6B, the optical waveguide 615 is a 12-fiber ribbon cable, whose length between the first and second attachment areas is 1 cm. With the light coupling unit 640 mounted on the end, the resonant vibration frequency of the assembly is about 200 Hz. For some applications, connectors experience vibrations in the range of 20 Hz to 2000 Hz. Therefore, dissipating vibrational energy and avoiding resonance in this frequency range reduces the possibility of the build-up of a potentially destructive resonant vibrational amplitude. One approach to achieve dissipation of vibrational energy is to fabricate the flexible carrier from a material that has a large visco-elastic loss peak near the resonant frequency and operating temperature. This can be implemented by fabricating the flexible carrier using a polymeric material with a glass transition temperature, Tg, near the operating temperature (80 C in the case of many dense communications systems). In the case of the fiber-ferrule combination having a flexible carrier as shown in FIGS. 7A-7D, for example, at least a portion of either the flexible first portion, 710, the flexible second portion, 720, or both, may be fabricated of such a polymeric material. Examples of classes of polymeric materials suitable for this application include thermoplastic elastomers, block co-polymers, and composite materials.

In some cases, the fiber-ferrule combination including the flexible carrier having the vibration dissipating material may have a resonant frequency greater than about 2,000 Hz. In some cases, the addition of the vibration dissipating material to a fiber-ferrule combination shifts the resonant frequency of the fiber-ferrule combination from less than about 2,000 Hz to a resonant frequency greater than about 2,000 Hz.

To render the connector resistant to shock, the fiber-ferrule combination may be configured to resist rapid bending, but to still conform easily for slow bending. Resistance to rapid bending and compliance to slow bending can be achieved by fabricating the flexible carrier at least partly of a visco-elastic polymer material that has a strong viscous character to its deformation vs. stress characteristics. The deformation of the viscoelastic polymer is dependent on the rate of deformation which causes the viscoelastic material to become stiffer when subjected to a sheer force, for example. Again, the polymer should be used at a temperature near its Tg to achieve sufficient visco-elastic effect. Examples of classes of materials that can be suitable for this application include thermoplastics such as urethanes, olefins, acrylates, and ring-opening metathesis polymers. A specific example of a material exhibiting this kind of behavior is DiARY MM3520 (SMP Technologies, Tokyo, Japan), which is a commercially-available thermoplastic polyurethane. At an ambient temperature of 29 C and a stress rate of 15 N/min, the measured modulus of the sample is 2.5 times higher than the modulus at a stress rate of 0.5 N/min. In a shock resistant version of the connector, a flexible carrier is used, such as the flexible carrier illustrated in FIGS. 7A-7D, wherein at least a portion of either the flexible first portion, 710, or the flexible second portion, 720, of the flexible carrier, or both, may be fabricated of such a polymeric material.

For the connector of FIGS. 6A and 6B, for the case where the waveguide consists of a 12-fiber cable with buffer and jacket, the force applied normal to the fiber axis at the fiber end to cause the end of a 1 cm long piece of cable to deflect by 1 mm is $4.9 \times 10^3$ dynes. This corresponds to a bending moment of $4.9 \times 10^3$ dyne cm.

In some embodiments, an attached flexible carrier can have a significant effect on the bending of the structure. In these embodiments, the bending force associated with the carrier is comparable to, or greater than, that for the cable. In order for the carrier to have no effect on the bending, then the bending force contributed by the flexible carrier would be small compared to that contributed by the fiber cable.

In some embodiments, the flexible carrier contributes to some function of the flexible carrier (e.g. damping or shock suppression), but does not significantly affect the bending force. In these embodiments, the bending force of the flexible carrier (that is, the addition to the bending force of the fiber cable) would be significantly less than that of the cable.

In some embodiments, the flexible carrier is used to significantly stiffen the fiber cable until a certain degree of bending is accomplished. In these embodiment, the bending force required to initially bend the cable and carrier assembly should be significantly larger than to bend the cable alone, and once the cable and carrier assembly is bent past a specified deflection, the force should be comparable to that for the cable alone. In the case of the 1 cm length of 12-fiber cable described above, this functionality can be achieved by having the flexible first portion of the flexible carrier have a very low bending force, $<<4.9 \times 10^3$ dynes per 1 mm deflection, and the flexible second portion have a bending force of $>>4.9 \times 10^3$ dynes per 1 mm deflection for small deflections less than a threshold value of the deflection, then $4.9 \times 10^3$ dynes per 1 mm deflection, or less, for deflections larger than the threshold deflection, e.g. 1 mm.

Figure 13:
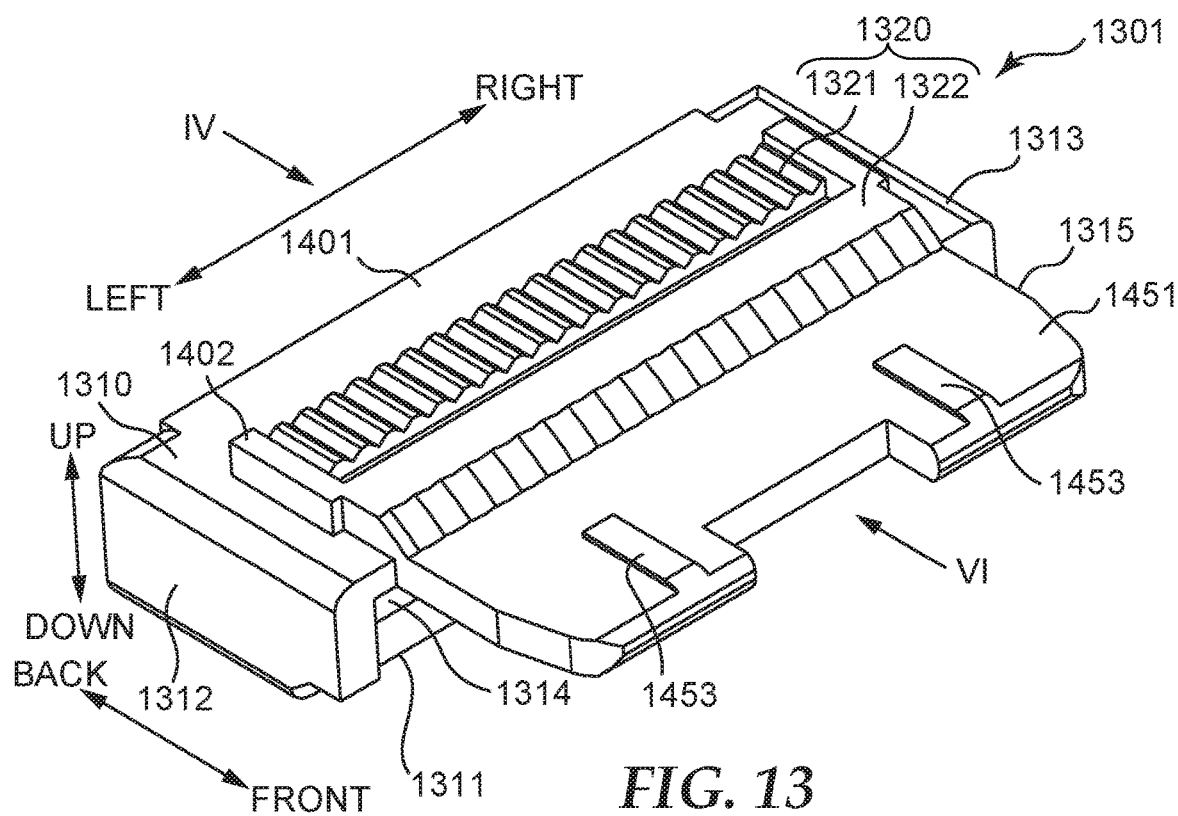
FIG. 13 is a perspective view illustrating a configuration of an optical ferrule according to an embodiment of the disclosure.
Figure 14:
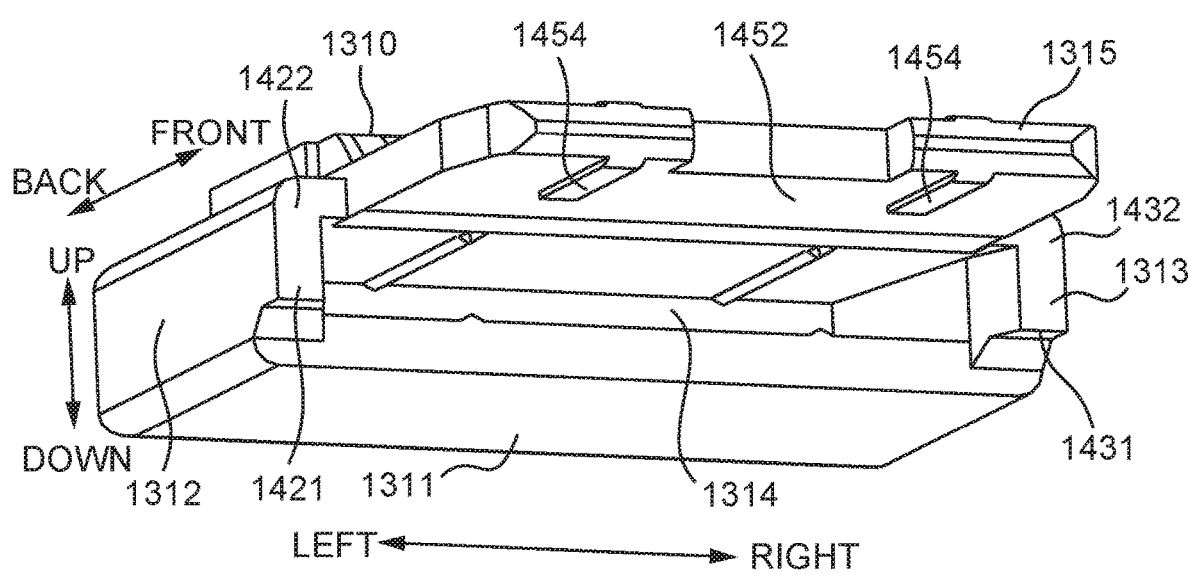
FIG. 14 is a perspective view illustrating a configuration of an optical ferrule according to an embodiment of the disclosure.
Figure 15:
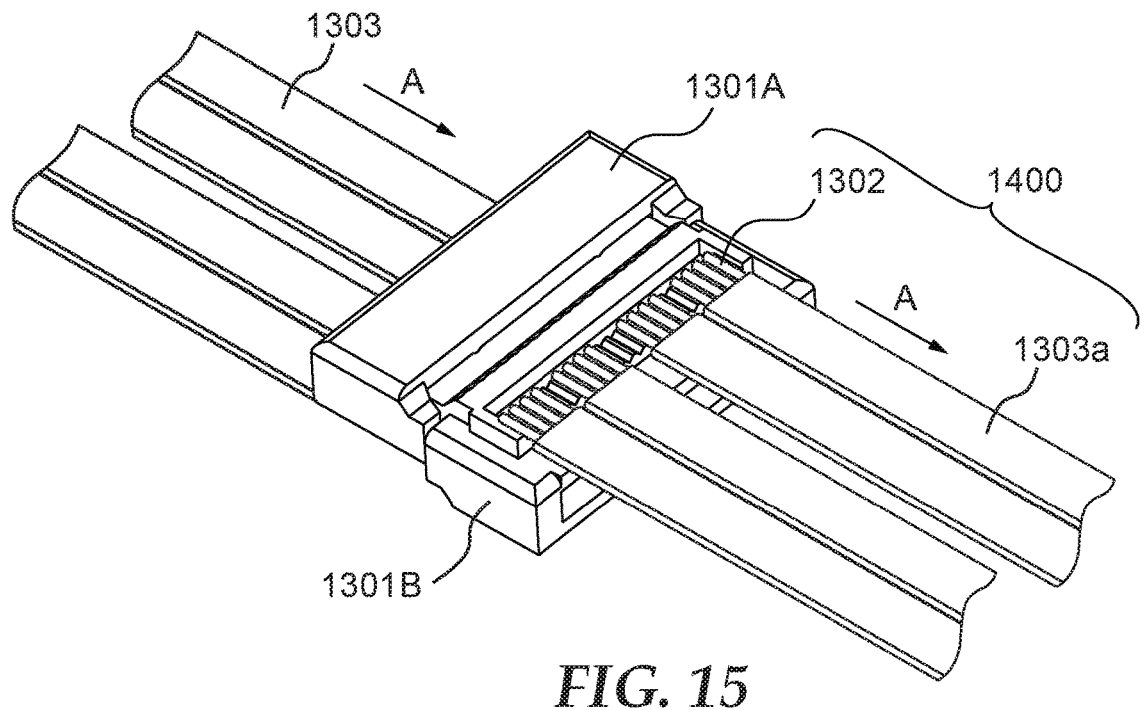
FIG. 15 is a perspective view illustrating an example of applying of an optical ferrule according to an embodiment of the disclosure.

FIGS. 13 through 40 provide additional illustrations of optical connectors and components thereof in accordance with various embodiments. An optical ferrule (also referred to herein as a light coupling unit) according to an embodiment of the present disclosure is described below while referring to FIG. 13 through FIG. 20. FIGS. 13 and 14 are perspective views illustrating a configuration of an optical ferrule 1301 according to an embodiment of the disclosure, and FIG. 15 is a perspective view illustrating an example of using the optical ferrule 1301. Note that FIG. 15 illustrates a mated state of a pair of optical ferrules 1301 (1301A and 1301B). The pair of optical ferrules 1301A and 1301B have the same shape, and the optical ferrule 1301 is a male-female unit (hermaphroditic) in the present embodiment.

As illustrated in FIG. 15, the end parts of a plurality of optical fibers 1302 each exposed from a fiber ribbon 1303 (which is a ribbon cable including a plurality of optical waveguides) are fixed to the pair of optical ferrules 1301A and 1301B, and the tip parts of the plurality of optical fibers 1302 (also referred to herein as optical waveguides) are aligned and connected to each other by the pair of optical ferrules 1301A and 1301B. Thereby, light is transmitted in the direction of arrow A of FIG. 15 through the first ferrule 1301A on the incoming light side and the second ferrule 1301B on the outgoing light side. Note that below, the front-back direction (length direction), the left-right direction (width direction), and the vertical direction (thickness direction) are defined as illustrated in FIGS. 13 and 14, and the configuration of each part is described in accordance with these definitions as a matter of convenience. The front-back direction is the direction in which the optical fiber 1302 extends, and the left-right direction is the direction in which the plurality of optical fibers 1302 are arranged in parallel.

The optical fiber 1302 has a core and cladding, and assumes a cylindrical shape with a predetermined outer diameter (for example, 125 μm). An ultraviolet curing resin (UV resin) or the like is coated on the circumference of the optical fiber 1302, and thus a fiber wire 1302a with a predetermined outer diameter (for example, 250 μm) is configured. The fiber ribbon 1303 is formed by aligning the plurality of optical fiber wires 1302a and then coating the entire circumference thereof with UV resin or the like, and in FIG. 15, the fiber ribbon 1303a has four optical fiber wires 1302 arranged in four rows in the width direction. Note that the assembly of the optical ferrule 1301 and the fiber ribbon 1303 including the optical fiber 1302 and optical fiber wires 1302a is also referred to herein as an optical fiber unit 1400.

As illustrated in FIGS. 13 and 14, the optical ferrule 1301 has an upper wall 1310, a bottom wall 1311 on the opposite side of the upper wall 1310, and a pair of side walls 1312 and 1313 on the left and right, facing each other and connecting the upper wall 1310 and the bottom wall 1311, and the entire body assumes a symmetrical shape. A rectangular guide opening 1314 passing through in the front-back direction is formed on the inside of the upper wall 1310, bottom wall 1311, and side walls 1312 and 1313. A guide part 1315 that extends forward from the front end part of the guide opening 1314 is provided on the upper wall 1310, and an optical fiber coupler 1320 is provided on the upper surface of the upper wall 1310.

Figure 16:
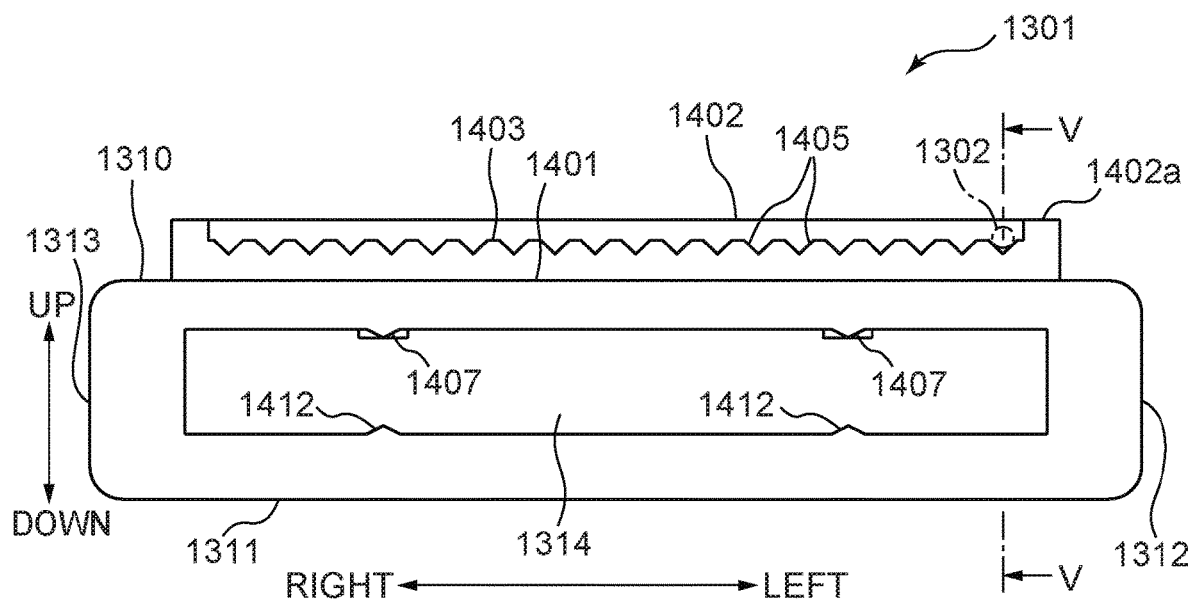
FIG. 16 is a view in the direction of arrow IV in FIG. 13.
Figure 17:
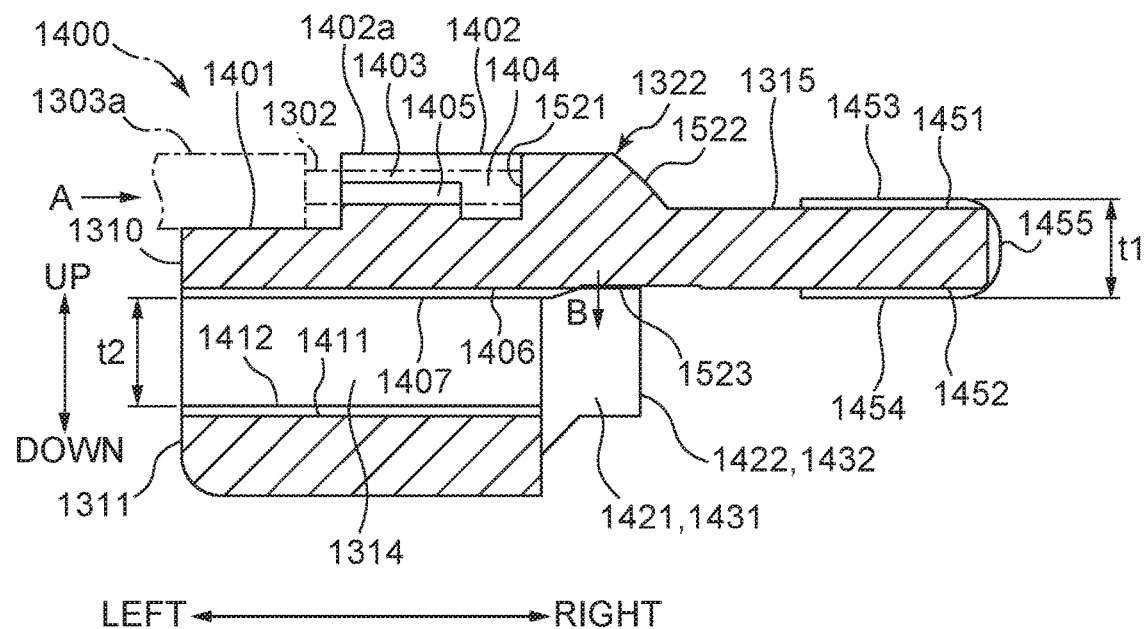
FIG. 17 is a cross-section view cut along line V-V in FIG. 16.

The optical fiber coupler 1320 has an alignment part 1321 that serves as a part of the second attachment area. The alignment part 1321 aligns and holds the optical fibers 1302. The optical fiber coupler 1320 also includes a light direction converter 1322 which is also referred to as a light directing surface. FIG. 16 is a view in the direction of arrow IV in FIG. 13, and FIG. 17 is a cross-sectional view cut along line V-V in FIG. 16. As illustrated in FIGS. 16 and 17, an expanded part 1402 that is wide in the left-right direction from the center portion in the front-back direction to the front end part is provided on an upper surface 1401 of the upper wall 1310. A first groove part 1403 of a predetermined depth is provided on the rear end part of the expanded part 1402, and a second groove part 1404 that is deeper than the first groove part 1403 is provided in front of the first groove part 1403. The light direction converter 1322 is provided in front of the second groove part 1404.

V grooves 1405 in the same quantity as the optical fibers 1302 are formed in the left-right direction at equal intervals on the bottom surface of the first groove part 1403. The depth of the V grooves 1405 is shallower than the depth of the second groove part 1404. The V grooves 1405 function as the alignment part 1321, and the optical fibers 1302 are positioned by the V grooves 1405. On the tip part of the fiber ribbon 1303, the coating of the fiber ribbon 1303 and the coating of the fiber wires 1302a are removed, and the optical fibers 1302 are exposed. The exposed optical fibers 1302 are placed in the V grooves 1404 in a state where the front end part thereof is in contact with the rear end surface 1521 of the light direction converter 1322. In this state, adhesive is filled around the circumference of the optical fibers 1302, and the optical fibers 1302 are fixed on the expanded part 1402 by the adhesive. In the state where the optical fibers 1303 are placed and fixed, the optical fibers 1302 are positioned lower than the upper surface 1402a of both left and right end parts of the expanded part 1402. Therefore, the maximum height of the optical fiber unit 1400 that attaches the optical fibers 1302 to the optical ferrule 1301 is regulated by the expanded part 1402.

A rear end surface 1521 of the light direction converter 1322 is a vertical surface that extends in the vertical and left-right directions, and forms an entrance surface that receives incoming light from the optical fiber 1302 arranged by aligning with the V grooves 1405, in other words, the incoming light in the direction of arrow A in FIG. 17. A slanted surface 1522 that is slanted at a predetermined angle (for example, 45 degrees) toward the front is provided on the front end part of the light direction converter 1322, and the slanted surface 1522 receives light from the entrance surface 1521 and forms a light direction converting surface that totally reflects the received light downward. A bottom surface 1523 of the light direction converter 1322 below the light direction converting surface 1522 is a flat surface that extends in the front-back and left-right directions. The bottom surface 1523 receives light from the light direction converting surface 1522 and forms an exit surface that emits the received light from the optical ferrule 1301 downward (direction of arrow B).

Note that in FIG. 15, the optical ferrule 1301 was described as a first optical ferrule 1301A (refer to FIG. 15) on the incoming light side. In contrast, with the second optical ferrule 1301B on the outgoing light side, the direction of movement is opposite from the first optical ferrule 1301A, the bottom surface 1523 of the optical ferrule 1 becomes an entrance surface, and the vertical surface 1521 forms the exit surface. The entrance surface and the exit surface are perpendicular to the incidence direction and emission direction of the light.

Figure 18:
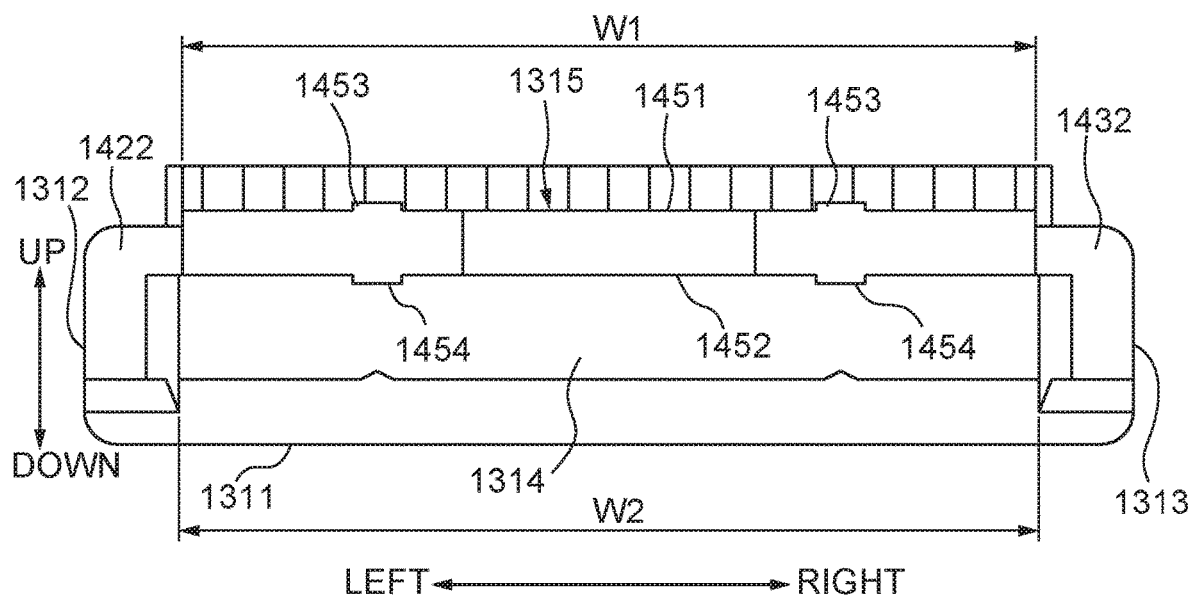
FIG. 18 is a view in the direction of arrow VI in FIG. 13.

FIG. 18 is a view in the direction of arrow VI in FIG. 13. As illustrated in FIGS. 13, 14, and 18, a left and right pair of first protruding parts 1453 and 1454 protruding upward and downward extend in the front-back direction on the upper surface 1451 and the bottom surface 1452 of the guide part 1315. The first protruding part 1453 and first protruding part 1454 are positioned in the same respective positions in the left-right direction. As illustrated in FIG. 18, the first protruding parts 1453 and 1454 assume a cross-sectional rectangular shape, and the upper surface of the first protruding part 1453 and the bottom surface of the first protruding part 1454 are both flat surfaces.

As illustrated in FIG. 17 the first protruding parts 1453 and 1454 are both formed with a predetermined length rearward from the front end part of the guide part 1315. The front end parts of the first protruding parts 1453 and 1454 are formed with a tapered shape, and a front end part 1355 of the guide part 1315 that is more forward than the first protruding parts 1453 and 1454 is also formed with a tapered shape. Therefore, the length from the upper end surface of the first protruding part 1453 to the lower end surface of the first protruding part 1454, in other words, a maximum thickness t1 of the guide part 1315 is reduced toward the front end surface of the guide part 1315.

As illustrated in FIGS. 16 and 17, a left and right pair of second protruding parts 1407 and 1412 both protruding toward the guide opening 1314 extend rearward on a bottom surface 1406 of the upper wall 1310 and an upper surface 1411 of the bottom wall 1311 rearward of the guide part 1315. The second protruding part 1407 and the second protruding part 1412 are positioned in the same respective positions in the left-right direction, and the positions in the left-right direction match with the first protruding parts 1453 and 1454. As illustrated in FIG. 16, the second protruding parts 1407 and 1412 assume a cross-sectional triangular shape, and the cross-sectional area is reduced toward the guide opening 1314.

As illustrated in FIG. 17 the second protruding part 1412 on the lower side is formed from the front end surface to the rear end surface of the bottom wall 1311. On the other hand, the second protruding part 1407 on the upper side is formed at a position more forward than the front end surface of the bottom wall 1311 and more rearward than the exit surface 1523 of the light direction converter 1322 to the rear end surface of the upper wall 1310, and the front end surface of the second protruding part 1407 is formed with a tapered shape. The length from the bottom surface of the second protruding part 1407 to the upper surface of the second protruding part 1412, in other words, a minimum thickness t2 of the guide opening 1314 is approximately equal to the maximum thickness t1 of the guide part 1315.

As illustrated in FIG. 18, a length w1 in the left-right direction of the guide part 1315 is approximately equal to a length w2 in the left-right direction of the guide opening 1314. As illustrated in FIG. 13, both left and right end surfaces of the front end part of the guide 1315 are formed with a tapered shape, and the width of the guide 1315 narrows toward the front. As illustrated in FIGS. 14 and 17, the front end parts of the side walls 1312 and 1313 protrude more forward than the bottom wall 1311, and the left and right inner wall surfaces of the protruding parts 1421 and 1431 are formed with a tapered shape. Therefore, the length of the interval between the left and right inner wall surfaces of the protruding parts 1421 and 1431 that connect to the guide opening 1314 increases toward the front. The front end surfaces of the side walls 1312 and 1313 configure vertical surfaces 1422 and 1432 that extend in the vertical and left-right directions.

The aforementioned optical ferrule 1301 can use resin having light transmissivity as a component and is integrally configured by resin molding. In other words, the optical ferrule 1301 may be configured by a single part. Therefore, the number of parts and cost can be reduced.

Figure 19A:
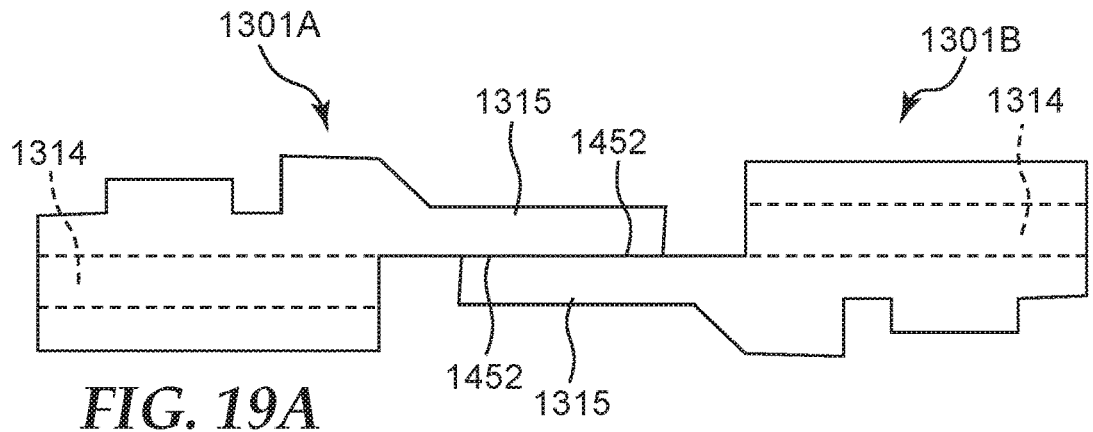
FIG. 19A is a diagram for describing the method of mating the optical ferrule according to an embodiment of the disclosure.
Figure 19B:
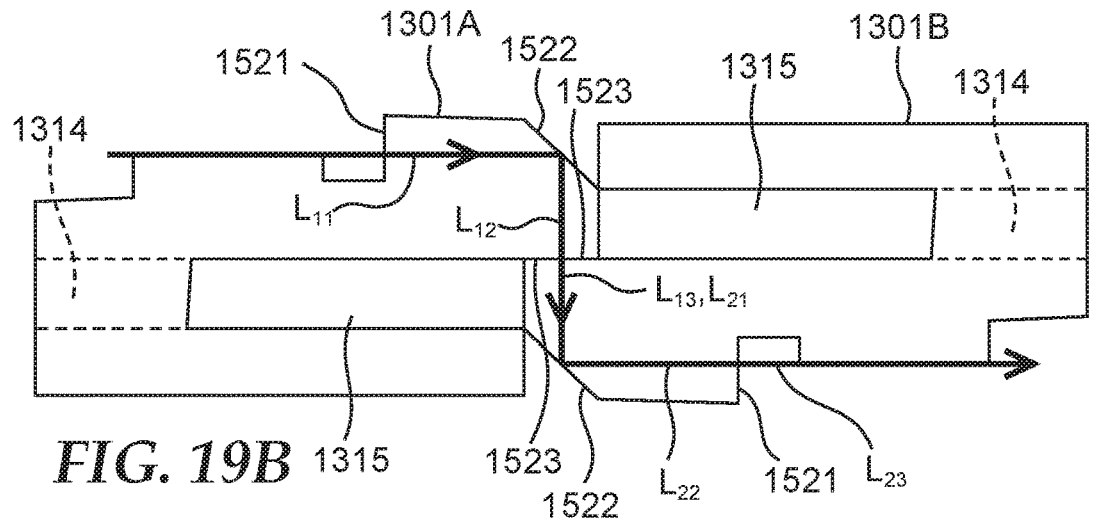
FIG. 19B is a diagram for describing the method of mating the optical ferrule according to an embodiment of the disclosure.

The mating method of the pair of optical ferrules 1301A and 1301B will be described. FIG. 19A and FIG. 19B are a diagrams for describing the mating method of the optical ferrules 1301A and 1301B. Note that the optical ferrules 1301A and 1301B are mated in a state where the plurality of optical fibers 1302 are fixed to each of the optical ferrules 1301A and 1301B in advance, but in FIGS. 19A and 19B, an illustration of the optical fibers 1302 is omitted.

First, as illustrated in FIG. 19A, the second optical ferrule 1301B is inverted in the vertical direction relative to the first optical ferrule 1301A, and the bottom surface 1452 of the guide part 1315 of the first optical ferrule 1301A and the bottom surface 1452 of the guide part 1315 of the second optical ferrule 1301B come into mutual contact. Next, while the guide part 1315 of the second optical ferrule 1301B slides in the length direction along the guide part 1315 of the first optical ferrule 1301A, the guide part 1315 of the second optical ferrule 1301B is inserted into the guide opening 1314 of the first optical ferrule 1A, and the guide part 1315 of the first optical ferrule 1301A is inserted into the guide opening 1314 of the second optical ferrule 1301B, respectively.

The tip part of the guide part 1315 and the entrance part of the guide opening 1314 are formed with a tapered shape in the height direction and the thickness direction respectively, and therefore, insertion of the guide part 1315 into the guide opening 1314 is simple. After the guide part 1315 is inserted, the first protruding parts 1453 and 1454 (FIG. 18) of the guide part 1315 and the second protruding parts 1407 and 1412 (FIG. 16) of the guide opening 1314 come into mutual contact, and the first protruding parts 1453 and 1454 slide on top of the second protruding parts 1407 and 1412. Therefore, the frictional force when inserting the guide part 1315 is reduced, and the inserting force when mating the first optical ferrule 1301A and the second optical ferrule 1301B can be reduced. When the guide part 1315 is completely inserted into the guide opening 1314, the first optical ferrule 1301A and the second optical ferrule 1301B are in a mated state as illustrated in FIG. 19B. In the mated state, the end part of the guide part 1315 is positioned on the inner side of the guide opening 1314 without protruding to the outside from the guide opening 1314.

Figure 20:
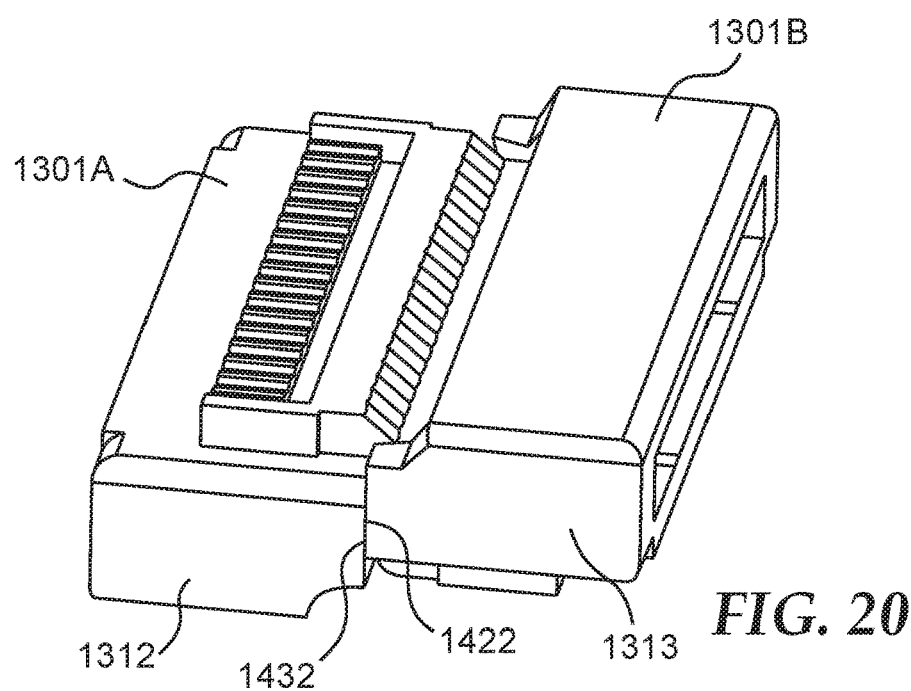
FIG. 20 is a perspective view illustrating a mated condition of the optical ferrule of an embodiment of the disclosure.

FIG. 20 is a perspective view illustrating the mated state of the optical ferrules 1301A and 1301B. As illustrated in FIG. 20, in the mated state, the vertical surfaces 1422 and 1432 of the side walls 1312 and 1313 of the first optical ferrule 1301A, and the vertical surfaces 1422 and 1432 of the side walls 1312 and 1313 of the second optical ferrule 1301B come into mutual contact, and the relative position in the length direction of the second optical ferrule 1301B with regards to the first optical ferrule 1301A is regulated. Furthermore, the maximum thickness t1 (FIG. 17) of the first protruding parts 1453 and 1454 of the guide part 1315, and the minimum height t2 of the second protruding parts 1407 and 1412 of the guide opening 1314 are approximately equal, and the relative position in the height direction of the second optical ferrule 1301B with regards to the first optical ferrule 1301A is regulated. Furthermore, the width w1 (FIG. 18) of the guide part and the width w2 of the guide opening 1314 are approximately equal, and the relative position in the width direction of the second optical ferrule 1301B with regards to the first optical ferrule 1301A is regulated.

By regulating the relative position in the length direction, the height direction, and the width direction of the second optical ferrule 1301B with regards to the first optical ferrule 1301A in this manner, as shown in FIG. 19B, the bottom surface 1523 (exit surface) of the first optical ferrule 1301A and the bottom surface 1523 (entrance surface) of the second optical ferrule 1301B can be arranged facing each other with high positional accuracy.

FIG. 19B also illustrates the transmission path of the light. The incoming light entering the first optical ferrule 1301A from the optical fibers 1302 through the entrance surface 1521 is propagated along an incoming axis L11, and is totally reflected by the light direction converting surface 1522, thereby changing the direction. The light with a change in direction is propagated along an outgoing axis L12 for which the direction was converted, emitted along an outgoing axis L13 from the exit surface 1523, and is transmitted to the second optical ferrule 1301B as outgoing light.

The light transmitted to the second optical ferrule 1301B through the entrance surface 1523 is propagated along an incoming axis L21, and is totally reflected by the light direction converting surface 1522, thereby changing the direction. The light with a change in direction is propagated along a direction converted axis L22, emitted along an outgoing axis L23 from the exit surface 1521, and is transmitted to the optical fibers 2 as outgoing light. At this time, the outgoing axis L13 where the first optical ferrule 1301A emits light and the incoming axis L21 where the second optical ferrule 1301B receives light are the same axis, and therefore, transmission loss of the light at the connection surface of the optical ferrules 1301A and 1301B can be reduced.

The optical ferrule of the present embodiment can provide the following effects.

(1) The optical ferrule 1301 provides: an upper wall 1310; a bottom wall 1311; a pair of facing side walls 1312 and 1313 that are connected to the upper wall 1310 and the bottom wall 1311 such that a guide opening 1314 is formed on the inner side together with the upper wall 1310 and the bottom wall 1311; a guide part 1315 (mechanical tab) that extends forward from the upper wall 1310 and the guide opening 1314; and an optical fiber coupler 1320 that is located on the upper surface of the upper wall 1310. The optical fiber coupler 1320 has an alignment part 1321 that aligns and hold the optical fibers 1302 and serves as a first attachment area, and a light direction converter 1322. The light direction converter 1322 has an entrance surface 1521 or 1523 that receives incoming light from the optical fibers 1302 that are aligned and positioned by the alignment part 1321; a light direction converting surface 1522 that receives the light propagated along the incoming axis L11 or L21 from the entrance surface 1521 or 1523, and then reflects the received light; and an exit surface 1523 or 1521 that receives the light from the light directing surface 1522, propagates the received light along the outgoing axis L13 or L23, and then transmits the light as outgoing light emitted from the optical ferrule 1301A or 1301B. The optical ferrules 1301A and 1301B have a unitary structure.

Therefore, the optical ferrule 1301 does not require a mating pin or mating hole that is required by some ferrules, and also does not require installation space therefor. Therefore, multi-fiber cables can be easily realized without increasing the number of parts.

(2) The pair of optical ferrules 1301A and 1301B that are mated together are male-female (hermaphroditic) units. Therefore, the connectors have common parts, and the cost can be reduced.

(3) The optical ferrule 1301 provides: first protruding parts 1453 and 1454 that protrude from the upper surface 1451 and the bottom surface 1452 of the guide part 1315, and extend along the length direction of the optical ferrule 1301; and second protruding parts 1407 and 1412 that protrude from the bottom surface 1411 of the upper wall 1310 and the upper surface 1411 of the bottom wall 1311, and extend along the length direction of the optical ferrule 1301 toward the guide opening 1314. Therefore, of the upper and lower surfaces of the guide part 1315 and the upper and lower surfaces of the guide opening 1314, only the first protruding parts 1453 and 1454 and the second protruding parts 1407 and 1412 are required to be processed with high accuracy, and thus the processing cost can be reduced.

(4) One of the optical ferrules 1301A was made to mate along a mating direction parallel to the length direction of the other optical ferrule 1301B, and therefore, the optical fibers 1302 that extend in the length direction of the optical ferrules 1301A and 1301B can be connected in an approximately linear state.

(5) The guide parts 1315 of the first optical ferrule 1301A and the second optical ferrule 1301B are both inserted on the inner side of the guide openings 1314 of the opposing first optical ferrule 1301A and second optical ferrule 1301B respectively, and therefore, the first optical ferrule 1301A and the second optical ferrule 1301B can be easily mated.

(6) When the first optical ferrule 1301A and the second optical ferrule 1301B are mated, the first protruding parts 1453 and 1454 of the first optical ferrule 1301A and the second optical ferrule 1301B are connected to the second protruding parts 1407 and 1412 of the opposing first optical ferrule 1301A and the second optical ferrule 1301B so as to slide, and therefore, the contact area of the guide part 1315 and the guide opening 1314 is reduced, and insertion of the guide part 1315 into the guide opening 1314 is easy. The first protruding parts 1453 and 1454 are formed with a cross-sectional rectangular shape, and the second protruding parts 1407 and 1412 are formed with a cross-sectional triangular shape, and therefore, the guide part 1315 and the guide opening 1314 are in linear contact at two left and right points, and while the contact area is reduced, the guide part 1315 can be stabilized and supported within the guide opening 1314.

Note that with the embodiment, the waveguide alignment part (alignment part 1321) that aligns and contains the optical fibers 1302 as an optical waveguide is configured by the V grooves 1405, but the configuration of the waveguide alignment part is not restricted thereto. With the embodiment, the direction in which the light reflected by the light direction converting surface 1322 propagates through the optical ferrule 1301 (direction of the direction converted axis), and the direction that the outgoing light is emitted from the optical ferrule 1301 (direction of the outgoing axis) are the same, but as long as the reflected light is propagated in a different direction than the direction that the light that enters the optical ferrule 1301 is propagated (direction of the incoming axis), the direction of the direction converted axis can be different from the direction of the outgoing axis.

Figure 21:
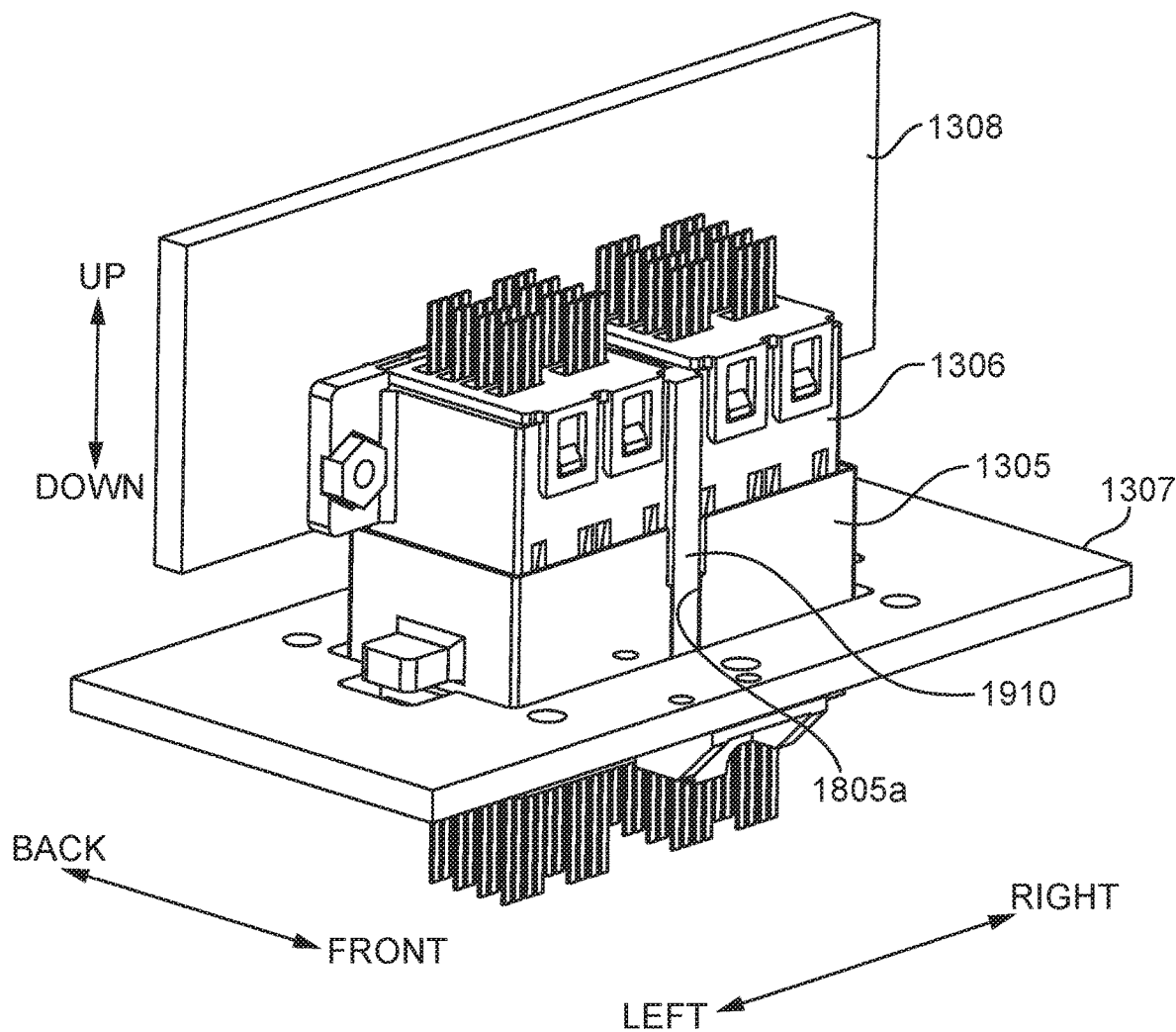
FIG. 21 is a perspective view illustrating a mated condition of the optical connector of an embodiment of the disclosure.

Next, the optical connector according to an embodiment is described while referring to FIG. 21 through FIG. 40. FIG. 21 is a perspective view illustrating the mated state of the optical connectors (first optical connector 1305 and second optical connector 1306) according to an embodiment. Note that below, the front-back direction, the left-right direction, and vertical direction are defined as illustrated by the drawings, and the configuration of each part is described in accordance with these definitions as a matter of convenience. The vertical direction is the mating direction of optical connectors 1305 and 1306.

The first optical connector 1305 is attached to a first substrate 1307 that extends in the front-back and left-right directions, and the second optical connector 1306 is attached to a second substrate 1308 that extends in the vertical and left-right directions. A tip part of a plurality of optical fiber units 1400 (FIG. 15) that extend in the vertical direction, in other words, a tip part of the optical fiber units 1400 having the aforementioned first optical ferrule 1301A is disposed on the first optical connector 1305. A tip part of the plurality of optical fiber units 1400 that extend in the vertical direction, in other words, a tip part of the optical fiber units 1400 having the aforementioned second optical ferrule 1301B is disposed on the second optical connector 1306. When the first optical connector 1305 and the second optical connector 6 are mated, the first optical ferrule 1301A and the second optical ferrule 1301B are mated, and the tip parts of the optical fiber units 1400 on the first optical connector side and the optical fiber units 1400 on the second optical connector side are connected.

Figure 22A:
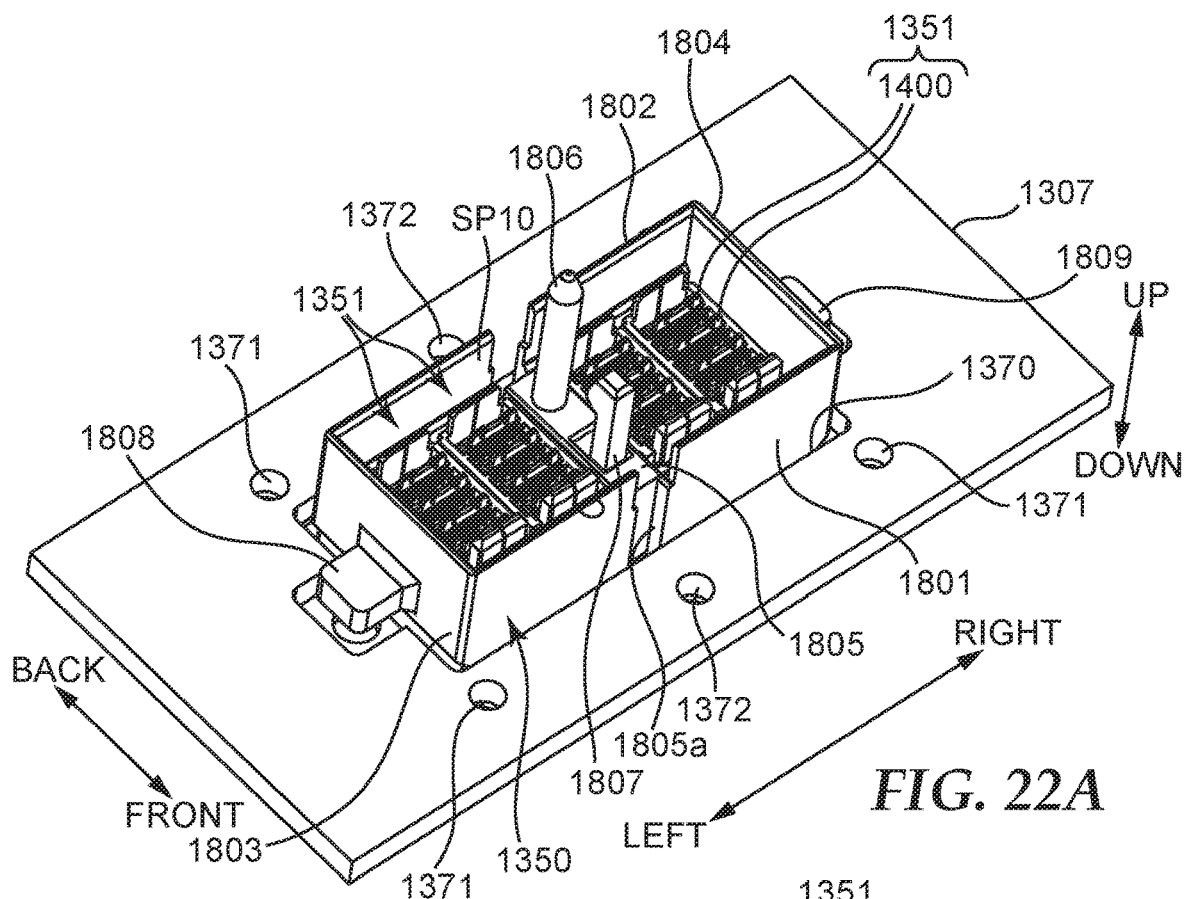
FIG. 22A is a perspective view of one of the optical connectors of FIG. 21.
Figure 22B:
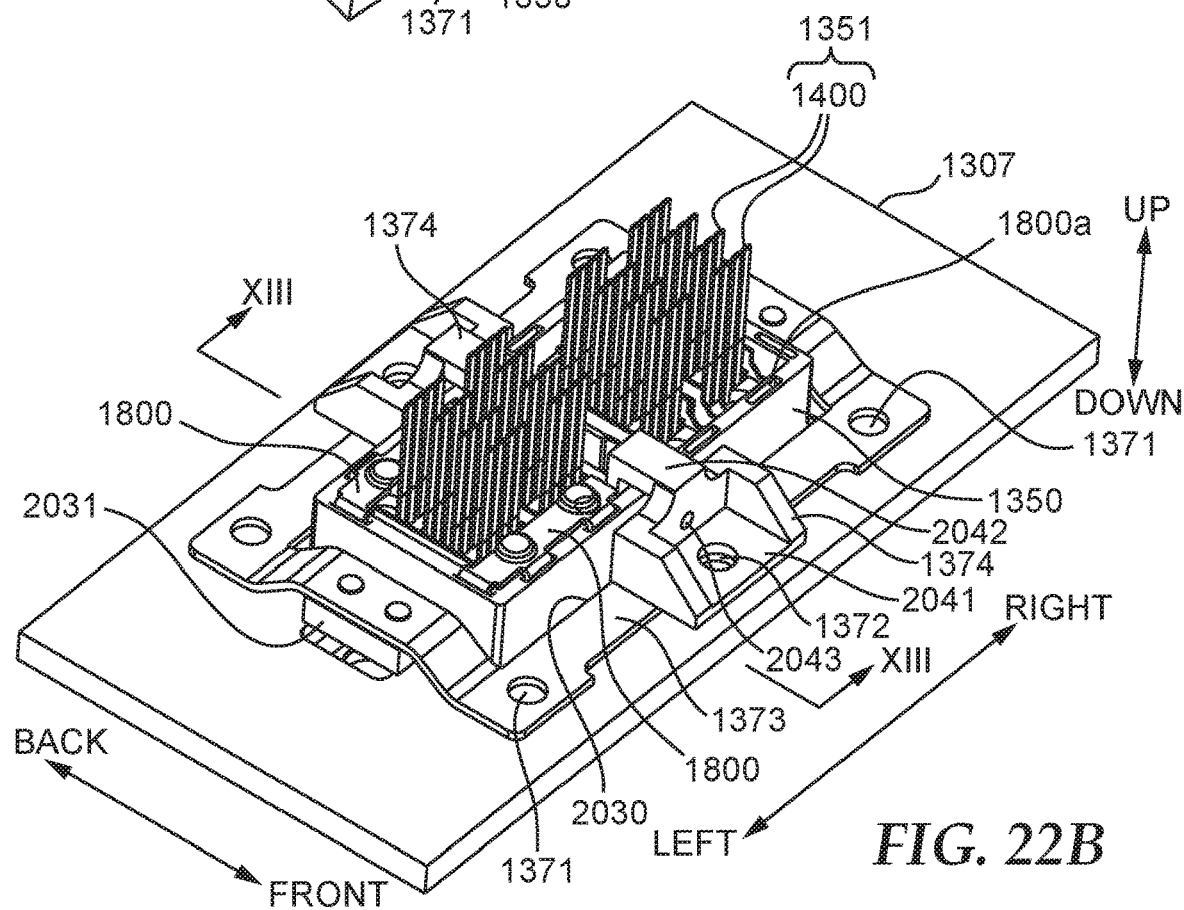
FIG. 22B is a perspective view of one of the optical connectors of FIG. 21.

First, the configuration of the first optical connector 1305 is described. FIG. 22A and FIG. 22B are respective perspective views of the first optical connector 1305. The first optical connector 1305 has a first case 1350 that is attached to the first substrate 1307 by passing through the first substrate 1307, and a plurality of optical fiber assemblies 1351 that are housed in the first case 1350. The optical fiber assemblies 1351 have four rows of optical fiber units 1400 in the front-back direction, and four rows of the optical fiber assemblies 1351 in the left-right direction are disposed in the first case 1350.

Figure 23A:
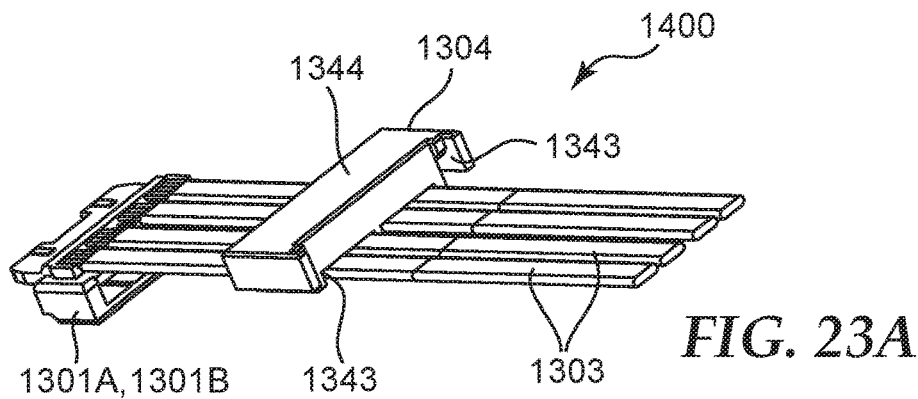
FIG. 23A is a perspective view of an optical fiber unit that is assembled into the optical connector of FIG. 22A.
Figure 23B:
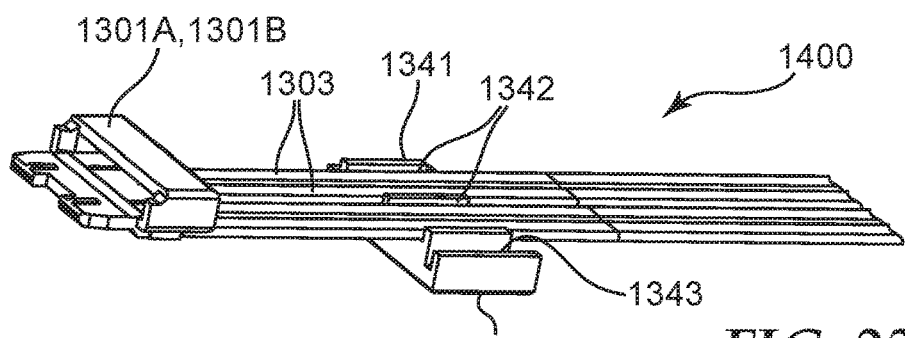
FIG. 23B is a perspective view of an optical fiber unit assembled to the optical connector of FIG. 22A.

FIG. 23A and FIG. 23B are each perspective views of the optical fiber unit 1400. Note that the optical fiber units 1400 on the first optical connector 1305 side and the optical fiber units 1400 on the second optical connector 1306 side have the same shape. As illustrated in FIG. 23A and FIG. 23B, a securement member 1304, that provides a portion of the first attachment area, is configured by resin molding is fixed at a position that is separated only at a predetermined distance from the optical ferrules (1301A and 1301B) on one surface of a plurality of fiber ribbons 1303. The securement member 1304 extends parallel to the width direction of the optical ferrule 1301. A pair of receiving grooves 1342 are formed in the width direction on a surface 1341 facing the fiber ribbons 1303 of the securement member 1304, and engaging grooves 1343 that are parallel with the receiving grooves 1342 are formed on both sides in the width direction of the receiving grooves 1342. A pair of fiber ribbons 1303 are contained in each of the receiving grooves 1342, and the fiber ribbons 1303 are fixed to the securement member 1304 by an adhesive. Another surface 1344 of the securement member 1304 is substantially flat.

As illustrated in FIG. 22A, the first case 1350 has a front wall 1801, a rear wall 1802, and left and right side walls 1803 and 1804 that connect both left and right end parts of the front wall 1801 and both left and right end parts of the rear wall 1802, and is made by resin molding. The front wall 1801, the rear wall 1802, and the side walls 1803 and 1804 extend respectively in the vertical direction, and the first case 1350 assumes a frame shape where the upper surface and the lower surface are open. A holding space SP10 for holding the optical fiber assemblies 1351 is formed on the inner part of the first case 1350.

The first case 1350 has a center wall 1805 that connects the left and right center part of the front wall 1801 and the left and right center part of the rear wall 1802, and the holding space SP10 is divided in two in the left-right directions by the center wall 1805. A guide pin 1806 and a latch 1807 protrude upward on the upper surface of the center wall 1805. The upper surface of the center wall 1805 is positioned more downward than the upper surfaces of the front wall 1801 and the rear wall 1802, and the bottom surface of the center wall 1805 is positioned more upward than the bottom surfaces of the front wall 1801 and the rear wall 1802. A cutaway is provided facing downward in the left-right direction of the center part on the upper surface of the front wall 1801, and a concave part 1805a is formed by the cutaway on the front side of the center wall 1805.

Collar parts 1808 and 1809 protruding to the outside in the left-right direction of the center part in the front-back direction are respectively provided on the left surface of the side wall 1803 and the right surface of the side wall 1804. An opening part 1370 corresponding to the external shape of the first case 1350 is provided on the first substrate 1307, the lower end part of the first case 1350 passes through the opening part 1370, and the bottom surface of the first case 1350 protrudes more downward than the bottom surface of the first substrate 1307. Screw holes 1371 and 1372 are formed around the opening part 1370. The screw hole 1371 is provided near the corner of the first case 1350, and the screw hole 1372 is provided in front and behind the center wall 1805 of the first case 1350.

Figure 24:
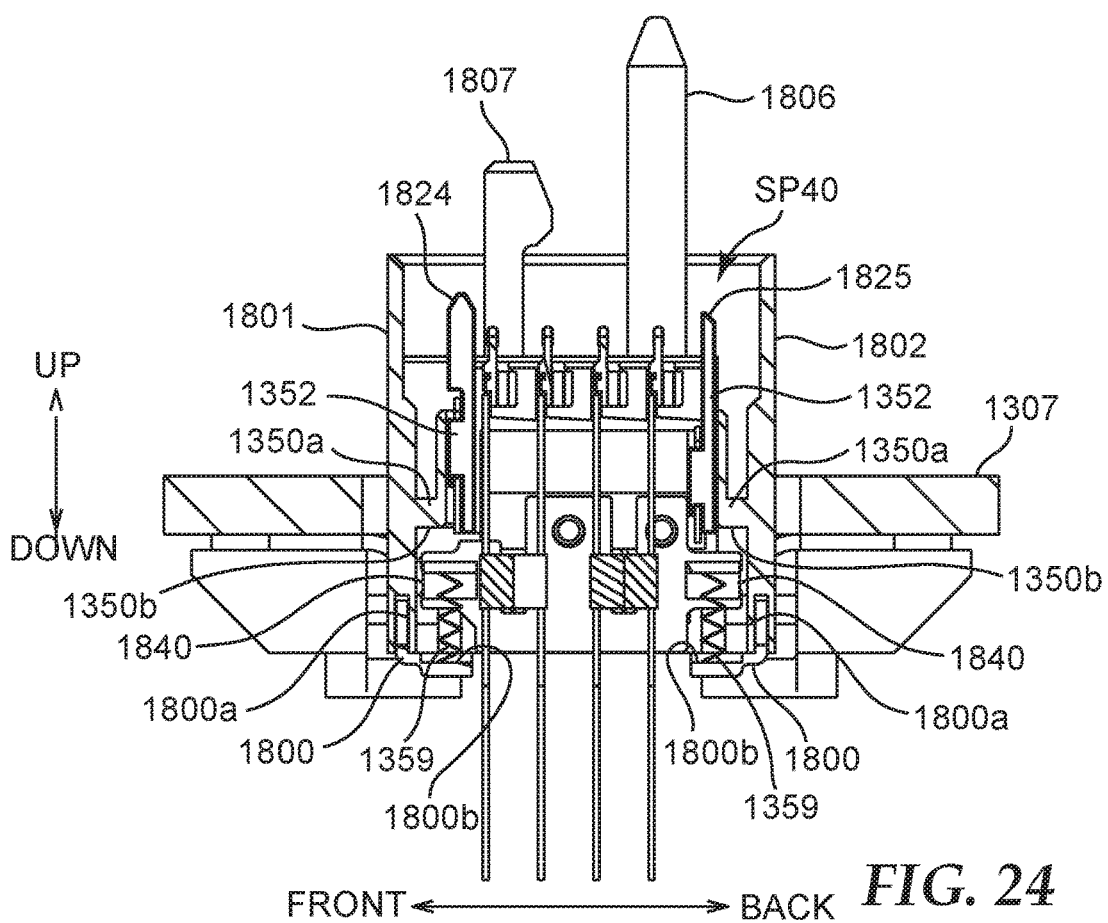
FIG. 24 is a cross-section view along line VIII-VIII in FIG. 22B.

FIG. 24 is a cross-sectional view along line XIII-XIII of FIG. 22B. As illustrated in FIG. 22B and FIG. 24, a slit 1800a is provided on the bottom surface of the first case 1350, and a metal plate 1800 is press fit in the slit 1800a. Note that in FIG. 22B, an illustration of the right side of the plate 1800 is omitted. The plate 1800 extends parallel to the opening of the bottom surface of the first case 1350, and the front end part and the rear end part of the opening of the bottom surface of the first case 1350 are blocked by the plate 1800. A concave part 1800b is formed on the upper surface of the plate 1800.

A metal supporting plate 1373 is attached to the bottom surface of the first substrate 1307. The supporting plate 1373 is fixed to the first substrate 1307 by a screw (not illustrated) that screws into the screw hole 1371. The supporting plate 1373 has a rectangular opening 2030, and the first case 1350 is disposed on the inner side of the opening 2030. Respective rotating supporting members 1374 are disposed in front and behind the center wall 1805 of the first case 1350. The rotating supporting member 1374 has a flange part 2041 and an arm part 2042, and is made of resin molding.

The flange part 2041 of the rotating supporting member 1374 is fixed to the first substrate 1307 with the supporting plate 1373 interposed therebetween by a screw (not illustrated) that is screwed in the screw hole 1372. The arm part 2042 extends from the flange part 2041 over the bottom surface of the first case 1350 to the bottom surface of the center wall 1805. In other words, the arm part extends such that the front and rear surfaces of the front wall 1801 and the front and rear surfaces of the rear wall 1802 of the first case 1350 are respectively interposed. A pin 2043 passes through the front wall 1801 and the arm part 2042 of the rotating supporting member 1374 on the front side, and passes through the rear wall 1802 and the arm part 2042 of the rotating supporting member 1374 on the rear side, in the front-back direction. Therefore, the lower end part of the first case 1350 is supported in a manner that can tilt from the first substrate 1307 with the pin 2043 acting as a fulcrum.

Both left and right end parts of the supporting plate 1373 are bent downward away from the bottom surface of the first substrate 1307 in the front-back direction of the center part, and a spring shoe 2031 is fixed to the upper surface of the supporting plate 1373. A coil spring (not illustrated) is interposed between the spring shoe 2031 and the collar parts 1808 and 1809 of the first case 1350. Therefore, the elastic force due to the coil spring is applied to both left and right end parts of the first case 1350 from the first substrate 1307 through the collar parts 1808 and 1809 and the supporting plate 1373, and the first case 1350 is elastically supported in a manner that can tilt from the first substrate 1307 by a floating mechanism.

Figure 25A:
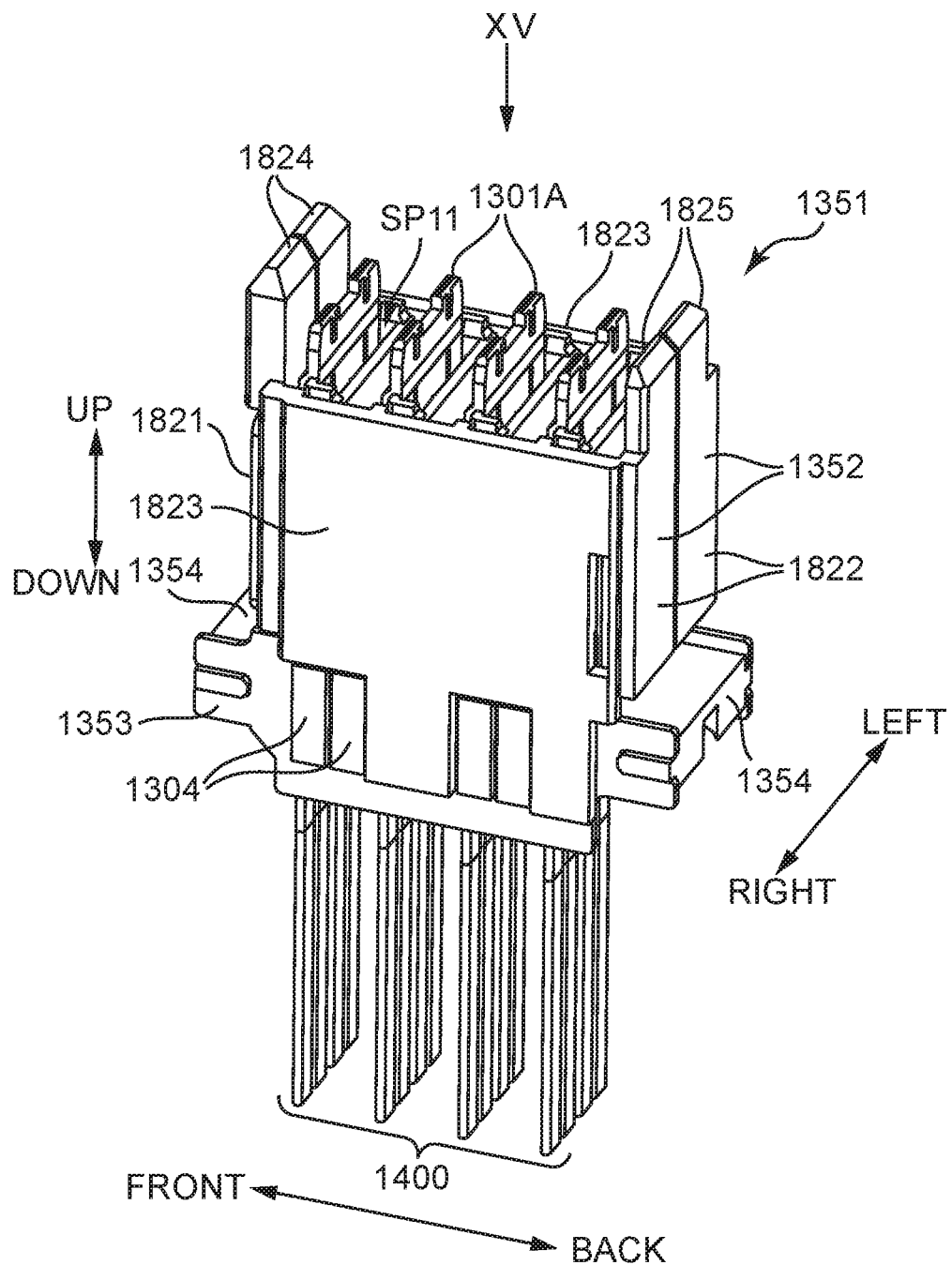
FIG. 25A is a perspective view of an optical fiber assembly held in a case of the connector of FIG. 22A.
Figure 25B:
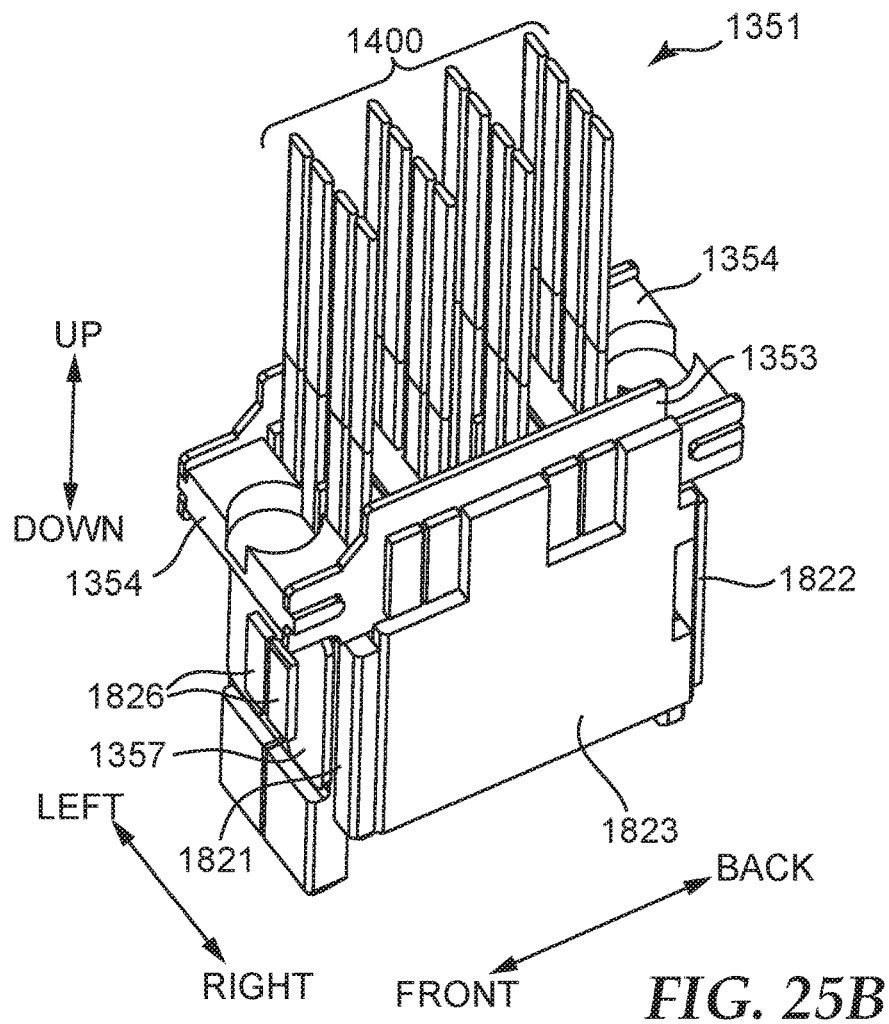
FIG. 25B is a perspective view of an optical fiber assembly held in a case of the connector of FIG. 22A.

FIG. 25A and FIG. 25B are respective perspectives views of the optical fiber assembly 1351 that is housed in the first case 1350. The optical fiber assembly 1351 contains: a left and right pair of bodies 1352 that enclose four sets of optical fiber units 1400; a left and right pair of plate members 1353 that are respectively fixed to the lower end parts of the left and right pair of bodies 1352; and a front and rear pair of spring shoes 1354 that are attached to both front and rear end parts of the plate members 1353. The body 1352 on the right side and the body 1352 on the left side, as well as the plate member 1353 on the right side and the plate member 1353 on the left side are symmetrical to each other on the left and right. The spring shoe 1354 on the front side and the spring shoe 1354 on the rear side can be symmetrical in the front and back. The bodies 1352 and the spring shoes 1354 can be made by resin molding. The plate member 1353 can be made of a metal plate.

Figure 26:
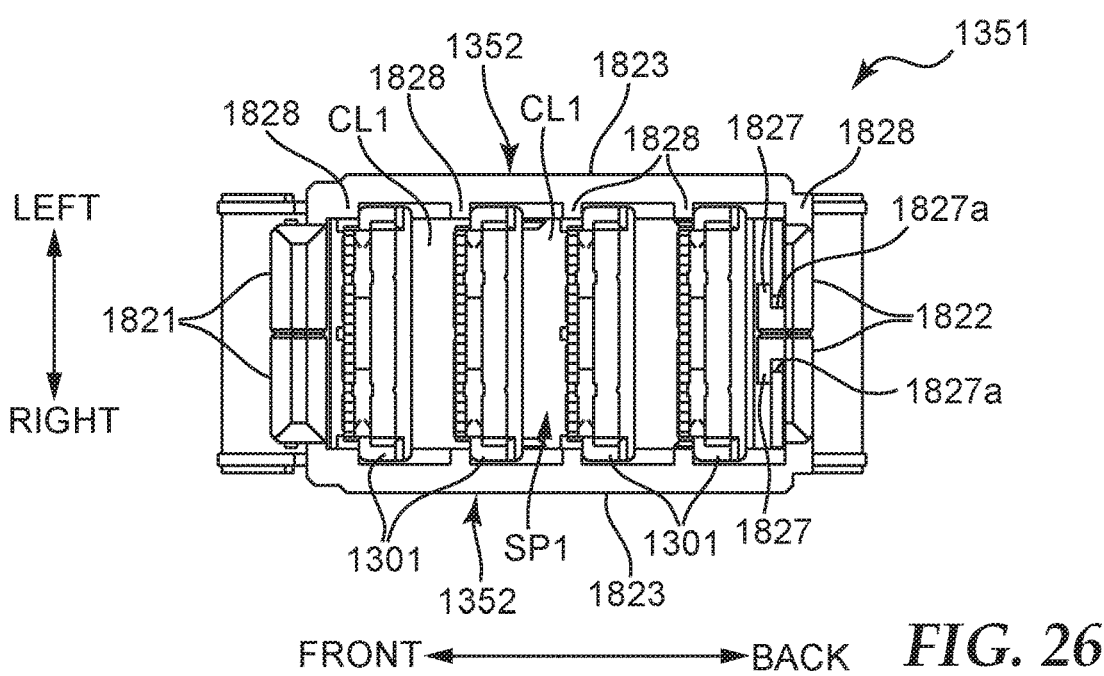
FIG. 26 is a view in the direction of arrow XV in FIG. 25A.

FIG. 26 is a view (plan view) in the direction of arrow XV of FIG. 25A. As illustrated in FIG. 26, the body 1352 has a front wall 1821, a rear wall 1822, and a side wall 1823 that connects the front wall 1821 and the rear wall 1822, and assumes a C-shape from a plan view. As illustrated in FIG. 25A, protruding parts 1824 and 1825 that protrude more upward than the side wall 1823 are formed on the upper end part of the front wall 1821 and the upper end part of the rear wall 1822. The protruding part 1824 has increased thickness and rigidity toward the front. The protruding part 1824 protrudes further upward than the protruding part 1825 (refer to FIG. 24).

Figure 27A:
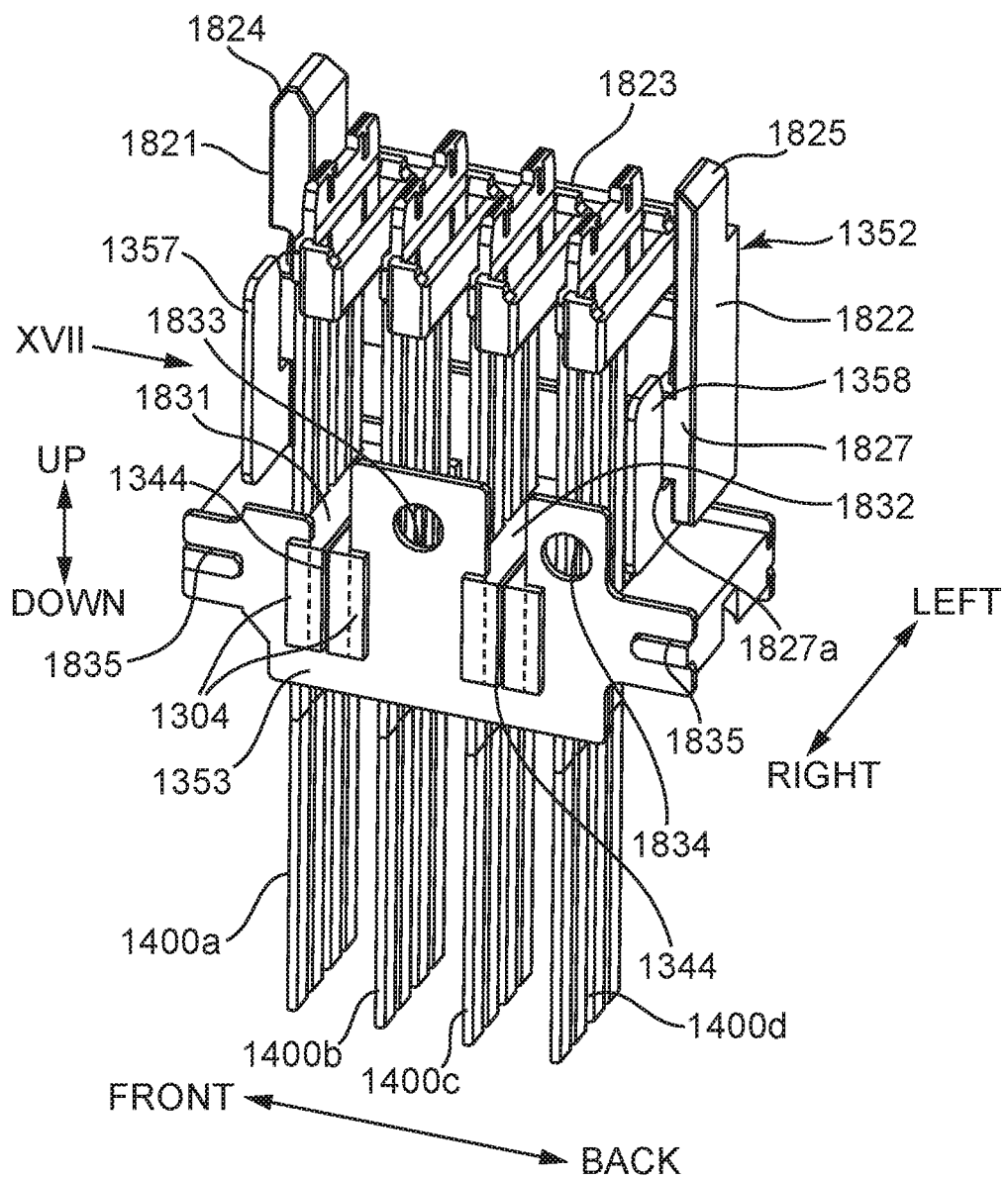
FIG. 27A is a perspective view where the right side body has been omitted from the optical fiber assembly of FIG. 25A.
Figure 27B:
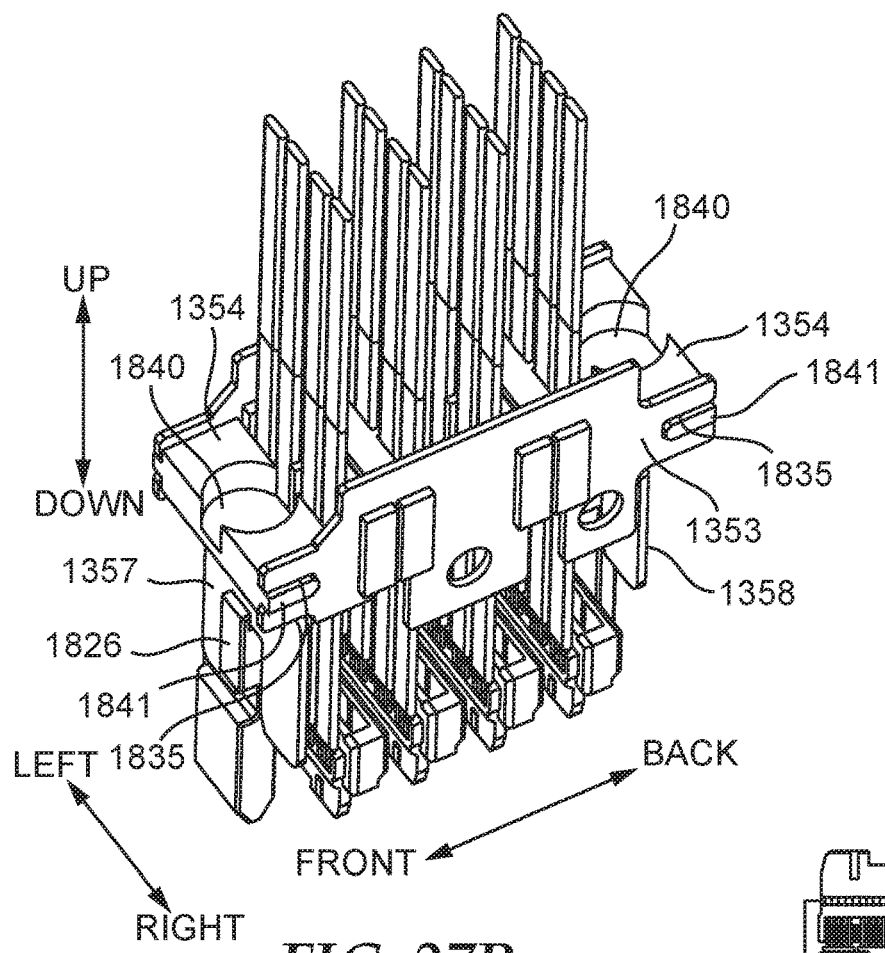
FIG. 27B is a perspective view where the right side body has been omitted from the optical fiber assembly of FIG. 25B.
Figure 28:
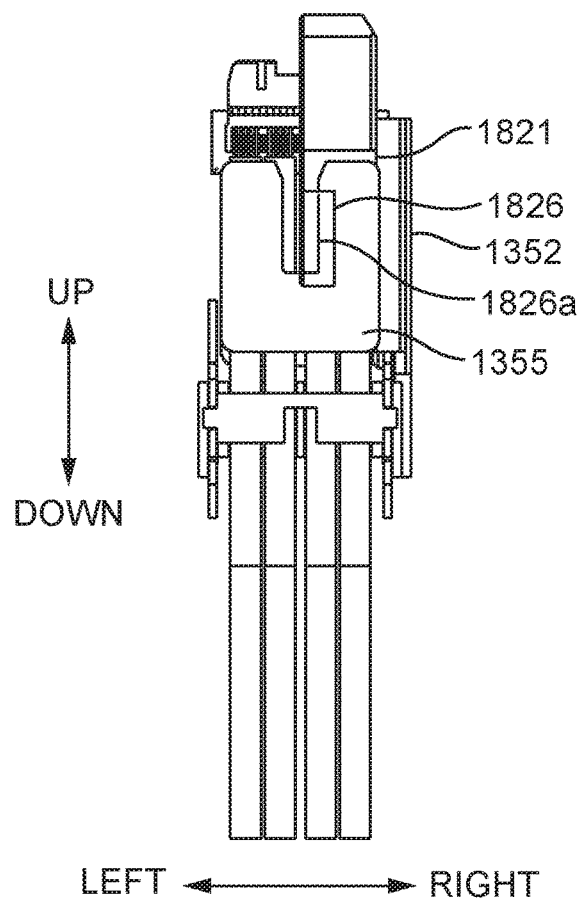
FIG. 28 is a view in the direction of arrow XVII in FIG. 27A.

FIG. 27A and FIG. 27B are respective perspective views that omit the right side body 1352 from the optical fiber assembly 1351 of FIG. 25A and FIG. 25B, and FIG. 28 is a view (front surface view) in the direction of arrow XVII of FIG. 27A. As illustrated in FIG. 28, a protruding part 1826 that protrudes forward is provided on the front surface of the front wall 1821 of the body 1352. An engaging groove 1826a is formed on the circumference surface of the protruding part 1826 (right end surface and lower end surface of the protruding part 1826 of the body 1352 on the right side, and the left end surface and the lower end surface of the protruding part 1826 of the body 1352 on the left side). A U-shaped clip 1357 made from a metal plate of a predetermined thickness is engaged from the lower side in the engaging grooves 1826a of the left and right bodies 1352, and the front end parts of the left and right bodies 1352 are connected through the clip 1357.

As illustrated in FIG. 26 and FIG. 27A, a protruding part 1827 that protrudes forward is provided on the front surface of the rear wall 1822 of the body 1352. An engaging groove 1827a is formed on the circumference surface of the protruding part 1827 (right end surface and lower end surface of the protruding part 1827 of the body 1352 on the right side, and the left end surface and the lower end surface of the protruding part 1827 of the body 1352 on the left side). A U-shaped clip 1358 made from a metal plate of a predetermined thickness is engaged from the lower side in the engaging grooves 1827a of the left and right bodies 1352, and the rear end parts of the left and right bodies 1352 are connected through the clip 1358. Therefore, as illustrated in FIG. 26, a holding space SP11 of the optical fiber units 1400 is formed on the inner side of the left and right bodies 1352. Note that the clip 1357 and the clip 1358 can have the same shape.

A plurality of position regulating parts 1828 that protrude toward the holding space SP11 are provided at equal intervals in the front back direction on the inner wall surface of the side wall 1823 of the body 1352. The front end surfaces (both left and right end parts of the upper wall 1310 in FIG. 13) of the optical ferrule 1301 are respectively in contact with the position regulating part 1828, and a gap CL1 is provided between the rear end surface of the optical ferrule 1301 and the position regulating part 1828 to the back thereof. Thereby, the optical ferrule 1301 can be moved rearward.

As illustrated in FIG. 27A, of the four rows of optical fiber units 1400 in the front-back direction, the securement member 1304 is fixed on the rear end surface of the fiber ribbons 1303 for the first and third rows of optical fiber units 1400a and 1400c, and the securement member 1304 is fixed on the front end surface of the fiber ribbons 1303 for the second and fourth rows of optical fiber units 1400b and 1400d. Therefore, the flat surfaces 1344 of the first and second rows of optical fiber units 1400a and 1400b face each other, and the flat surfaces 1344 of the third and fourth rows of optical fibers units 1400c and 1400d face each other.

A front and rear pair of grooves with bottoms 1831 and 1832 are formed facing downward on the upper end surface of the plate member 1353. The end part of the securement members 1304 of the optical ferrule units 1400a and 1400b, in other words, the engaging groove 1343 in FIG. 23A is inserted from above into the groove with bottom 1831 on the front side, and the engaging grooves 1343 of the optical ferrule units 1400a and 1400b are respectively engaged in the front wall and the rear wall of the groove with bottom 1831. Similarly, the end parts (engaging groove 1343) of the securement members 1304 of the optical ferrule units 1400c and 1400d are inserted from above into the groove with bottom 1832 on the rear side, and the engaging grooves 1343 of the optical ferrule units 1400c and 1400d are respectively engaged in the front wall and the rear wall of the groove with bottom 1832. Thereby, the securement members 4 of the optical ferrule units 1400a through 1400d are fixed to the plate member 1353.

The plate member 1353 protrudes upward between the grooves with bottom 1831 and 1832 and behind the groove with bottom 1832, and through holes 1833 and 1834 are opened on the protruding part. An illustration is omitted, but a convex part is provided corresponding to the through holes 1833 and 1834 on the inner wall surface of the side wall 1823 of the body 1352. The convex part of the body 1352 is mated to the through holes 1833 and 1834 of the left and right plate members 1353 from the outside on the left and right, and the left and right bodies 1352 are fixed to the left and right plate members 1353 by engaging the clips 1357 and 1358 from below.

The front end part and the rear end part of the plate member 1353 protrude further forward and rearward than the front wall 1821 and the rear wall 1822 of the body 1352. Engaging grooves 1835 are formed facing rearward and forward respectively on the front end surface and the rear end surface of the protruding part. As illustrated in FIG. 27B, circular concave parts 1840 are formed on the left and right of the center part on the bottom surface of the spring shoe 1354. A protruding part 1841 that protrudes in the left-right direction corresponding to the engaging groove 1835 of the plate member 1353 is provided on both left and right end parts of the spring shoe 1354. The plate member 1353 and the spring shoe 1354 are integrated by engaging the protruding part 1841 of the spring shoe 1354 from the outside in the left-right directions to the groove with bottom 1835. Thereby, the optical fiber assemblies 1351 can be assembled.

As illustrated in FIG. 24, respective step parts 1350a are provided on the rear surface of the front wall 1801 and the front surface of the rear wall 1802 of the first case 1350, and the length in the front-back direction of the holding space SP10 is reduced on the upward side more than the step part 1350a. The distance from the rear end surface of the step part 1350a on the front side to the front end surface of the step part 1350a on the rear side is equal to the distance from the front end surface to the rear end surface of the body 1352 of the optical fiber assembly 1351. Therefore, the position in the front-back direction of the body 1352 in the first case 1350 is regulated.

Note that an illustration is omitted, but respective step parts 1350a are also provided on the right surface of the side wall 1803 and the left surface of the side wall 1804 of the first case 1305, and are joined to the step parts 1350a of the front wall 1801 and the rear wall 1802. The distance from the step part 1350a of the side walls 1803 and 1804 to the left and right inner side surfaces of the center wall 1805 is equal to the distance between the left and right outer side surfaces of a pair of optical fiber assemblies 1351 when the pair of optical fiber assemblies 1351 is disposed on the left and right between the side walls 1803 and 1804 and the center wall 1805 as illustrated in FIG. 22A. Thereby, the position in the left-right direction of the body 1352 in the first case 1350 is regulated.

As illustrated in FIG. 24, a coil spring 1359 is interposed between a concave part 1840 on the bottom surface of the spring shoe 1354 of the optical fiber assembly 1351, and a concave part 1350b of a plate 1800 that is mounted on the bottom surface of the first case 1350, and the optical fiber assembly 1351 can be raised and lowered against the biasing force of the coil spring 1359. FIG. 24 illustrates a position of the optical fiber assembly 1351 after mating the first optical connector 13015 to the second optical connector 306, and the spring shoe 1354 is positioned lower than the bottom surface 1350b of the step part 1350a. Before mating the first optical connector 1305, the spring shoe 1354 is biased upward by the spring 1359, and contacts the bottom surface 1350b of the step part 1350a. Therefore, upward movement of the optical fiber assembly 1351 is restricted, and the maximum raised position of the optical fiber assembly 1351 in the first case 1350 is regulated.

Figure 29A:
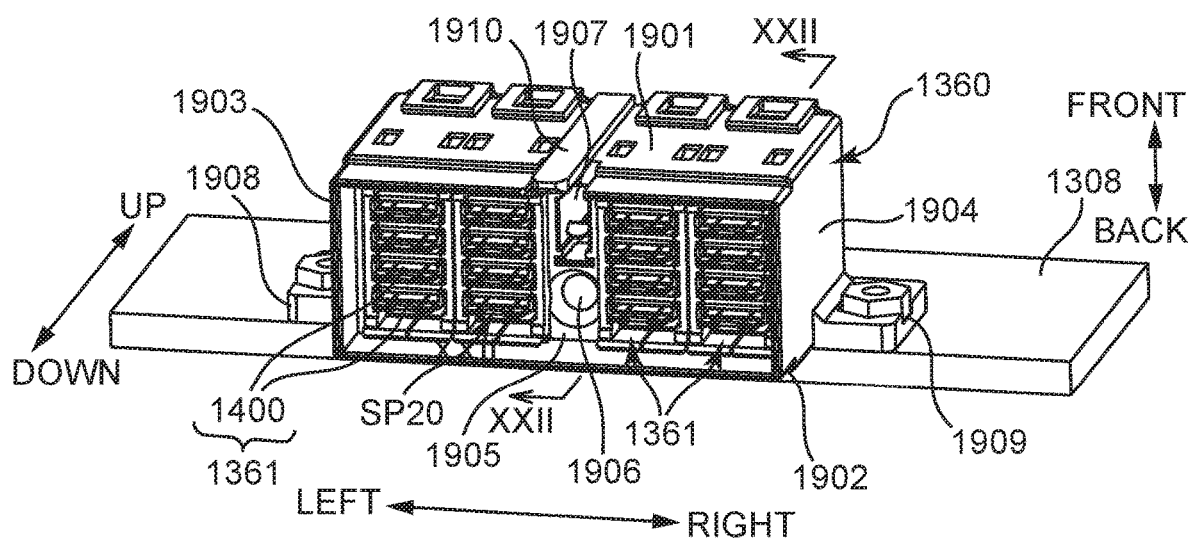
FIG. 29A is a perspective view of another optical connector of FIG. 21.
Figure 29B:
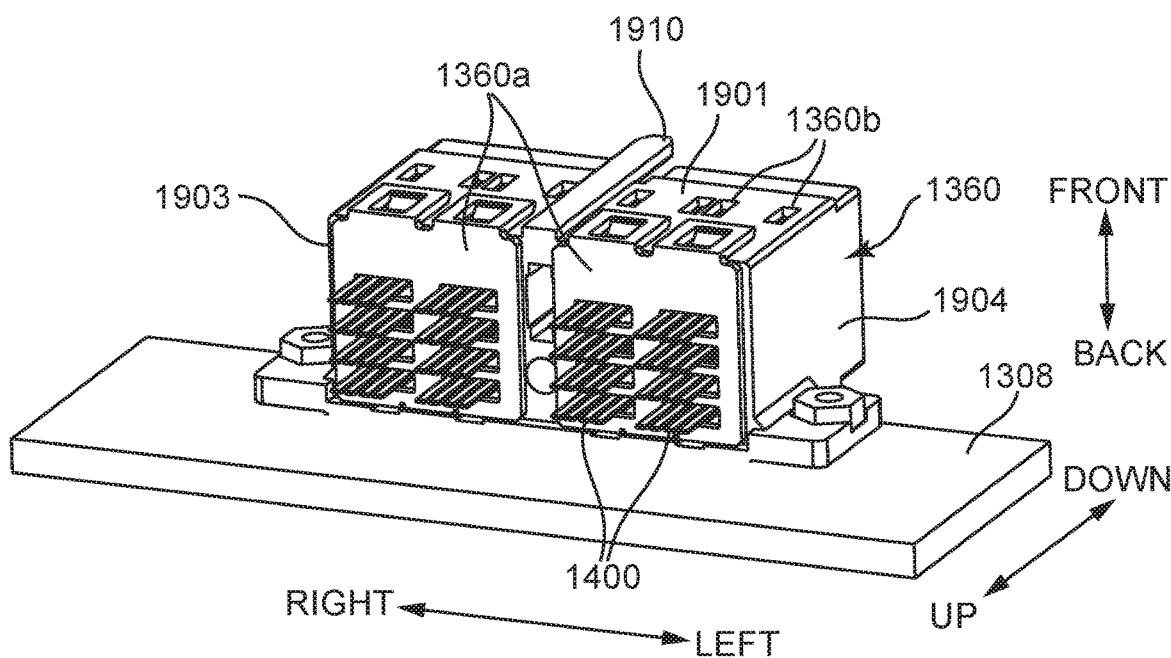
FIG. 29B is a perspective view of another optical connector of FIG. 21.

Next, the configuration of the second optical connector 1306 is described. FIG. 29A and FIG. 29B are perspective views of the second optical connectors 1306. The second optical connector 1306 has a second case 60 attached to a second substrate 1308, and a plurality of optical fiber assemblies 1361 that are housed in the second case 1360. The optical fiber assemblies 1361 have four rows of optical fiber units 1400 in the front-back direction, and four rows of optical fiber assemblies 1361 are disposed in the left-right direction in the second case 1360.

The second case 1360 has a front wall 1901, a rear wall 1902, and left and right side walls 1903 and 1904 that connect both left and right end parts of the front wall 1901 and both left and right end parts of the rear wall 1902, and is made by resin molding. The front wall 1901, the rear wall 1902, and the side walls 1903 and 1904 respectively extend in the vertical direction, and the second case 1360 assumes a frame shape where the upper surface and the lower surface are open. A holding space SP20 for holding the optical fiber assemblies 1361 is formed on the inner part of the second case 1360. A left and right pair of covers 1360a are mounted on the upper surface of the second case 1360, and the optical fiber unit 100 extends upward passing through the cover 1360a.

The second case 1360 has a center wall 1905 that connects the left and right center part of the front wall 1901 and the left and right center part of the rear wall 1902, and the holding space SP20 is divided in two in the left-right directions by the center wall 1905. A pin hole 1606 that engages the guide pin 1806 (FIG. 22A) of the first case 1350, and a latch hole 1907 that engages the latch 1807 (FIG. 22A) are drilled in the lower surface of the center wall 1905. Flange parts 1908 and 1909 protrude respectively in the left and right directions on the rear end and upper end parts of the side walls 1903 and 1904, and the second case 1360 is fastened to the second substrate 1308 by a bolt that passes through the flange parts 1908 and 1909.

A rectangular through hole 1360b is formed on the front wall 1901 and the rear wall 1902, corresponding to the position of slanted parts 1367a and 1368a (FIG. 30A and FIG. 30B) of the clips 1367 and 1368 of the optical fiber assembly 1361. A long narrow guide part 1910 with a constant width in the left-right direction extends in the vertical direction to the front surface of the front wall 1901. The lower end part of the guide part 1910 protrudes further downward than the lower end surface of the front wall 1901 (refer to FIG. 33). The length in the front-back direction of the lower end part of the outer wall surface of the second case 1360 is shorter than the length in the front-back direction of the inner wall surface above the first case 1350, and the length in the left-right direction of the lower end part of the outer wall surface of the second case 1360 is shorter than the length in the left-right direction of the inner wall surface of the first case 1350.

Therefore, the second case 1360 can be inserted in the first case 1350, and as illustrated in FIG. 21, when the lower end part of the second case 1360 is inserted in the first case 1350, a guide part 1910 of the second case 1360 is inserted in the concave part 1805a of the first case. At the same time, the guide pin 1806 of the first case 1350 is inserted in the pin hole 1906 of the second case 1360, and the second case 1360 is positioned in the first case 1350. Furthermore, the latch 1807 of the first case 1350 is engaged in the latch hole 1907 of the second case 1360, and the second case 1360 is connected to the first case 1350.

Figure 30A:
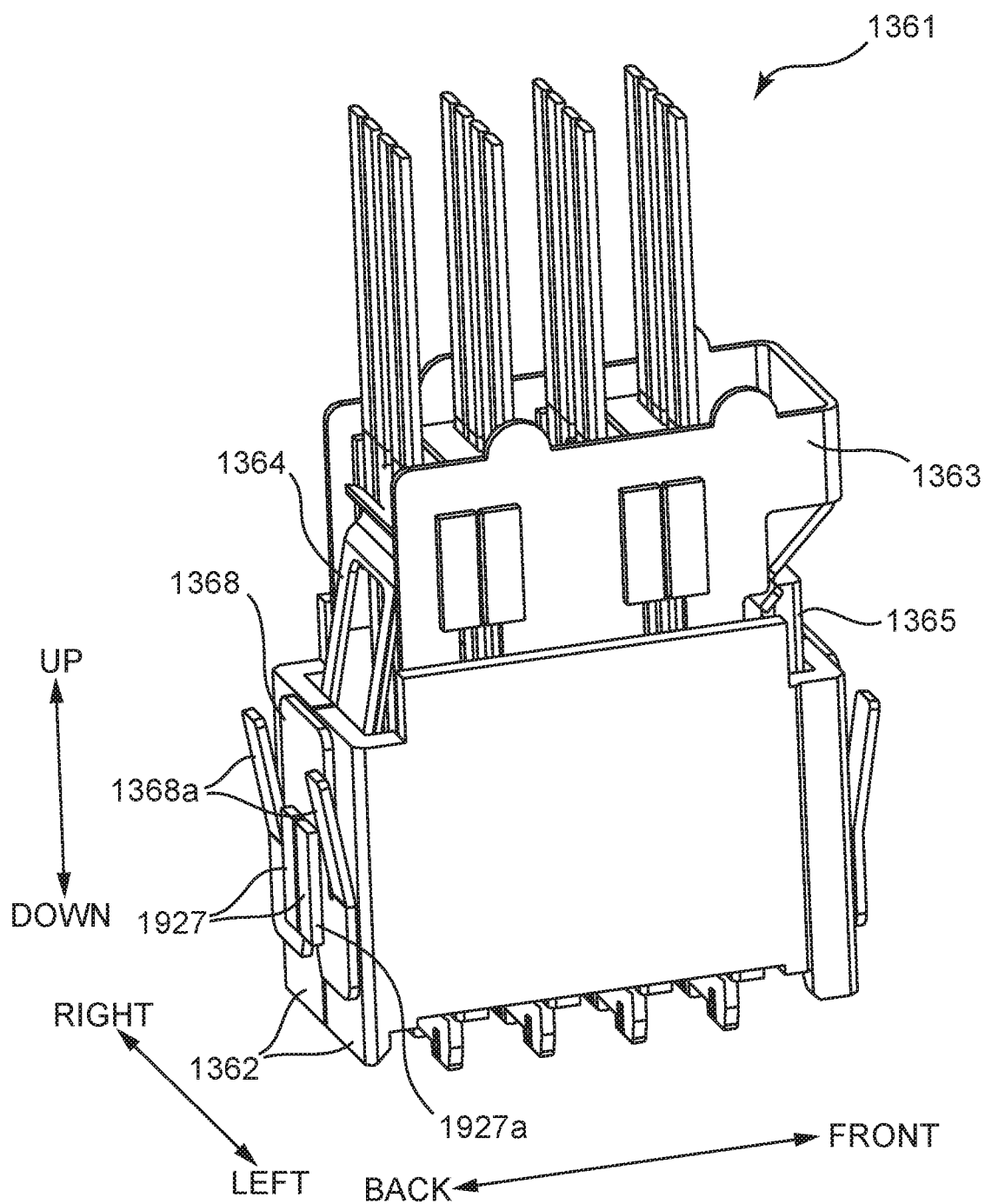
FIG. 30A is a perspective view of an optical fiber unit assembled into the optical connector of FIG. 29A.
Figure 30B:
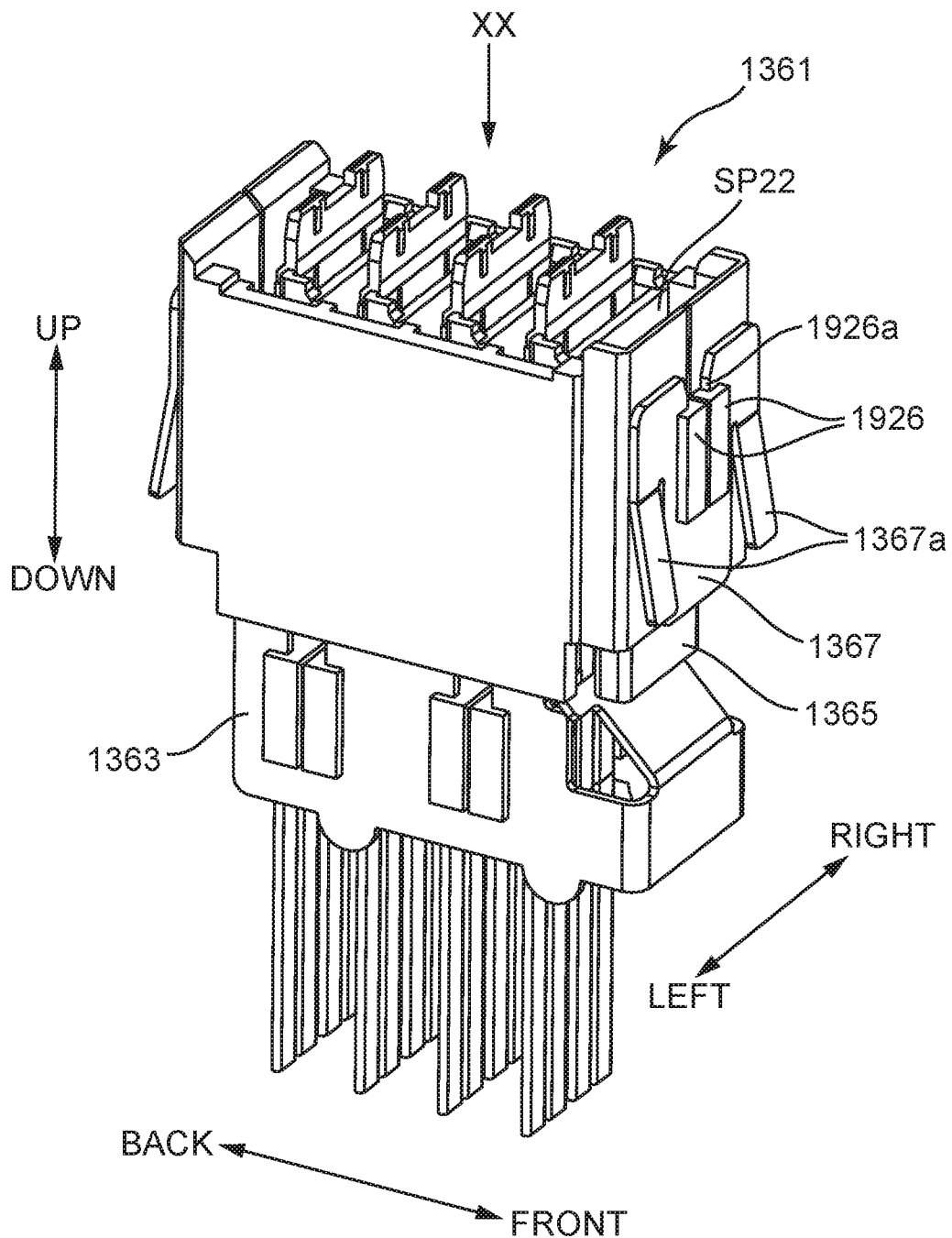
FIG. 30B is a perspective view of the optical fiber unit incorporated into the optical connector of FIG. 29A.

FIG. 30A and FIG. 30B are respective perspective views of the optical fiber assembly 1361 that is housed in the second case 1360. The optical fiber assembly 1361 contains: a left and right pair of bodies 1362 that enclose four optical fiber units 1400; a plate member 1363 that is fixed to the upper end part of the left and right pair of bodies 1362; a plate spring member 1364 that is supported on the rear end part of the left and right pair of bodies 1362; and a pressing member 1365 that is supported on the front end part of the left and right pair of bodie 1362. The body 1362 on the right side and the body 1362 on the left side are symmetrical to each other on the left and right. The plate member 1363, the plate spring member 1364, and the pressing member 1365 are symmetrical to each other on the left and right. The body 1362 and the pressing member 1365 can be made by resin molding. The plate member 1363 and the plate spring member 1364 can be made of a metal plate.

Figure 31:
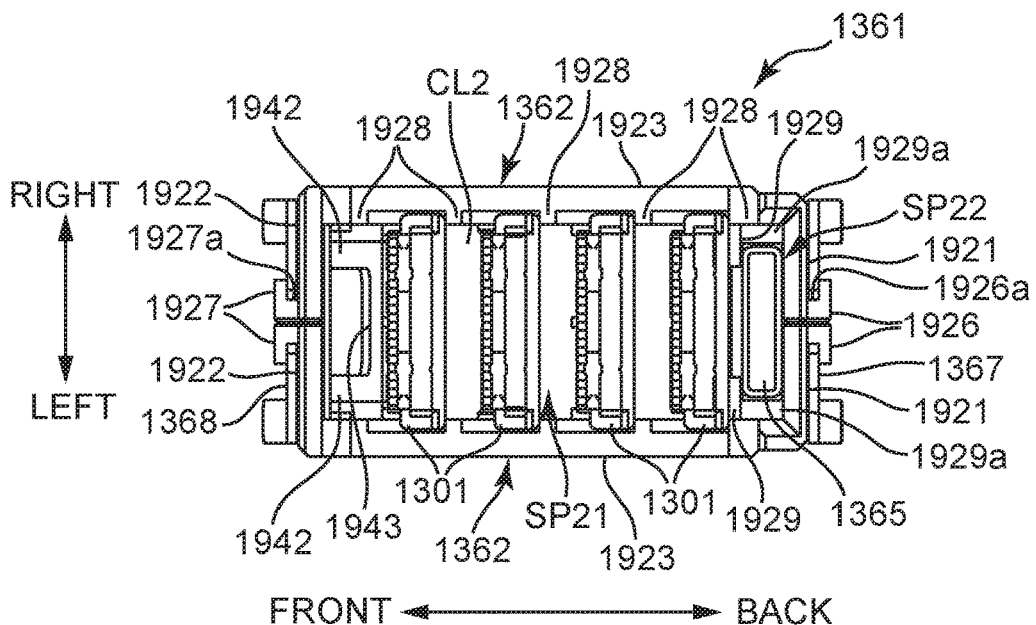
FIG. 31 is a view in the direction of arrow XX of FIG. 30B.

FIG. 31 is a view (plan view) in the direction of arrow XX of FIG. 30B. As illustrated in FIG. 31, the body 1362 has a front wall 1921, a rear wall 1922, and a side wall 1923 that connects the front wall 1921 and the rear wall 1922, and assumes a C-shape from a plan view. As illustrated in FIG. 30B and FIG. 31, a protruding part 1926 that protrudes forward is provided on the front surface of the front wall 1921. An engaging groove 1926a is formed on the circumference surface of the protruding part 1926 (right end surface and lower end surface of the protruding part 1926 of the body 1362 on the right side, and the left end surface and the lower end surface of the protruding part 1926 of the body 1362 on the left side). A U-shaped clip 1367 made from a metal plate of a predetermined thickness is engaged downward in the engaging grooves 1926a of the left and right bodies 1362, and the front end parts of the left and right bodies 1362 are connected through the clip 1367. A slanted part 1367a that protrudes forward at a slant is provided on both left and right end parts of the clip 1367.

As illustrated in FIG. 30A and FIG. 31, a protruding part 1927 that protrudes rearward is provided on the rear surface of the rear wall 1922. An engaging groove 1927a is formed on the circumference surface of the protruding part 1927 (right end surface and lower end surface of the protruding part 1927 of the body 1362 on the right side, and the left end surface and the lower end surface of the protruding part 1927 of the body 1362 on the left side). A U-shaped clip 1368 made from a metal plate of a predetermined thickness is engaged downward in the engaging grooves 1927a of the left and right bodies 1362, and the rear end parts of the left and right bodies 1362 are connected through the clip 1368. A slanted part 1368a that protrudes rearward at a slant is provided on both left and right end parts of the clip 1368. Therefore, as illustrated in FIG. 31, the holding space SP21 of the optical fiber units 1400 is formed on the inner side of the left and right bodies 1362. Note that the clip 1367 and the clip 1368 may have the same shape.

A plurality of position regulating parts 1928 that protrude toward the holding space SP21 are provided at equal intervals in the front back direction on the inner wall surface of the side wall 1923 of the body 1362. The front end surface (both left and right end parts of the upper wall 1310 in FIG. 21) of the optical ferrule 1301 are in contact with the position regulating part 1528, and a gap CL2 is provided between the rear end surface of the optical ferrule 1301 and the position regulating part 1928 to the back thereof. Thereby, the optical ferrule 1301 can be moved rearward. A partition wall 1929 protrudes in the left-right direction on the inner side from the position regulating part 1928 of the foremost part, and a holding space SP22 is formed between the partition wall 1929 and the front wall 1921. The pressing member 1365 is housed in the holding space SP22.

Figure 32A:
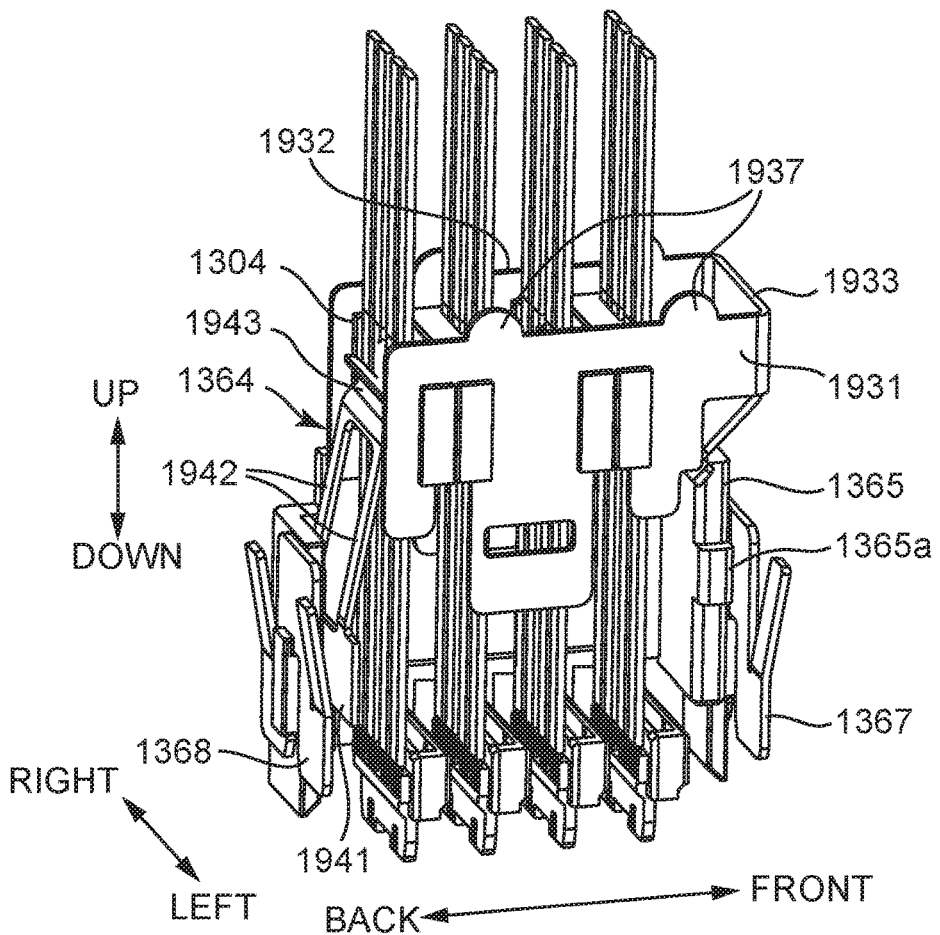
FIG. 32A is a perspective view where the left side body has been omitted from the optical fiber assembly of FIG. 30A.
Figure 32B:
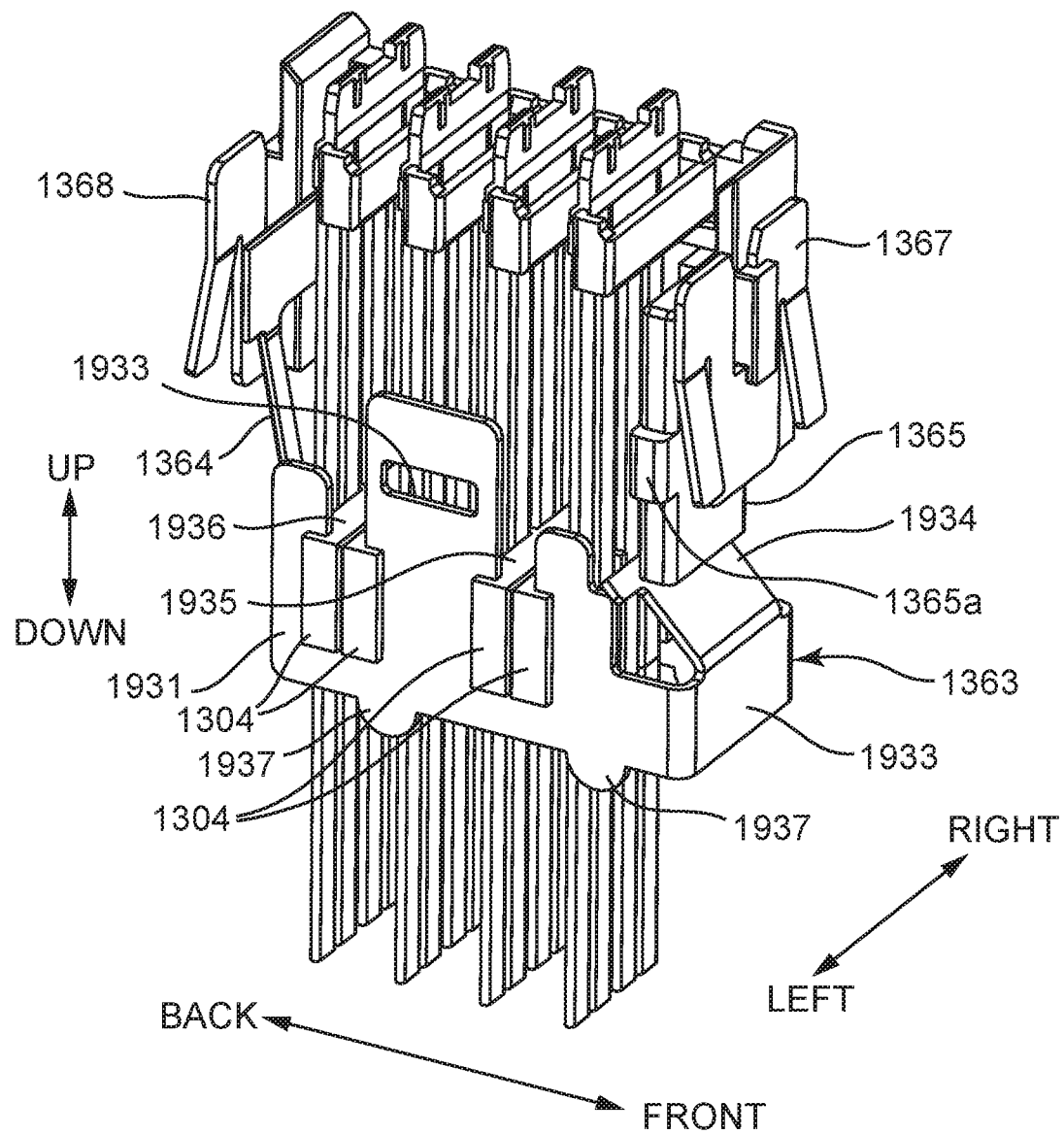
FIG. 32B is a perspective view where the left side body has been omitted from the optical fiber assembly of FIG. 30B.

FIG. 32A and FIG. 32B are respective perspective views that omit the left side body 1362 from the optical fiber assembly 1361 of FIG. 31A and FIG. 31B. As illustrated in FIG. 32B, the protruding part 1365*a* protrudes on both left and right end parts of the pressing member 1365. As illustrated in FIG. 31, a stopper part 1929*a* is formed facing the upper end surface of the protruding part 1365*a* between the front wall 1921 and partition wall 1929 of the body 1362. Upward movement of the pressing member 1365 is limited due to the protruding part 1365*a* contacting the stopper 1929*a*.

As illustrated in FIG. 32A, the plate spring member 1364 has a rectangular base part 1941, and an arm part 1942 that extends at an angle forward and upward from the base part 1941, and an arc shaped pressing part 1943 is formed on the tip of the arm part 1942. The arm part 1942 includes a pair of left and right beam members for increasing the spring properties. Although an illustration is omitted, a concave part that mates with the upper and lower angle part of the right side and the upper and lower angle part of the left side of the base part 1941 is formed in the rear wall 1922 of the left and right bodies 1362. Therefore, when the left and right bodies 1362 are joined, the angle part of the base part 1941 mates with the concave part, and the base part 1941 is secured to the rear wall 1922. At this time, the pressing part 1943 of the plate spring member 1364 applies a bias in the forward direction on the back end surface of the securement member 1304 of the optical ferrule unit 1400. Therefore, as illustrated in FIG. 31, the optical ferrule 1301 is pushed forward, and contacts the position regulating part 1928.

As illustrated in FIG. 32A and FIG. 32B, the plate material 1363 has left and right side walls 1931 and 1932 and a front wall 1933 that is connected to the front end part of the left and right side walls 1931 and 1932. The lower end surfaces of the side walls 1931 and 1932 are provided with grooves with bottoms 1935 and 1936 similar to the optical fiber assembly 1351 (FIG. 27A) of the first optical connector 1305. The engaging groove 1343 of the securement member 1304 of the optical ferrule unit 1400 (FIG. 23B) engages with the front wall and the rear wall of the grooves with bottoms 1935 and 1936, and the securement member 1304 of the optical ferrule unit 1400 is secured to the plate member 1363. A front and back pair of semicircular shaped protruding parts 1937 are provided on the upper end surface of the side walls 1931 and 1932. A slanted part 1934 that slants upward and backward extends from the upper end surface of the front wall 1933 of the plate member 1363. A lower end surface of a pressing member 1365 abuts the upper surface of the slanted part 1934.

The plate member 1363 protrudes upward between the grooves with bottoms 1931 and 1932, and an elongated hole 1933 elongated in the front and back direction is formed in the protruding part. A convex part 1925 (FIG. 33) corresponding to the elongated hole 1933 is provided in the side wall surface of the side wall 1923 of the body 1362. The height in the vertical direction of the convex part 1925 is almost equal to the height of the elongated hole 1933, and the length in the front back direction of the convex part 1925 is shorter than the length of the elongated hole 1933. When the left and right bodies 1362 are linked by clips 1367 and 1368, the convex part 1925 of the body 1362 mates with the elongated holes 1933 of the left and right plate members 1363 from the outer sides in the left and right direction. The concave part 1925 can slide in the front and back direction along the elongated hole 1933, and therefore the left and right bodies 1362 are connected so as to be movable in the front and back direction to the plate member 1363. Thereby the optical fiber assembly 1361 is assembled.

Figure 33:
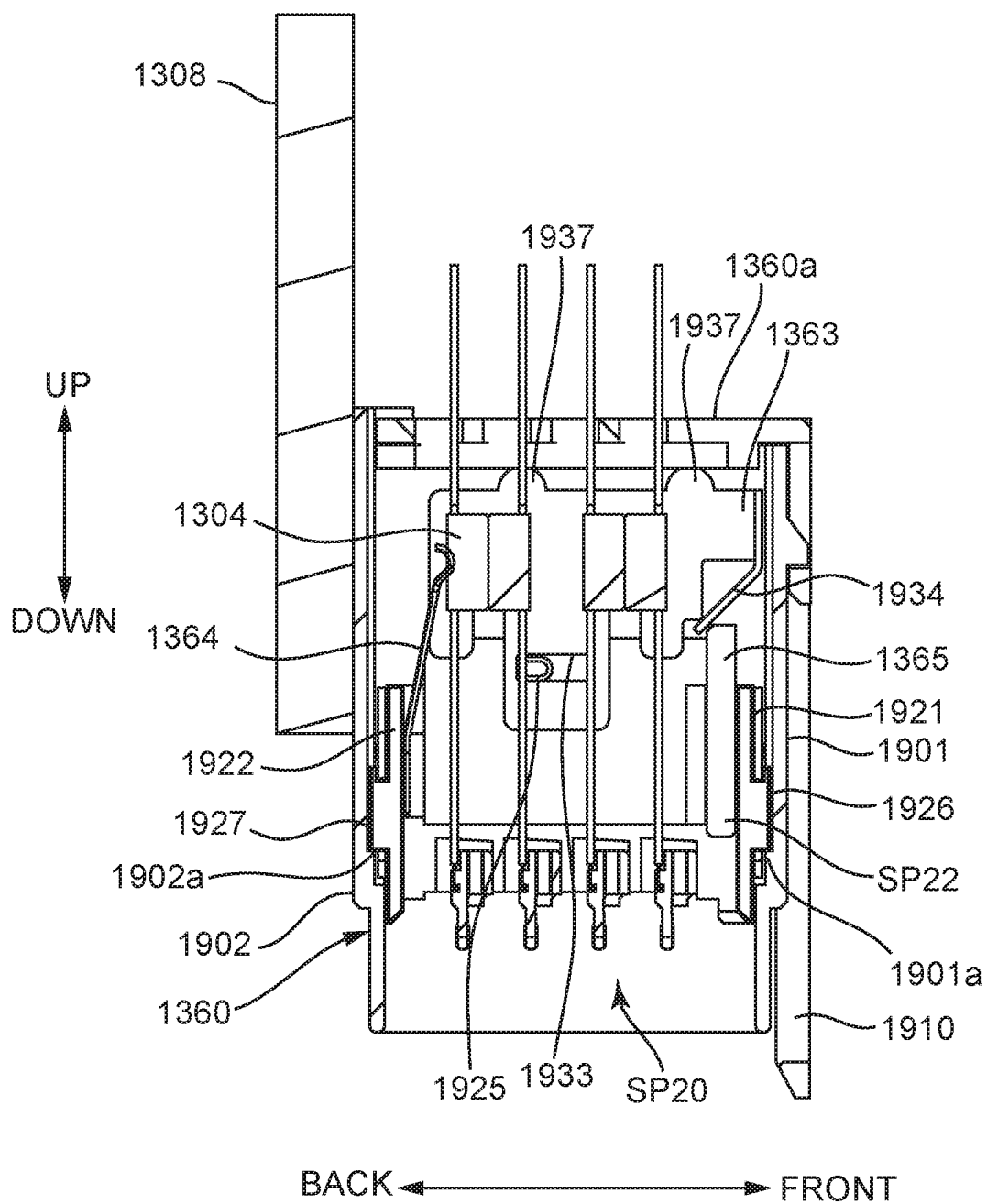
FIG. 33 is a cross-section view cut along line XXII-XXII of FIG. 29A.

FIG. 33 is a cross-section view cut along line XXII-XXII in FIG. 29A. As illustrated in FIG. 33, step parts 1901*a* and 1902*a* are provided on the front surface of the rear wall 1902 and the back surface of the front wall 1901 of the second case 1360, and the length in the front and back direction of the holding space SP20 is narrower toward the bottom of the step parts 1901*a* and 1902*a*. When the optical fiber assembly 1361 is inserted from above the second case 1360, the lower end surface of the protruding parts 1926 and 1927 will abut the upper surface of the step parts 1901*a* and 1902*a,* and thus downward movement of the optical fiber assembly 1361 is limited. At this time, the tips of the slanted parts 1367*a* and 1368*a* of the clips 1367 and 1368 are inserted into the opening part 1360*b* (FIG. 29B) of the optical connectors 1360, and thus upward movement of the optical fiber assembly 1361 is also limited.

The length from the front end surface to the back end surface of the body 1362 of the optical fiber assembly 1361 is equal to the length from the back surface of the front wall 1901 to the front surface of the rear wall 1902 of the second case 1360 above the step parts 1901*a* and 1902*a*. Thereby, the position of the body 1362 in the second case 1360 is regulated. In this case, the convex part 1925 of the body 1362 mates with the elongated hole 1933 in the front and back direction of the plate member 1363, and the plate member 1363 can move back against the biasing force of the plate spring member 1364 while the protruding part 1937 of the upper end surface of abuts the bottom surface of the cover 1360*a*. Note that as illustrated in FIG. 29A, when the pair of optical fiber assemblies 1361 is positioned between the side walls 1903 and 1904 and the center wall 1905 of the second case 1360, the distance between the left and right outer side surfaces of the pair of optical fiber assemblies 1361 is equal to the distance from the left right inner side surfaces of the side walls 1903 and 1904 of the second case 1360 to the center wall 1305. Therefore, the position in the left and right direction of the body 1362 in the second case 1360 is regulated.

Figure 34:
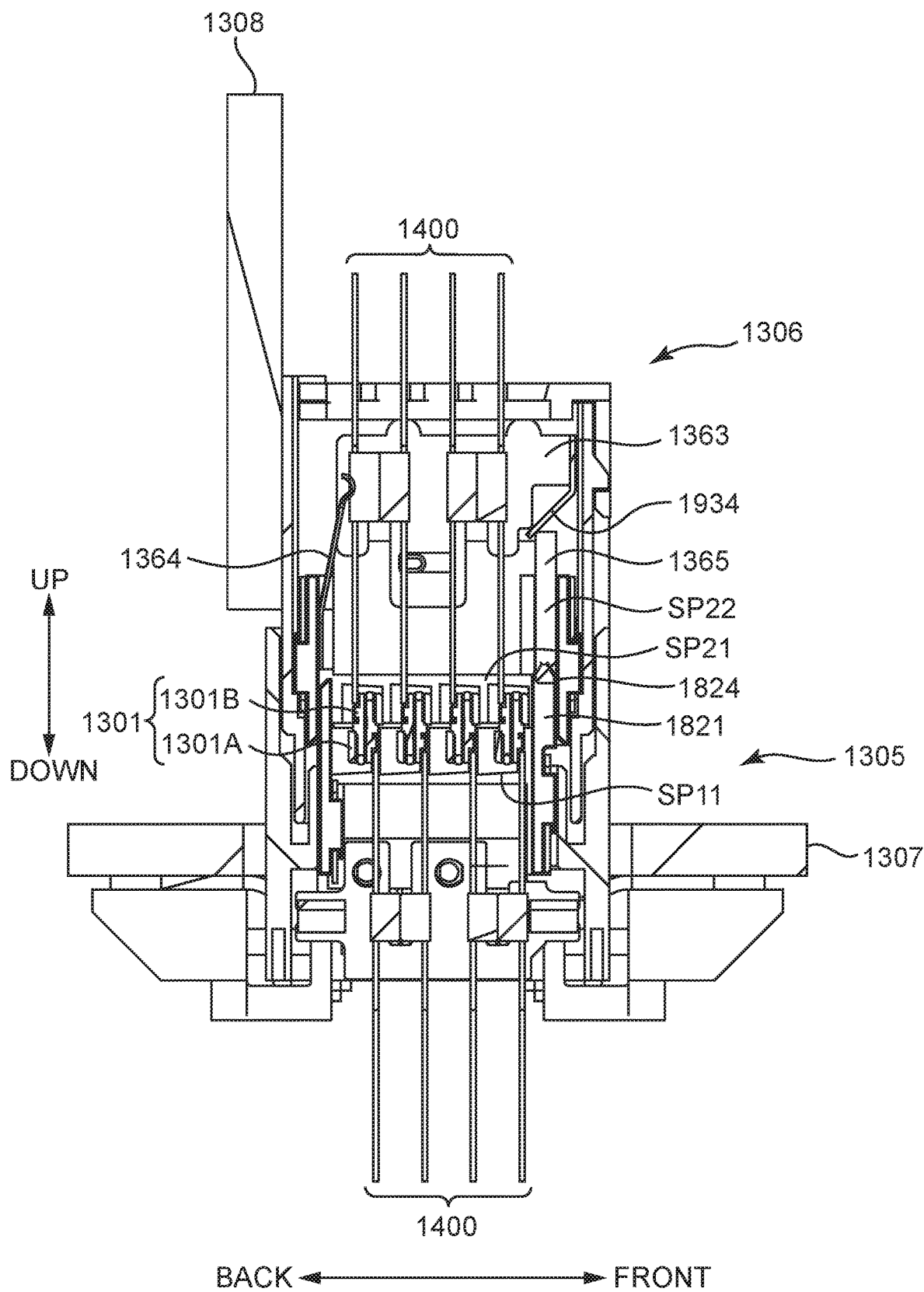
FIG. 34 is a cross-section view showing the mated condition of the connector according to an embodiment of the disclosure.

The action when mating the optical connectors 1305 and 1306 will be described. For example, when the second optical connector 1306 is pressed to the first optical connector 1305, the position is determined by the guide pin 1806 (FIG. 22A) and the guide part 1910 (FIG. 29A), while at the same time, as illustrated in FIG. 34, the protruding part 1824 on the front wall upper end part of the body 1352 of the first optical connector 1305 is inserted into the holding space SP22 of the back part of the front wall of the body 1362 of the second optical connector 1306, and the tip of the protruding part 1824 contacts the lower end part of the pressing member 1365. When the second optical connector 1306 is pressed further, the protruding part 1824 presses the pressing member 1365 upward, and thus a pushing force in the back direction is applied to the plate member 1363 through the slanted part 1934. Therefore, the plate member 1363 moves rearward against the biasing force of the plate spring member 1364, and in conjunction, the securement member 1304 of the optical fiber unit 1400 is also moved rearward.

The first optical ferrule 1301A can move in the front and back direction in the holding space SP11 of the body 1352, and the second ferrule 1301B can move in the front and back direction in the holding space SP21 of the body 1362. As a result, the mating profile between the first optical ferrule 1301A that is assembled into the first optical connector 1305 and the second optical ferrule 1301B that is assembled into the second optical connector 1306 will be at a slant. In other words, the first optical ferrule 1301A and the second optical ferrule 1301B mutually extend in the vertical direction and begin to mate, but as mating progresses, the securement member 1304 on the second optical ferrule 1301B side will move rearward, and the optical ferrule unit 1400 (fiber ribbon 1303) will become a point of support for the securement member 1304 and will deform (bend), and thus the first optical ferrule 1301A and the second optical ferrule 1301B will slant while maintaining the mating profile (first slant). Even if the first optical ferrule 1301A and the second optical ferrule 1301B are completely mated, the second optical connector 1306 will be pressed until the latch 1807 of the first optical connector 1305 engages with the latch hole 1907 of the second optical connector 1306, the optical ferrule unit 1400 will further deform as a point of support for the securement member 1304, and the first optical ferrule 1301A and the second optical ferrule 1301B will slant further while maintaining the mating profile (second slant).

In this manner, an elastic force (reaction force of deformation) acts in a direction that pushes the first optical ferrule 1301A and the second optical ferrule 1301B together because the optical ferrule unit 1300 is deformed by the first slant and the second slant of the optical ferrules 1301A and 1301B. Therefore, stable light transmission characteristics can be maintained between the optical ferrules 1301A and 1301B, even with the effects of vibration and the like. In this case, the optical connectors 1305 and 1306 are pressed while the optical ferrules 1301A and 1301B are slanting, so the mating force of the optical connectors 1305 and 6130 can be reduced. In other words, when the optical connectors 1305 and 1306 are mated in a condition where the optical ferrules 1301A and 1301B are not slanted, an extremely large force will act in order to bend the optical ferrule unit 1400. In contrast, with the present embodiment, the optical connector is mated while the optical ferrule is slanted, and thus the force that bends the optical ferrule unit 1400 can be reduced.

Furthermore, with the present embodiment in the initial condition, the optical ferrules 1301A and 1301B the mating direction of the optical connectors 1305 and 1306 and the mating direction of the optical ferrules 1301A and 1301B are the same, and thus the optical ferrules 1301A and 1301B can easily be aligned. In contrast, if the optical ferrules 1301A and 1301B are not slanted from the beginning, the mating direction of the optical ferrules 1301A and 1301B will not match the mating direction of the optical connectors 1305 and 1306, and therefore the aligning of the optical ferrules 1301A and 1301B will be difficult.

With the present embodiment, the center part in the left and right direction of the first case 1350 is supported so as to be able to tilt with regards to the first substrate 1307 by a pin 2043 that extends in the front and back direction, and both end parts in the left and right direction of the first case 1350 are elastically supported by the first substrate 1307 via a coil spring. In other words, the first case 1350 is supported by the first substrate 1307 through a floating mechanism. Therefore, positional shifting can be absorbed when mating the optical connectors 1305 and 1306, and thus the mating operation is easy.

Figure 35:
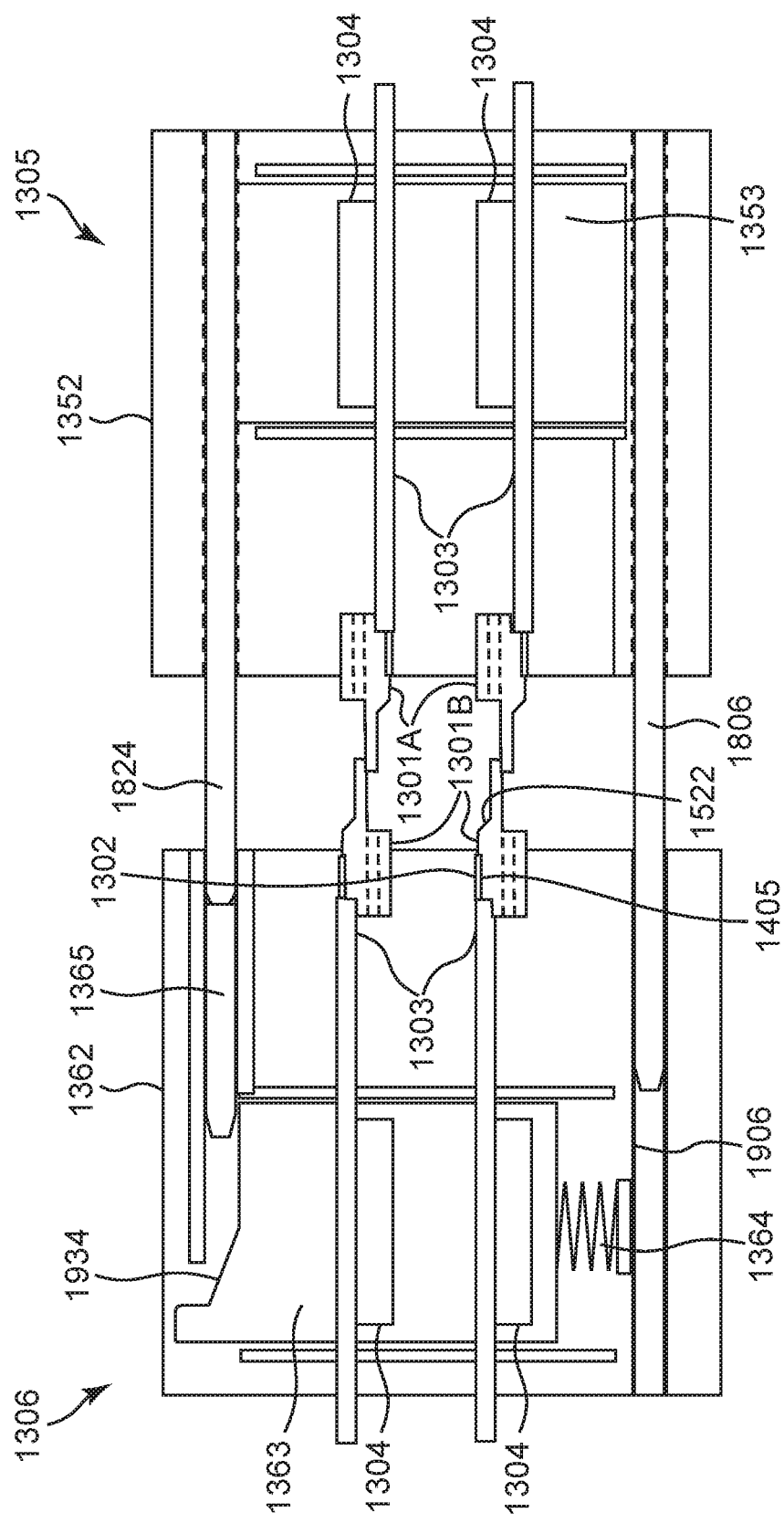
FIG. 35 is a diagram schematically illustrating the function of the connector according to an embodiment of the disclosure.
Figure 36:
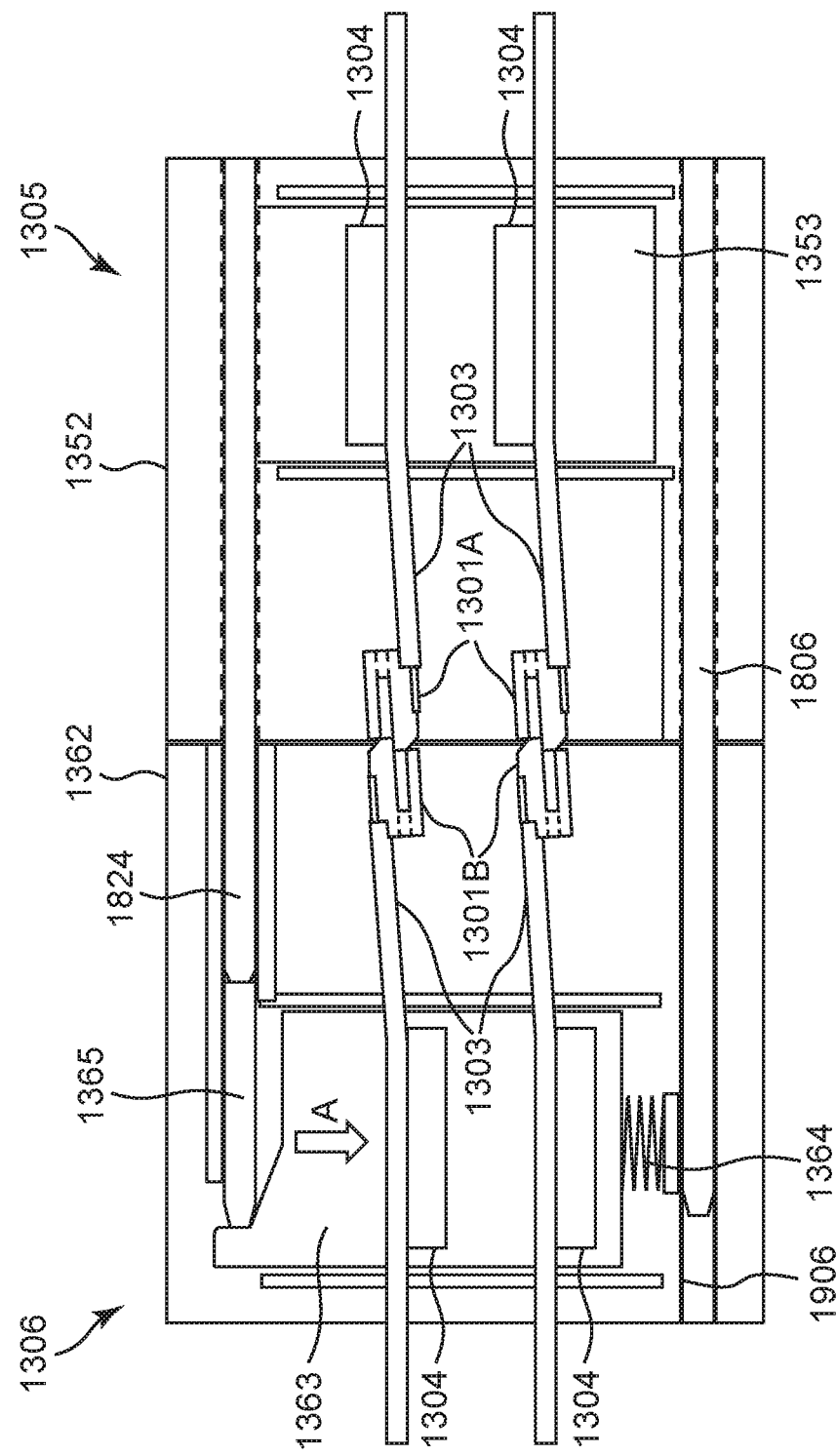
FIG. 36 is a diagram schematically illustrating the function of the connector according to an embodiment of the disclosure.

The effect of the aforementioned action of the optical connectors 1305 and 1306 is described using conceptual diagrams. FIG. 35 and FIG. 36 are diagrams conceptually illustrating an initial mating state and a final mating state of the optical connectors 1305 and 1306. As illustrated in FIG. 35, in the initial mating state, the mating direction of the first optical connector 1305 and the second optical connector 1306 matches the mating direction of the first optical ferrule 1301A and the second optical ferrule 1301B. As illustrated in FIG. 36, in the final mating state, the pressing member 1365 is pressed by the protruding part 1824 of the body 1352, and the securement member 1304 moves in the direction of arrow A, or in other words in the perpendicular direction with regards to the mating direction of the optical connectors 1305 and 1306, together with the plate member 1363 against the spring force of the plate spring member 1364. Therefore, the optical ferrules 1301A and 1301B slant relative to the mating direction of the optical connectors 1305 and 1306, and the fiber ribbon 1303, or in other words the optical fiber 1302 is deformed (bent), and thus a force that causes mutual contact acts on the contact surfaces of the optical ferrules 1301A and 1301B.

Figure 37:
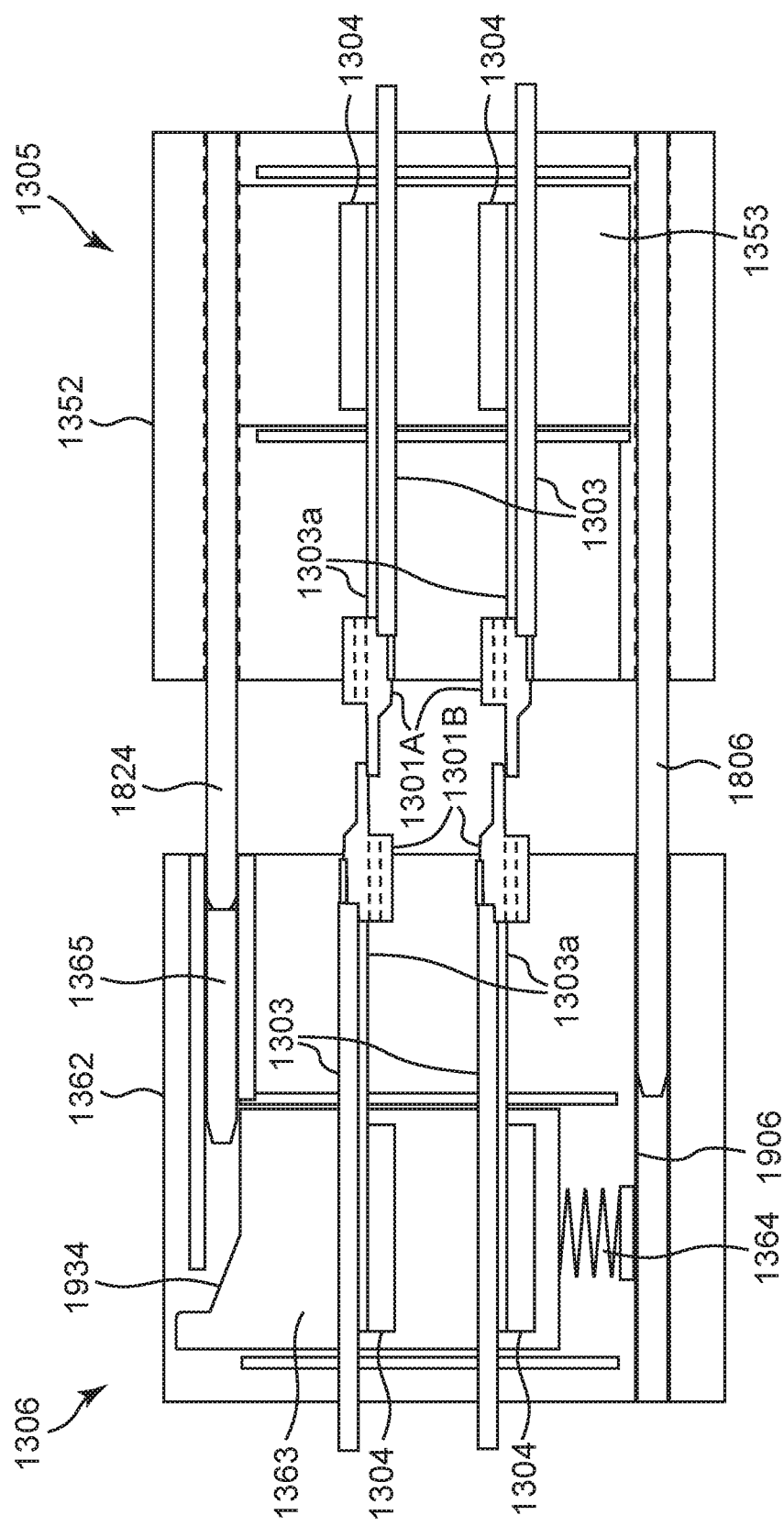
FIG. 37 is a diagram illustrating a modified example of FIG. 35.

FIG. 37 is a diagram illustrating a modified example of FIG. 35. In FIG. 37, an elastic reinforcing member 1303a is attached to the optical ferrules 1301A and 1301B and the fiber ribbon 1303. Therefore, even if the optical connectors 1305 and 1306 are used for a long period of time and the elastic force of the fiber ribbon 1303 is reduced, a stable contact force can be maintained between the optical ferrules 1301A and 1301B, and the durability of the optical connectors 1305 and 1306 can be enhanced. The cross-sectional shape of the elastic reinforcing member 1303a in this case can be a variety of shapes. For example, a semicircular curve shape is acceptable. Note that the elastic reinforcing member 1303a can be attached to only the optical ferrule 1301 or to only the fiber ribbon 1303.

Figure 38:
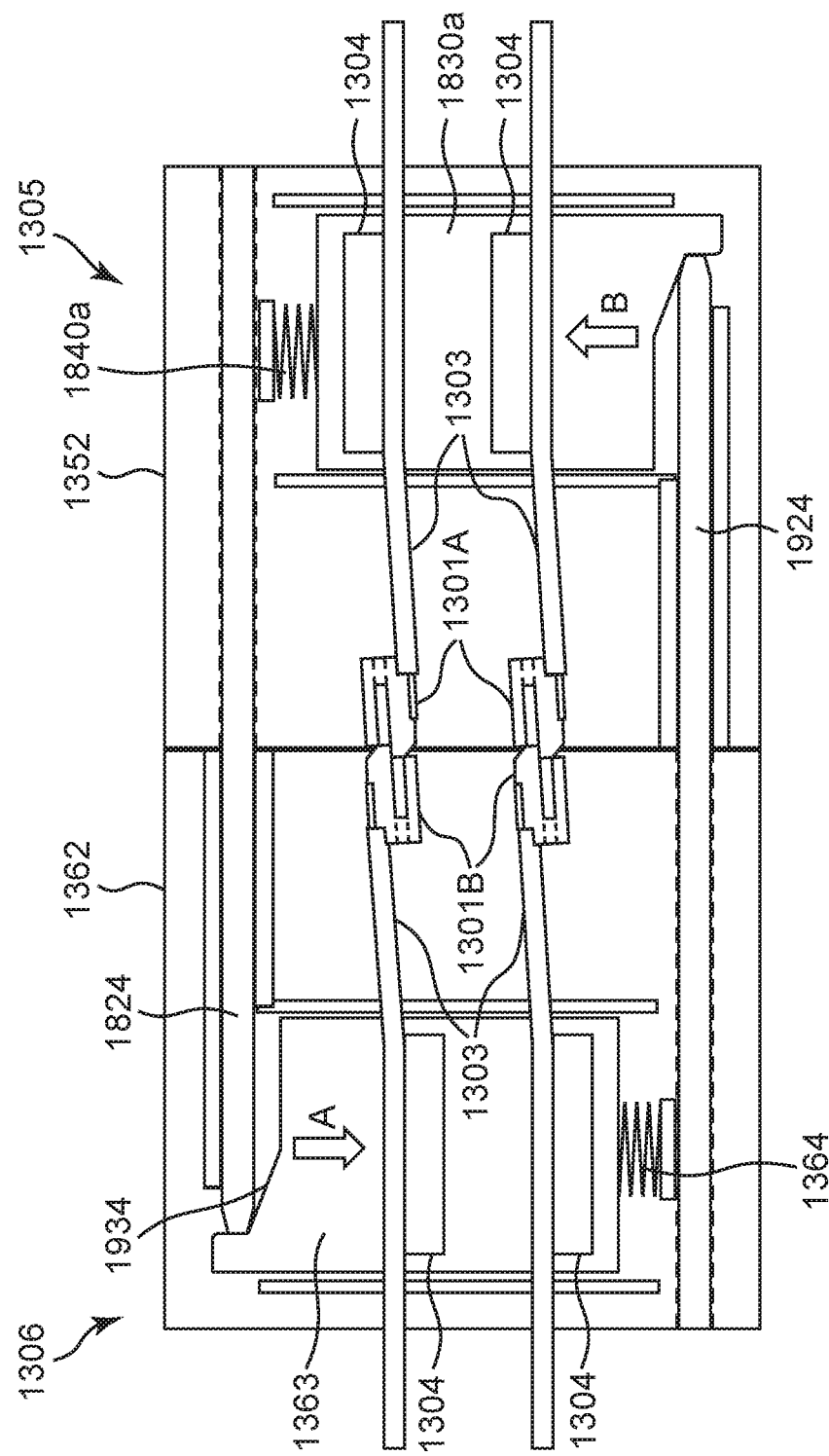
FIG. 38 is a diagram illustrating a modified example of FIG. 36.

FIG. 38 is a diagram illustrating a modified example of FIG. 36. In FIG. 38, the protruding part 1824 of the body 1352 also acts as a guide pin, and thus the guide pin 1806 is omitted. The protruding part 1824 abuts the slanted part 1934 of the plate member 1363, and moves the plate member 1363 in the direction of arrow A without using the pressing member 1365. Furthermore, in FIG. 38, the plate member 1830a of the optical connector 1305 is provided so as to be able to slide, similar to optical connector 1306, and thus a new plate spring member 1840a is provided. Furthermore, a protruding part 1924 similar to that of the optical connector 1305 is provided on the body 1362 of the optical connector 1306. Therefore, when the optical connectors 1305 and 1306 are mated, the plate member 1363 moves in the direction of arrow A, and the plate member 1830a moves in the direction of arrow B that is opposite the direction of arrow A. In other words, both of the plate members move in opposite directions. In this design, the connectors 1305 and 1306 may be identical, yet still mate to each other; that is, the connectors are hermaphroditic.

Note that in the example of FIG. 36, similar to FIG. 38, the protruding part 1824 extends in the longitudinal direction, and thus the guide pin 1806 and the pressing member 1365 can be omitted. Furthermore, similar to FIG. 38, a configuration where the plate member 1353 can slide is also possible.

Figure 39:
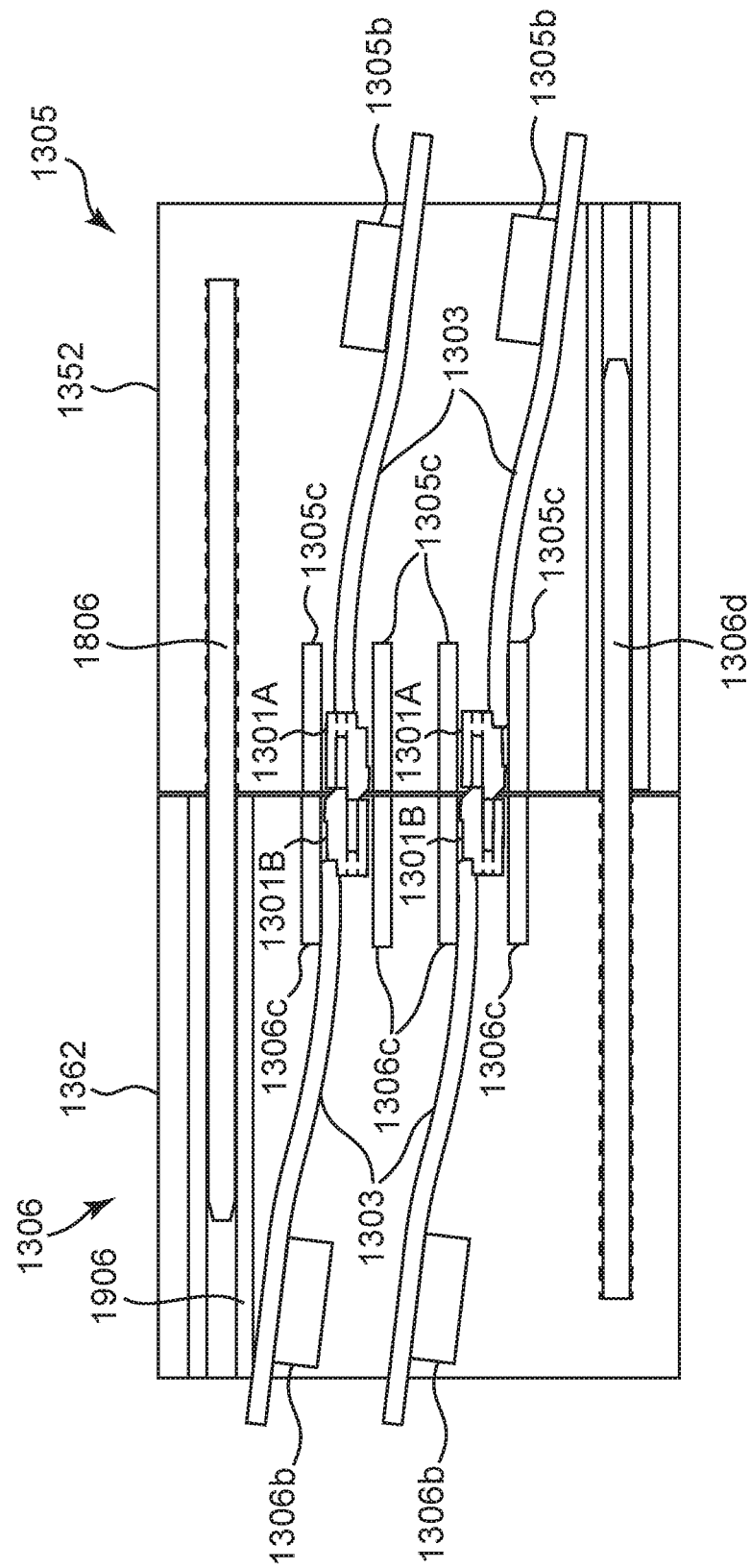
FIG. 39 is a diagram illustrating another modified example of FIG. 36.

FIG. 39 is a diagram illustrating another modified example of FIG. 36. In FIG. 39, angle members 1305b and 1306b are provided on the bodies 1352 and 1362 of the optical connectors 1305 and 1306, and the fiber ribbon 1303 extends at a predetermined angle with regards to the mating direction of the optical connectors 1305 and 1306. Furthermore, guide parts 1305C and 1306C that prevent tilting of the optical ferrules 1301A and 1301B are provided in the area of the optical ferrules 1301A and 1301B. In other words, FIG. 39 illustrates a configuration where a bend occurs in the fiber ribbon 1303 prior to mating. Note that in FIG. 39, a guide pin 1306d protrudes from the optical connector 1306 side, but this can be omitted.

Figure 40:
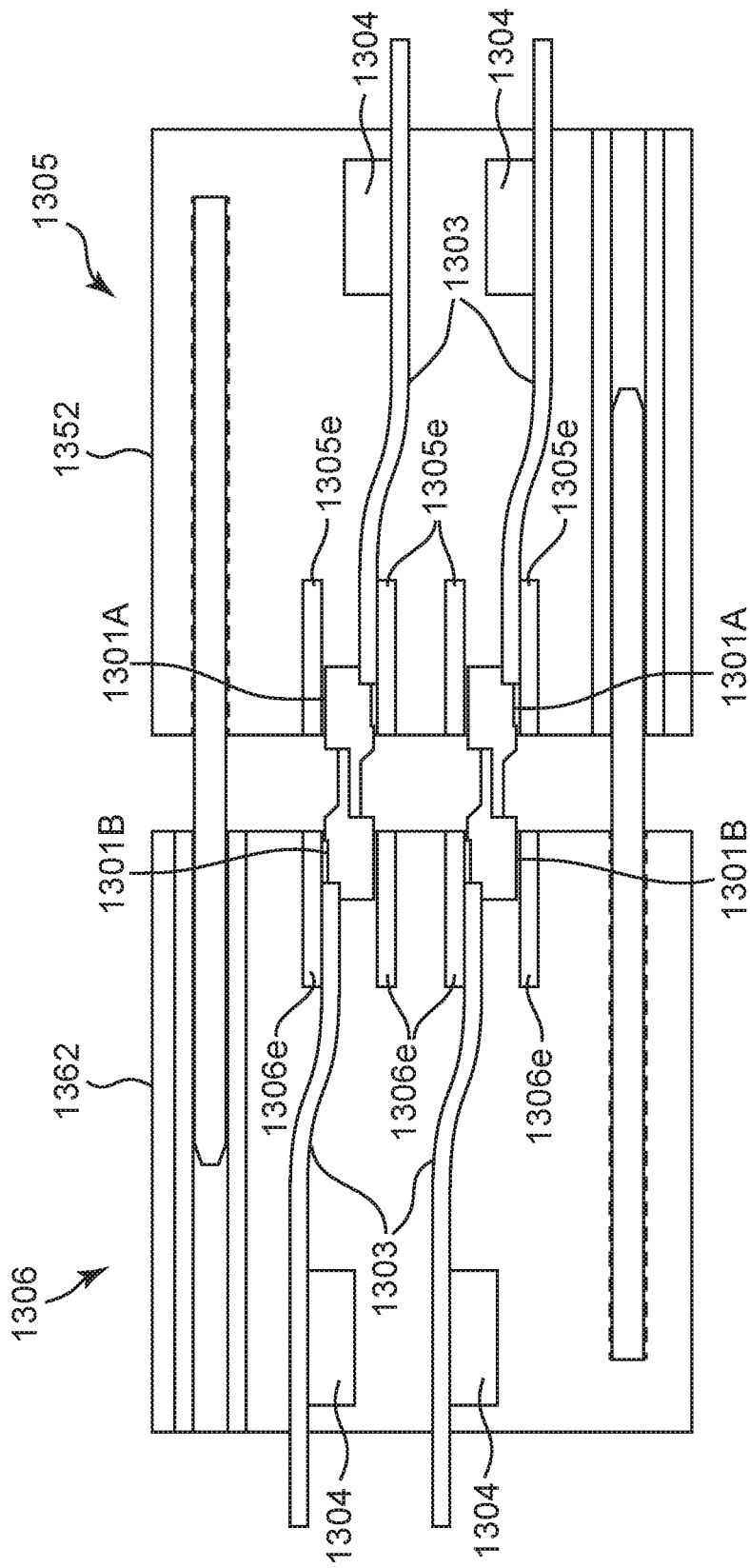
FIG. 40 is a diagram illustrating another modified example of FIG. 35.

FIG. 40 is a diagram illustrating another modified example of FIG. 35. In FIG. 37, the securement member 1304 is secured to the inner side of the bodies 1352 and 1362, and the fiber ribbon 1303 extends in the mating direction of the connectors 1305 and 1306 at the securement part. Guide parts 1305e and 1306e that movably support the optical ferrules 1301A and 1301B in the mating direction of the optical connectors 1305 and 1306 are provided on the bodies 1352 and 1362. The guide positions of the optical ferrules 1301A and 1301B are shifted in a direction perpendicular to the mating direction of the connectors 1305 and 1306 with regards to the securing position of the securement member, and in FIG. 40, the fiber ribbon 1303 has a slight S-shaped curve. When the optical connector 1306 is mated to the optical connector 1305 from this state, the tip part (attaching part to the optical ferrules 1301A and 1301B) of the optical fiber 1303 will move in the bodies 1352 and 1362 along the mating direction of the connectors 1305 and 1306. Through this, the bend in the fiber ribbon 1303 is increased, and the abutting force of the optical ferrules 1301A and 1301B is increased. Note that the optical fiber ribbon 1303 in connector 1306 can be in an unbent state prior to mating to the optical connector 1305. The direction of deformation of the fiber ribbon 1303 and the optical fiber 1302 in FIGS. 36, 38, 27, and 40 is one example, but it is also possible for the bend to be in the opposite direction from that illustrated.

Note that in the above-described embodiment (FIG. 35), the optical connector 1306 is provided with a securement member 1304, or in other words a first attaching region, that holds and retains the fiber ribbon 1303 as the optical waveguide, and moves in the housing of the body 1362 or the like, and with an optical coupler part provided in the housing, and that moves in the housing. In other words, the optical coupler part has a second attaching region, or in other words a V groove 1405, that holds and retains the optical waveguide that is held and retained in the first attaching region, and a light direction converting surface 1522 that changes the direction of the light received from the optical waveguide when the optical waveguide is held and retained in the first attaching region and the second attaching region, and therefore when the connector 6 mates with the opposing connector 1305, the first attaching region will move, causing the optical coupler part to move. In the above-described embodiment, the second attaching region was described as the optical ferrule 1301, but in a more precise sense, it is the region where the optical fiber 1302 is attached to the optical ferrule 1301.

The housing can have any configuration so long as when the optical wave guide is held and retained by the first attaching region and the second attaching region, and the connector is mated to the opposing connector, the first attaching region moves causing the optical waveguide to move while the optical coupler part is also caused to move. The configuration of the first attaching region and the second attaching region is not restricted to the aforementioned configuration. In the above-described embodiment, the first attaching region is primarily moved laterally and the optical coupler part is primarily moved rotationally (tilted) when the optical waveguide is held and retained in the first attaching region and the second attaching region and the connector is mated to the opposite connector, but the movement of the first attaching region and the second attaching region is not restricted thereto.

In the embodiment, when the optical waveguide was held and retained by the first attaching region and the second attaching region, and the connector was mated to the opposite connector, the first attaching region moved along the direction orthogonal to the mating direction of the connector, but a portion of the first attaching region may also move. The optical coupler part of the above-described embodiment was stably supported in the housing by the optical waveguide being held and retained by the first attaching region and the second attaching region, however, the optical coupler part may be stably supported in the housing due at least to the optical waveguide being held and retained by the first attaching region and the second attaching region, or due only to the optical waveguide being held and retained by the first attaching region and the second attaching region.

The embodiments can be described from various perspectives. For example, in the example of FIG. 35, when the connector 1306 is mated to the opposing connector 1305, the first attaching region (securement member 1304) and the second attaching region (optical ferrule 1301) will move and cause the bend of the optical waveguide (fiber ribbon 1303) to increase. In this case, the optical waveguide is not bent before the connector 1306 is mated to the opposing connector 1305. When the connector 1306 is mated to the opposing connector 1305, the first attaching region moves in a direction essentially perpendicular to the mating direction of the connector 1306, and the second attaching region moves in a direction that is essentially parallel to the mating direction of the connector 1306.

Embodiments discussed in this disclosure include at least the following items:

Item 1. A connector comprising a housing comprising:
a first attachment area for receiving and permanently attaching to an optical waveguide; and
a light coupling unit disposed and configured to move translationally and not rotationally within the housing and comprising:
a second attachment area for receiving and permanently attaching to an optical waveguide received and permanently attached at the first attachment area; and
a light redirecting surface configured such that when an optical waveguide is received and permanently attached at the first and second attachment areas, the light redirecting surface receives and redirects light from the optical waveguide, and the optical waveguide limits, but does not prevent, a movement of the light coupling unit within the housing.

Item 2. The connector of item 1, wherein the first attachment area is fixed within the housing.

Item 3. The connector of item 1, wherein the first attachment area is configured to move within the housing.

Item 4. The connector of any of items 1 through 3, wherein when an optical waveguide is received and permanently attached at the first and second attachment areas, a mating of the light coupling unit with a mating light coupling unit of a mating connector causes a bend in the optical waveguide between the first and second attachment areas, the bend assisting in preventing the light coupling unit from unmating from the mating light coupling unit.

Item 5. The connector of item 4, wherein the bend comprises a further bend in an existing bend.

Item 6. The connector of any of claims 1 through 5, wherein when an optical waveguide is received and permanently attached at the first and second attachment areas, a mating of the light coupling unit with a mating light coupling unit of a mating connector causes the second attachment area to move within the housing causing a bend in the optical waveguide, the bend assisting in preventing the light coupling unit from unmating from the mating light coupling unit.

Item 7. The connector of item 6, wherein after the mating, the optical fiber applies a spring force to the light coupling unit to maintain the light coupling unit in a mating position with respect to a mating light coupling unit.

Item 8. The connector of any of items 1 through 7, wherein the housing further comprises at least one guide for preventing the light coupling from rotating, but not moving translationally, within the housing.

Item 9. The connector of item 8, wherein the at least one guide is disposed adjacent to and facing at least one of a top and a bottom major surface of the light coupling unit.

Item 10. The connector of any of items 1 through 9, wherein the housing comprises a pair of guides, one guide of the pair of guides on each side of the light coupling unit, the pair of guides configured to prevent the light coupling unit from rotating, but not translationally moving, within the housing.

Item 11. The connector of item 10, wherein one guide of the pair of guides is disposed adjacent to and facing a top major surface of the light coupling unit, and another guide of the pair of guides is disposed adjacent to and facing a bottom major surface of the light coupling unit.

Item 12. The connector of any of items 1 through 11, further comprising a registration feature configured to engage with a compatible mating feature of a mating connector.

Item 13. The connector of item 12, wherein the registration feature comprises an elongated protrusion and the compatible mating feature comprises an elongated channel.

Item 14. The connector of any of items 1 through 13, wherein the light redirecting surface comprises a curved surface, the optical waveguide having a first core diameter, the curved surface being configured to change a divergence of light from the optical waveguide such that light from the optical waveguide exits the connector along an exit direction different than a mating direction of the connector and having a second diameter greater than the first core diameter.

Item 15. The connector of any of items 1 through 14, wherein the light coupling unit includes a first alignment feature and a second alignment feature, during mating of the light coupling unit with a mating light coupling unit, the first alignment feature is configured to engage with a mating second alignment feature of the mating light coupling unit and the second alignment feature is configured to engage with a mating first alignment feature of the mating light coupling unit.

Item 16. The connector of item 15, wherein the first alignment feature comprises a tab and the second alignment feature comprises a guide hole.

Item 17. The connector of item 16, wherein the guide hole comprises a first end and a second end, during mating of the light coupling unit and the mating light coupling unit, the first end of the guide hole engaging with a mating tab of the mating light coupling unit before the second end of the guide hole engages with the mating tab of the mating light coupling unit, and wherein the first end of the guide hole includes a taper that causes the guide hole to become narrower with distance from the first end for at least a portion of a length of the guide hole.

Item 18. The connector of any of claims 1 through 17, wherein the optical waveguide comprises a pre-bent, annealed optical waveguide.

Item 19. The connector of any of items 1 through 18, wherein the optical waveguide is one of a plurality of optical waveguides in an optical fiber ribbon cable, each optical waveguide in the optical fiber ribbon cable comprises a core, a cladding, and a coating, the optical fiber ribbon cable comprising a jacket disposed over the plurality of optical waveguides, wherein a spring force of the core and cladding of the plurality of optical waveguides is in the optical fiber ribbon cable is greater than a spring force of the coatings and jacket of the optical fiber ribbon cable when the connector is mated with a mating connector.

Item 20. A connector comprising a housing comprising:
a first attachment area for receiving and permanently attaching to an optical waveguide and configured to move within the housing; and
a light coupling unit disposed and configured to move within the housing and comprising:
a second attachment area for receiving and permanently attaching to an optical waveguide received and permanently attached at the first attachment area; and
a light redirecting surface configured such that when an optical waveguide is received and permanently attached at the first and second attachment areas, the light redirecting surface receives and redirects light from the optical waveguide, and the optical waveguide limits, but does not prevent, a movement of the light coupling unit within the housing.

Item 21. The connector of item 20, wherein the optical waveguide limits, but does not prevent, the movement of the light coupling unit within the housing primarily along a linear direction.

Item 22. The connector of any of items 20 through 21, wherein the optical waveguide limits, but does not prevent, the movement of the light coupling unit within the housing primarily along a connector mating direction of the connector.

Item 23. The connector of any of items 20 through 22, wherein in the absence of any optical waveguide received and permanently attached at the first and second attachment areas, the light coupling unit is unrestrained to move freely along at least one direction.

Item 24. The connector of any of items 20 through 23, wherein in the absence of any optical waveguide received and permanently attached at the first and second attachment areas, the light coupling unit is loose within the housing and free to move along at least one direction.

Item 25. The connector of any of items 20 through 24, wherein the light coupling unit is stably supported within the housing, at least in part, by virtue of an optical waveguide being received and permanently attached at the first and second attachment areas.

Item 26. The connector of any of items 20 through 25, wherein when an optical waveguide is received and permanently attached at the first and second attachment areas, the optical waveguide is substantially unbent between the first and second attachment areas.

Item 27. The connector of item 20, wherein when an optical waveguide is received and permanently attached at the first and second attachment areas, the optical waveguide is bent between the first and second attachment areas.

Item 28. The connector of any of items 20 through 27, wherein the light coupling unit is configured to be so positioned and oriented within the housing as to mate with a light coupling unit of a mating connector as the connector mates with the mating connector, the light coupling unit being so positioned and oriented, at least in part, by virtue of an optical waveguide being received and permanently attached at the first and second attachment areas.

Item 29. The connector of any of items 20 through 28, wherein when an optical waveguide is received and permanently attached at the first and second attachment areas, a mating of the light coupling unit with a mating light coupling unit of a mating connector causes a bend in the optical waveguide between the first and second attachment areas, the bend assisting in preventing the light coupling unit from unmating from the mating light coupling unit.

Item 30. The connector of item 29, wherein the bend comprises a further bend in an existing bend.

Item 31. The connector of item 30, wherein the existing bend comprises an S-shaped bend.

Item 32. The connector of any of items 20 through 31, wherein when an optical waveguide is received and permanently attached at the first and second attachment areas, a mating of the light coupling unit with a mating light coupling unit of a mating connector causes the first attachment area to move within the housing, causing a first bend in the optical waveguide, the light coupling unit to move within the housing, and a second bend in the optical waveguide, the second bend assisting in preventing the light coupling unit from unmating from the mating light coupling unit.

Item 33. The connector of item 32, wherein the first bend comprises a further bend in an existing bend.

Item 34. The connector of item 32, wherein the second bend comprises a further bend in the first bend.

Item 35. The connector of any of items 32 through 34, wherein the first attachment area moves in a direction substantially perpendicular to a connector mating direction of the connector and the light coupling unit moves substantially parallel to the connector mating direction toward the first attachment area.

Item 36. The connector of any of items 32 through 35 comprising a registration feature, such that as the connector mates with a mating connector along a mating direction, the registration feature of the connector mates with a registration feature of the mating connector, the registration feature of the mating connector causing the first attachment area of the connector to move within the housing of the connector.

Item 37. The connector of item 36, wherein the registration feature of the connector defines an elongated channel and the registration feature of the mating connector comprises an elongated protrusion, such that as the connector mates with the mating connector, the elongated protrusion slides within the channel, a front end of the elongated protrusion sliding past the channel and making contact with the first attachment area, the contact causing the first attachment area to move within the housing of the connector.

Item 38. The connector of any of items 20 through 37, wherein the housing further comprises at least one guide for preventing the light coupling from rotating, but not moving translationally, within the housing.

Item 39. The connector of item 38, wherein the at least one guide is disposed adjacent to and facing at least one of a top and bottom major surfaces of the light coupling unit.

Item 40. The connector of any of items 20 through 39, wherein the housing comprises a pair of guides, one on each side of the light coupling unit, for preventing the light coupling unit from rotating, but not translationally moving, within the housing.

Item 41. The connector of item 40, wherein one guide in the pair of guides is disposed adjacent to and facing a top major surface of the connector, and the other guide in the pair of guides is disposed adjacent to and facing a bottom major surface of the light coupling unit.

Item 42. The connector of any of claims 20 through 41, wherein during mating with a mating connector, the first attachment area is configured to move in a first direction and the light coupling unit is configured to move in a second direction different from the first direction.

Item 43. The connector of item 42, wherein the second direction is along a mating direction of the connector.

Item 44. The connector of item 43, wherein the first direction is substantially orthogonal to the mating direction.

Item 45. The connector of any of items 20 through 44, wherein the first attachment feature comprises a contact surface configured to cause movement of the first attachment feature during mating of the connector to a mating connector as a registration feature of the mating connector engages with the contact surface.

Item 46. The connector of item 45, wherein the contact surface is a ramp.

Item 47. The connector of any of items 45 through 46, wherein the first attachment feature includes a stop feature configured to limit movement of the registration feature of the mating connector.

Item 48. The connector of any of items 20 through 47, further comprising at least one compressible element, wherein movement of the first attachment area causes the compressible element to apply spring force in a direction opposing a direction of movement of the first attachment area.

Item 49. The connector of item 48, wherein the compressible element comprises a spring that is compressed by movement of the first attachment area.

Item 50. A connector comprising a housing comprising:
a first attachment area for receiving and permanently attaching to an optical waveguide;
a second attachment area for receiving and permanently attaching to an optical waveguide received and permanently attached at the first attachment area; and
a flexible carrier disposed within the housing between the first and second attachment areas for supporting and adhering to an optical waveguide received and permanently attached at the first and second attachment areas, a first end of the flexible carrier attached to the first attachment area, a second end of the carrier attached to the second attachment area.

Item 51. The connector of item 50, wherein the flexible carrier is less flexible when initially bent and more flexible when bent further.

Item 52. The connector of any of claims 50 through 51, wherein the flexible carrier comprises:
a flexible first portion for supporting and adhering to an optical waveguide received and permanently attached at the first and second attachment areas; and
a flexible second portion attached to the flexible first portion at one or more discrete spaced apart attachment locations.

Item 53. The connector of item 52, wherein the one or more discrete spaced apart attachment locations, and the flexible first and second portions define at least one gap therebetween.

Item 54. The connector of any of items 52 through 53, wherein when bent along a length of the flexible carrier, the flexible first portion is more flexible than the flexible second portion.

Item 55. The connector of any of items 52 through 54, wherein when unbent, the flexible first portion has a substantially planar lateral cross-sectional profile and the flexible second portion has a substantially non-planar lateral cross-sectional profile.

Item 56. The connector of any of items 52 through 55, wherein as the flexible carrier is bent along a length of the flexible carrier, a lateral cross-sectional profile of the flexible second portion changes from a substantially non-planar profile to a substantially planar profile.

Item 57. The connector of item 56, wherein the flexible second portion is less flexible when having a substantially non-planar lateral cross-sectional profile and more flexible when having a substantially planar lateral cross-sectional profile.

Item 58. The connector of item 52, wherein at least one attachment location in the one or more discrete spaced apart attachment locations extends along substantially an entire length of the flexible carrier.

Item 59. The connector of item 50, wherein the flexible carrier comprises:
a flexible first portion for supporting and adhering to an optical waveguide received and permanently attached at the first and second attachment areas; and
a flexible second portion attached to the top portion, such that as the flexible carrier is bent along a length of the flexible carrier, the flexible second portion collapses onto the flexible first portion.

Item 60. The connector of item 59, wherein the flexible first portion has a first lateral cross-sectional profile and the flexible second portion has a different second lateral cross-sectional profile, wherein as the flexible second portion collapses onto the flexible first portion, the lateral cross-sectional profile of the flexible second portion changes from the second lateral cross-sectional profile to the first lateral cross-sectional profile.

Item 61. The connector of any of items 59 through 60, wherein the flexible second portion is attached to the flexible first portion at an attachment location, and wherein as the flexible second portion collapses onto the flexible first portion, portions of the flexible second portion rotate about the attachment location.

Item 62. The connector of item 61, wherein each of the flexible first and second portions has a substantially planar cross-sectional profile when bent.

Item 63. The connector of item 59, wherein the flexible second portion comprises a first flexible bottom portion attached to the flexible first portion at a first attachment location, and a second flexible second portion attached to the flexible first portion at a different second attachment location, wherein as the flexible second portion collapses onto the flexible first portion, the first flexible second portion rotates about the first attachment location, and the second flexible second portion rotates about the second attachment location.

Item 64. The connector of item 63, wherein each of the flexible first portion, first flexible second portion, and second flexible second portion has a substantially planar cross-sectional profile when bent.

Item 65. The connector of item 50, wherein the flexible carrier comprises:
a flexible first portion for supporting and adhering to an optical waveguide received and permanently attached at the first and second attachment areas; and
a flexible second portion, such that as the flexible carrier is bent along a length of the flexible carrier, the flexible first and second portions slide with respect to each other along the length of the flexible carrier.

Item 66. The connector of any of items 50 through 65, wherein when the connector is unmated and the optical waveguide is received and permanently attached at the first and second attachment areas, the optical waveguide is substantially unbent between the first and second attachment areas.

Item 67. The connector of any of items 50 through 66, further comprising a light coupling unit disposed and configured to move within the housing, the light coupling unit comprising:
the second attachment area for receiving and permanently attaching to the optical waveguide received and permanently attached at the first attachment area; and
a light redirecting surface configured such that when the optical waveguide is received and permanently attached at the first and second attachment areas, the light redirecting surface receives and redirects light from the optical waveguide, and the flexible carrier and optical waveguide limit, but do not prevent, movement of the light coupling unit within the housing.

Item 68. The connector of item 67, wherein as the connector mates with a mating connector, the flexible carrier is configured to flex, to cause the optical waveguide to bend, and to cause the light coupling unit to rotate within the connector housing.

Item 69. The connector of item 67, wherein a mating of the light coupling unit with a mating light coupling unit of a mating connector causes the flexible carrier to flex and the optical waveguide to bend between the first and second attachment areas, after the mating, the flexible carrier and the optical waveguide applying spring force to the light coupling unit and preventing the light coupling unit from unmating from the mating light coupling unit.

Item 70. The connector of item 67, wherein after the connector mates with a mating connector, mating surfaces of the light coupling unit and a mating light coupling unit are disposed at an angle to a mating direction of the connector.

Item 71. The connector of item 67, wherein the first attachment area is configured to move within the housing.

Item 72. The connector of item 71, when the optical waveguide is received and permanently attached at the first and second attachment areas, a mating of the light coupling unit with a mating light coupling unit of a mating connector is configured to cause:
the first attachment area to move within the housing;
the flexible carrier to flex;
a bend in the optical waveguide; and
the light coupling unit to move within the housing, wherein a spring force is applied by the flexible carrier and the bend in the optical waveguide to the light coupling unit, the spring force assisting in preventing the light coupling unit from unmating from the mating light coupling unit.

Item 73. The connector of item 72, wherein during the mating, the first attachment area moves in a direction substantially perpendicular to a connector mating direction of the connector.

Item 74. The connector of item 72, wherein during the mating, the first attachment area is configured to move in a first direction and the light coupling unit is configured to move in a second direction different from the first direction.

Item 75. The connector of item 72, wherein during the mating, the light coupling unit rotates within the housing.

Item 76. The connector of any of items 50 through 75, further comprising a registration feature, such that as the connector mates with a mating connector along a mating direction, the registration feature of the connector mates with a mating registration feature of the mating connector, the mating registration feature causing the first attachment area of the connector to move within the housing of the connector.

Item 77. The connector of item 76, wherein the registration feature of the connector comprises an elongated channel and the mating registration feature of the mating connector comprises an elongated protrusion, such that as the connector mates with the mating connector, the elongated protrusion slides within the elongated channel, a front end of the elongated protrusion sliding past the channel and making contact with the first attachment area, the contact causing the first attachment area to move within the housing of the connector.

Item 78. The connector of item 77, wherein during the mating, the mating registration feature engages with a contact surface of the first attachment area and applies a force to the contact surface causing the first attachment area of the connector to move within the housing of the connector.

Item 79. The connector of item 78, wherein the contact surface is a ramp.

Item 80. The connector of item 78, wherein the first attachment feature includes a stop feature configured to limit movement of the mating registration feature of the mating connector.

Item 81. The connector of any of claims 50 through 80, further comprising at least one compressible element, wherein movement of the first attachment area causes the compressible element to apply spring force in a direction opposing a direction of movement of the first attachment area.

Item 82. The connector of item 81, wherein the compressible element comprises a spring that is compressed by movement of the first attachment area.

Item 83. The connector of any of items 50 through 82, wherein at least one of the first and second flexible portions comprises a vibration dissipating material.

Item 84. The connector of any of items 50 through 83 wherein at least on of the first and second flexible portions comprises a viscoelastic material for absorbing energy.

Unless otherwise indicated, all numbers expressing feature sizes, amounts, and physical properties used in the specification and claims are to be understood as being modified in all instances by the term "about." Accordingly, unless indicated to the contrary, the numerical parameters set forth in the foregoing specification and attached claims are approximations that can vary depending upon the desired properties sought to be obtained by those skilled in the art utilizing the teachings disclosed herein.

As used in this specification and the appended claims, the singular forms "a," "an," and "the" encompass embodiments having plural referents, unless the content clearly dictates otherwise. As used in this specification and the appended claims, the term "or" is generally employed in its sense including "and/or" unless the content clearly dictates otherwise.

Spatially related terms, including but not limited to, "lower," "upper," "beneath," "below," "above," and "on top," if used herein, are utilized for ease of description to describe spatial relationships of an element(s) to another. Such spatially related terms encompass different orientations of the device in use or operation in addition to the particular orientations depicted in the figures and described herein. For example, if an object depicted in the figures is turned over or flipped over, portions previously described as below or beneath other elements would then be above those other elements.

Unless otherwise indicated, the words "first," "second," "third," are used herein for identification of various features and are not intended to imply any particular order, position, priority, etc.

All references and publications cited herein are expressly incorporated herein by reference in their entirety into this disclosure, except to the extent they may directly contradict this disclosure. Although specific embodiments have been illustrated and described herein, it will be appreciated by those of ordinary skill in the art that a variety of alternate and/or equivalent implementations can be substituted for the specific embodiments shown and described without departing from the scope of the present disclosure. This application is intended to cover any adaptations or variations of the specific embodiments discussed herein. Therefore, it is intended that this disclosure be limited only by the claims and the equivalents thereof.

What is claimed is:

1. An optical connector configured to mate with a mating optical connector, comprising:
    a housing;
    a moving member disposed in, and configured to move relative to, the housing;
    a light coupling unit disposed in the housing and configured to mate with a mating light coupling unit of the mating optical connector, the light coupling unit comprising an attachment area, and a light redirecting surface; and
    an optical waveguide permanently attached to the attachment area, the light redirecting surface configured to receive light from the optical waveguide along a first direction and redirect the received light along a different second direction, such that when the optical connector mates with the mating optical connector, the mating optical connector causes the moving member to move within the housing and press against the optical waveguide causing the light coupling unit and the mating light coupling unit to move.

2. The optical connector of claim 1, wherein the attachment area comprises a groove.

3. The optical connector of claim 1, wherein the optical waveguide comprises an optical fiber.

4. The optical connector of claim 1, wherein when the optical connector mates with the mating optical connector, the mating optical connector causes the moving member to move in a direction substantially perpendicular to a mating direction of the optical connector.

5. The optical connector of claim 1, when the optical connector mates with the mating optical connector, the mating optical connector causes the moving member to move within the housing and press against the optical waveguide causing the light coupling unit and the mating light coupling unit to rotate.

* * * * *